United States Patent
Armstrong et al.

(10) Patent No.: US 12,340,025 B2
(45) Date of Patent: Jun. 24, 2025

(54) SYSTEMS, METHODS, AND APPARATUSES FOR EXECUTION OF GESTURE COMMANDS

(71) Applicant: Comcast Cable Communications, LLC, Philadelphia, PA (US)

(72) Inventors: Scott A. Armstrong, Wayne, PA (US); Arun Ravisankar, Philadelphia, PA (US); Resmi Vijayan, Philadelphia, PA (US); Arpit Mathur, Pittsburgh, PA (US); Julianne Heinzmann, Philadelphia, PA (US); Natalie Mazer, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 520 days.

(21) Appl. No.: 17/712,835

(22) Filed: Apr. 4, 2022

(65) Prior Publication Data

US 2023/0315211 A1 Oct. 5, 2023

(51) Int. Cl.
| | |
|---|---|
| *G06F 3/01* | (2006.01) |
| *F24F 11/50* | (2018.01) |
| *G06F 3/16* | (2006.01) |
| *G06V 20/40* | (2022.01) |
| *G06V 40/10* | (2022.01) |
| *G06V 40/20* | (2022.01) |

(52) U.S. Cl.
CPC .............. *G06F 3/017* (2013.01); *F24F 11/50* (2018.01); *G06F 3/165* (2013.01); *G06V 20/40* (2022.01); *G06V 40/10* (2022.01); *G06V 40/20* (2022.01)

(58) Field of Classification Search
CPC .......... G06F 3/017; G06F 3/165; F24F 11/50; G06V 40/10; G06V 20/40; G06V 40/20
See application file for complete search history.

(56) References Cited

U.S. PATENT DOCUMENTS

| | | |
|---|---|---|
| 9,093,069 B2 | 7/2015 | Lee et al. |
| 9,324,322 B1 | 4/2016 | Torok et al. |
| 9,697,822 B1 | 7/2017 | Naik et al. |
| 9,811,664 B1 | 11/2017 | Hsu et al. |

(Continued)

OTHER PUBLICATIONS

An Easily Customized Gesture Recognizer for Assisted Living Using Commodity Mobile Devices:https://www.hindawi.com/journals/jhe/2018/3180652/.

(Continued)

*Primary Examiner* — David F Dunphy
(74) *Attorney, Agent, or Firm* — Banner & Witcoff, Ltd.

(57) ABSTRACT

Upon detection of a gesture, a current context of an environment in which the gesture is performed may be determined. The current context may be used to interpret the gesture to determine which of potentially a plurality of devices are to be controlled by the gesture and whether the gesture is configured to control the determined device(s) in the current context. The current context may also be used to determine whether to adjust a threshold for determining whether the gesture is intended as a control command. An aspect of the detected gesture may be compared to the threshold to determine whether the gesture is intended as a control command. If the gesture is intended as a control command, the determined device(s) may be controlled accordingly.

20 Claims, 29 Drawing Sheets

(56) References Cited

U.S. PATENT DOCUMENTS

| | | |
|---|---|---|
| 9,934,785 B1 | 4/2018 | Hulaud |
| 10,089,072 B2 | 10/2018 | Piersol et al. |
| 10,514,766 B2 | 12/2019 | Gates et al. |
| 10,558,272 B2 | 2/2020 | Parshionikar |
| 10,685,669 B1 | 6/2020 | Lan et al. |
| 10,930,282 B2 | 2/2021 | Newendorp et al. |
| 11,023,520 B1 | 6/2021 | Sanders et al. |
| 11,869,039 B1* | 1/2024 | Riding ................ G06V 40/172 |
| 2002/0083060 A1 | 6/2002 | Wang et al. |
| 2010/0146445 A1 | 6/2010 | Kraut |
| 2011/0157009 A1* | 6/2011 | Kim ....................... G06F 3/017 |
| | | 345/156 |
| 2011/0197263 A1 | 8/2011 | Stinson, III |
| 2012/0035924 A1 | 2/2012 | Jitkoff et al. |
| 2014/0074466 A1 | 3/2014 | Sharifi et al. |
| 2014/0191939 A1 | 7/2014 | Penn et al. |
| 2014/0270194 A1 | 9/2014 | Des Jardins |
| 2015/0086033 A1 | 3/2015 | Tebbs et al. |
| 2015/0347114 A1* | 12/2015 | Yoon .................. H04L 12/2832 |
| | | 717/176 |
| 2015/0355716 A1* | 12/2015 | Balasubramanian ....................... |
| | | G06F 3/04186 |
| | | 345/173 |
| 2017/0008308 A1 | 1/2017 | Willems et al. |
| 2018/0062691 A1* | 3/2018 | Barnett, Jr. ............. G06F 3/167 |
| 2019/0066670 A1 | 2/2019 | White et al. |
| 2020/0021894 A1 | 1/2020 | Sanchez et al. |
| 2020/0042093 A1* | 2/2020 | Kline .................... G06F 16/784 |
| 2020/0184962 A1 | 6/2020 | Chen |
| 2020/0186740 A1 | 6/2020 | Binder |
| 2021/0090575 A1 | 3/2021 | Mahmood et al. |
| 2021/0352380 A1 | 11/2021 | Duncan et al. |

OTHER PUBLICATIONS

Mezari, Antigoni, Maglogiannis, Ilias, An Easily Customized Gesture Recognizer for Assisted Living Using Commodity Mobile Devices, Journal of Healthcare Engineering, 2018, 3180652, 12 pages, 2018. https://doi.org/10.1155/2018/3180652.

Oct. 17, 2022—EP Search Report—EP App. No. 22177792.3.

* cited by examiner

Gesture Command Execution System: Add/Edit Users

714 — Name: Sarah Jones
716 — Gender: ○ Female ○ Male
718 — Age: 25 ▶
720 — Authorization Level: Medium ▶
722 — Advance settings [Click here]
724 — Perform calibration [Click here]

[Save and register another user] [Save and exit] [Cancel]

Gesture: Arms Raised Gesture

| Contextual Scenarios | 302a Television/ 302j Content | 302i Speaker/ 302j Content | 302q Thermostat | 302n Telephone | 302q Window | 302r Date/ Time | 302b Background Noise | 302z Emotional State | Action |
|---|---|---|---|---|---|---|---|---|---|
| 1000A | OFF | N/A | N/A | N/A | N/A | 1:30PM | N/A | NEUTRAL | DO NOT CONTROL ANY DEVICE |
| 1000B | OFF | N/A | N/A | N/A | N/A | 9:30 PM | N/A | NEUTRAL | TURN ON TV; TUNE TO CHANNEL 4 |
| 1000C | ON | N/A | N/A | N/A | N/A | N/A | DOG BARKING @ 80db | FRUSTRATED | ADJUST THRESHOLD; TURN VOLUME UP |
| 1000D | ON | N/A | N/A | INCOMING CALL | N/A | N/A | N/A | NEUTRAL | PAUSE TV |
| 1000E | ON; FOOTBALL GAME; SCORE DETECTED | N/A | N/A | N/A | N/A | N/A | N/A | EXCITED | ADJUST THRESHOLD; DO NOT CONTROL ANY DEVICE |
| 1000F | OFF | OUTPUTTING MUSIC | N/A | N/A | N/A | N/A | N/A | HAPPY | ADJUST THRESHOLD; DO NOT CONTROL ANY DEVICE |
| 1000G | N/A | N/A | 58 DEGREES | N/A | OPEN | N/A | N/A | DISCOMFORT | RAISE THERMOSTAT TEMPERATURE |
| 1000H | ON; CHILDREN'S SHOW | N/A | N/A | N/A | N/A | N/A | LAUGHTER/ SCREAMING @ 70db | EXCITED | ADJUST THRESHOLD; TURN VOLUME UP; OUTPUT SUPPL. CONTENT |

FIG. 9

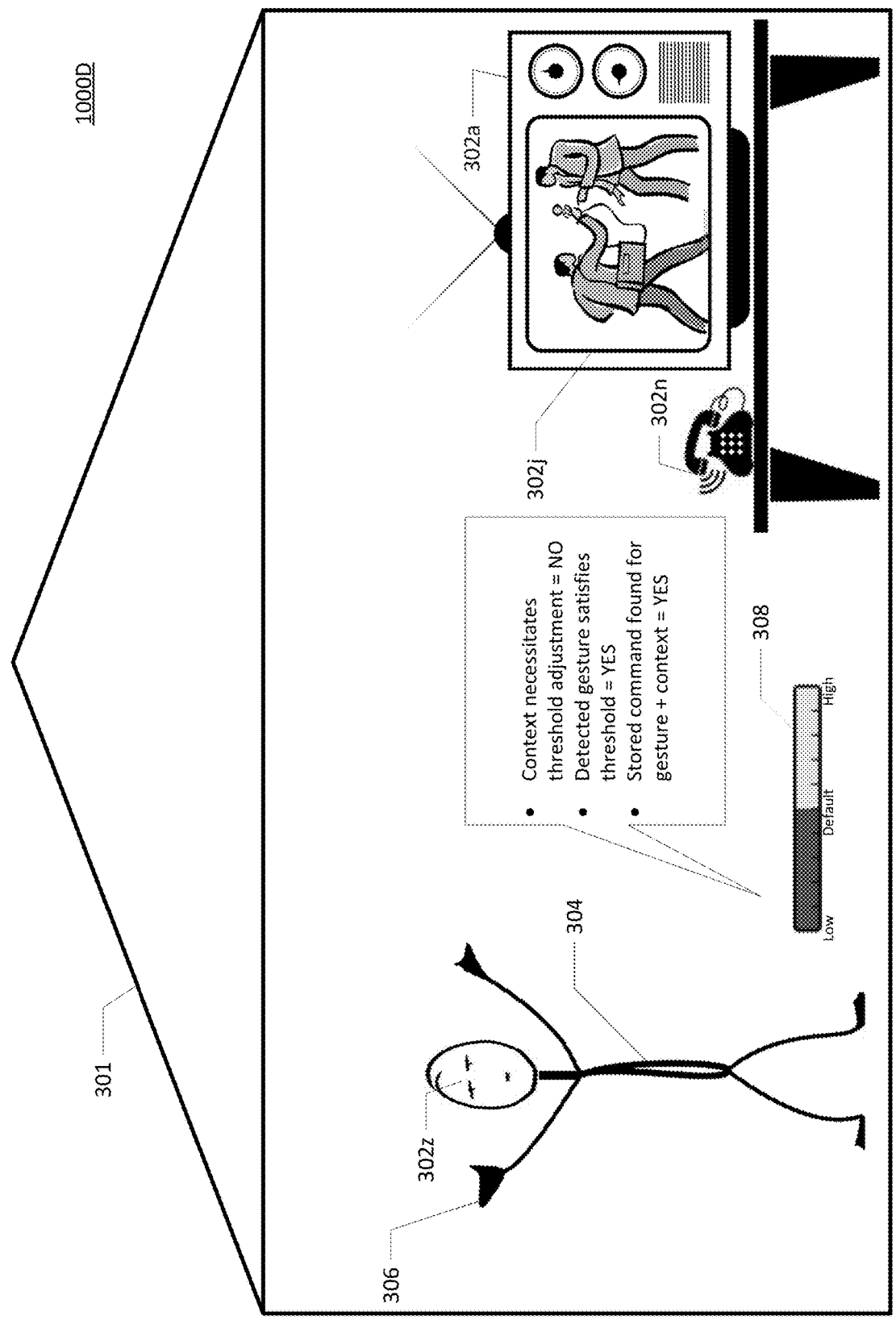

SYSTEMS, METHODS, AND APPARATUSES FOR EXECUTION OF GESTURE COMMANDS

BACKGROUND

As homes are equipped with more and more smart and connected devices, users are looking for simplified methods of controlling such devices. Many of these smart devices are equipped with technology that allows for the device to be easily controlled via gestures made by the user, such as an arm raise, a particular hand movement, or the like. Such gestures can be used to turn on a television, raise the temperature on a thermostat, disarm a security system, etc. However, when multiple gesture-controlled devices are used in a premises, it becomes challenging to determine the device for which a detected gesture is intended and whether the detected gesture is even intended for controlling a device at all.

SUMMARY

The following presents a simplified summary in order to provide a basic understanding of certain features. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Systems, apparatuses, and methods are described herein for providing a gesture command execution system. More accurately interpreting gestures for controlling devices in a device-congested environment may be achieved by determining the context in which the gesture is being performed. This may also be useful for allowing multiple devices in such an environment to be controlled by the same gesture—so that user may not need to remember a large variety of different gestures for controlling the different devices in the environment. Instead, the context in which the gesture is being performed may be taken into account when deciding which device a gesture is intended to control. In this way, a single gesture may be used to control one device to perform an action in one context, e.g., turn on the television, and control a different device to perform an action in a different context, e.g., turn on the lights.

The context in which the gesture is being performed may be determined from data acquired from one or more devices or sources, such as a camera, a motion sensor, a microphone, controllable devices in the environment, a data source that maintains information on external conditions, etc. The information acquired from the contextual data sources may be used to determine, for example, an identity of a user who is performing a gesture, which room the user is located in when the gesture is performed, what devices are near the user performing the gesture, the direction the user is facing relative to the devices in the room when performing the gesture, the state of the various controllable devices in the room, whether other people are in the room, an emotional state of the user or a general mood of the people in the room, weather conditions, traffic conditions, or other desired contextual information. Based on such contextual information associated with the environment in which the gesture is being performed, a determination may be made about whether the gesture is intended to actually control a device and if so, the most-likely device for which the gesture is intended. A threshold for determining whether a detected gesture may be recognized as a gesture intended to control a device may be adjusted based on the context associated with the environment in which the gesture is being performed. For instance, if the context indicates that the television is ON and a football game is playing on the television and there are multiple people in the room in an excited or festive state, the threshold for gesture recognition may be adjusted so that an inadvertent gesture, such as an arm raise when the user's team scores, is not incorrectly interpreted as a gesture to raise the temperature, for example.

The features described in the summary above are merely illustrative of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

FIGS. 7A-7K show example user interfaces for use in a gesture command execution system.

FIG. 9 shows a chart of example contextual scenarios and corresponding example actions performed in a gesture command execution system.

FIGS. 10A-10H show example contextual scenarios and corresponding example actions performed in a gesture command execution system.

DETAILED DESCRIPTION

Figure 1:
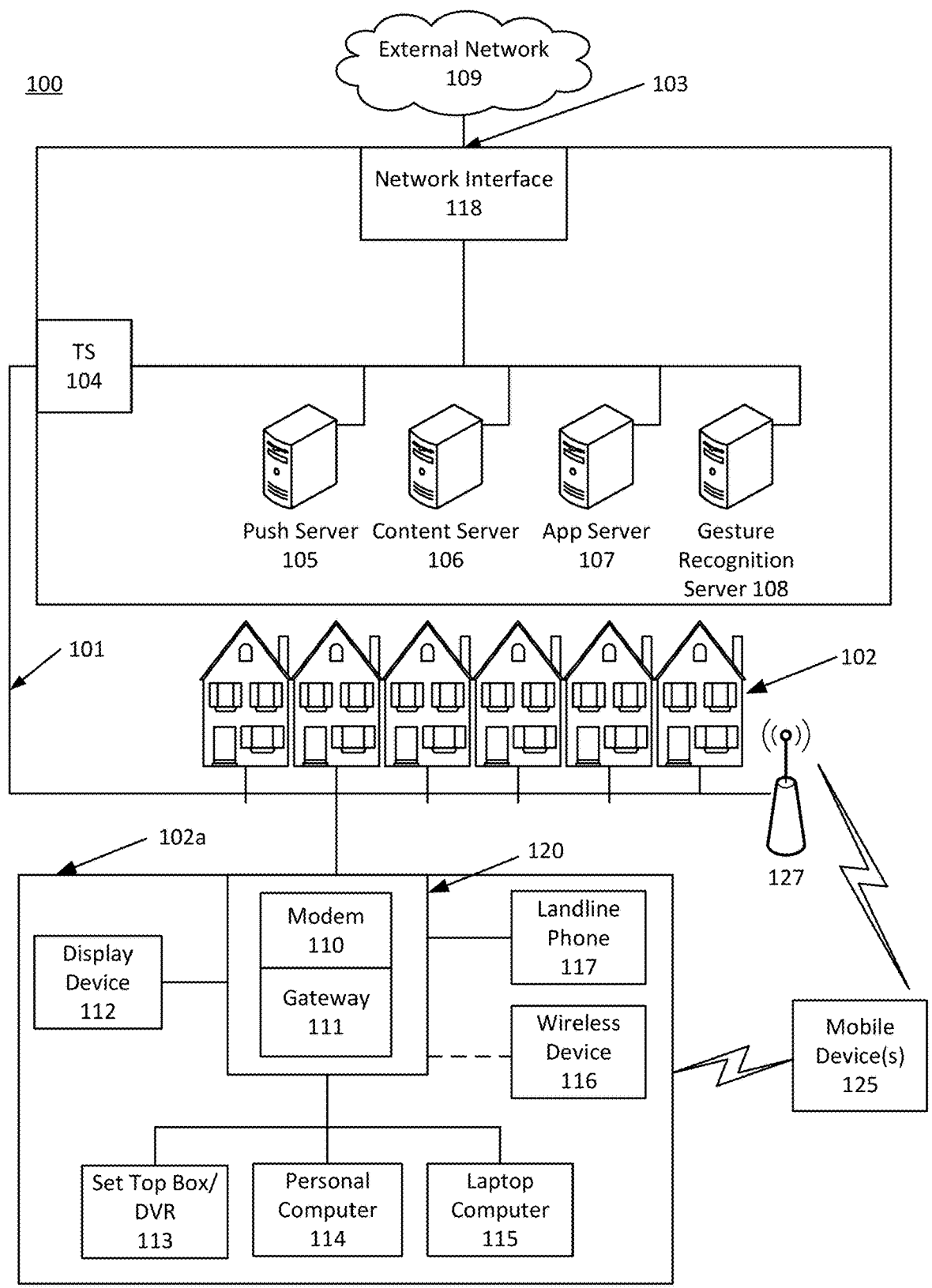
FIG. 1 shows an example of communication network in which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.)

to connect multiple premises 102 (e.g., businesses, homes, consumer dwellings, train stations, airports, etc.) to a local office 103 (e.g., a headend). The local office 103 may transmit downstream information signals onto the communication links 101, and each of the premises 102 may have a receiver used to receive and process those signals.

One of the communication links 101 may originate from the local office 103, and may be split a number of times to distribute the signal to the various premises 102 in the vicinity (which may be many miles) of the local office 103. The communication links 101 may include components not shown, such as splitters, filters, amplifiers, etc. to help convey the signal clearly. Portions of the communication links 101 may also be implemented with fiber-optic cable, while other portions may be implemented with coaxial cable, other lines, or wireless communication paths. The communication links 101 may be coupled to a base station 127 configured to provide wireless communication channels to communicate with a mobile device 125. The wireless communication channels may be Wi-Fi IEEE 802.11 channels, cellular channels (e.g., LTE), and/or satellite channels.

The local office 103 may include an interface 104, such as a termination system (TS). More specifically, the interface 104 may be a cable modem termination system (CMTS), which may be a computing device configured to manage communications between devices on the network of the communication links 101 and backend devices, such as servers 105-108 (to be discussed further below). The interface 104 may be as specified in a standard, such as the Data Over Cable Service Interface Specification (DOCSIS) standard, published by Cable Television Laboratories, Inc. (a.k.a. CableLabs), or may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 118, which can permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 118 may include the corresponding circuitry needed to communicate on the external networks 109, and to other devices on the network such as a cellular telephone network and its corresponding mobile devices 125 (e.g., cell phones, smartphone, tablets with cellular radios, laptops communicatively coupled to cellular radios, etc.).

As noted above, the local office 103 may include the servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s).

The local office 103 may also include one or more application server 107. The application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, the application server 107 may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, the content server 106, and the application server 107 may be combined. Further, here the push notification server 105, the content server 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more of the communication links 101 with other devices in the network. For example, the interface 120 may include a modem 110, which may include transmitters and receivers used to communicate on the communication links 101 and with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol (VoIP) phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at premise 102a may be configured to provide wireless communications channels (e.g., IEEE 802.11 channels) to communicate with the mobile devices 125. As an example, the modem 110 (e.g., access point) or wireless device 116 (e.g., router, tablet, laptop, etc.) may wirelessly communicate with the mobile devices 125, which may be off-premises.

As an example, the premise 102a may be train station, airport, port, bus station, stadium, home, business, or any other place of private or public meeting or congregation by multiple individuals. The mobile devices 125 may be located on the individual's person.

The mobile devices 125 may communicate with the local office 103. The mobile devices 125 may be cell phones, smartphones, tablets (e.g., with cellular transceivers), laptops (e.g., communicatively coupled to cellular transceivers), or any other mobile computing device. The mobile devices 125 may store assets and utilize assets. An asset may be a movie (e.g., a video on demand movie), television show or program, game, image, software (e.g., processor-executable instructions), music/songs, webpage, news story, text listing, article, book, magazine, sports event (e.g., a football game), images, files, or other content. As an example, the mobile device 125 may be a tablet that may store and playback a movie. The mobile devices 125 may include Wi-Fi transceivers, cellular transceivers, satellite transceivers, and/or global positioning system (GPS) components.

As noted above, the local office 103 may include a gesture recognition server 108. The gesture recognition server 108 may be configured to recognize and/or process a gesture received from a computing device, for example, received from the mobile device 125 or the gateway 111. For example, the mobile device 125 or the gateway 111 may be equipped with a camera or other device capable of detecting gestures. The camera or other device may detect a gesture and the detected gesture may be transmitted to the mobile device 125 or the gateway 111 for processing or may, alternatively or additionally, be transmitted to the gesture recognition server 108 for processing.

Figure 2:
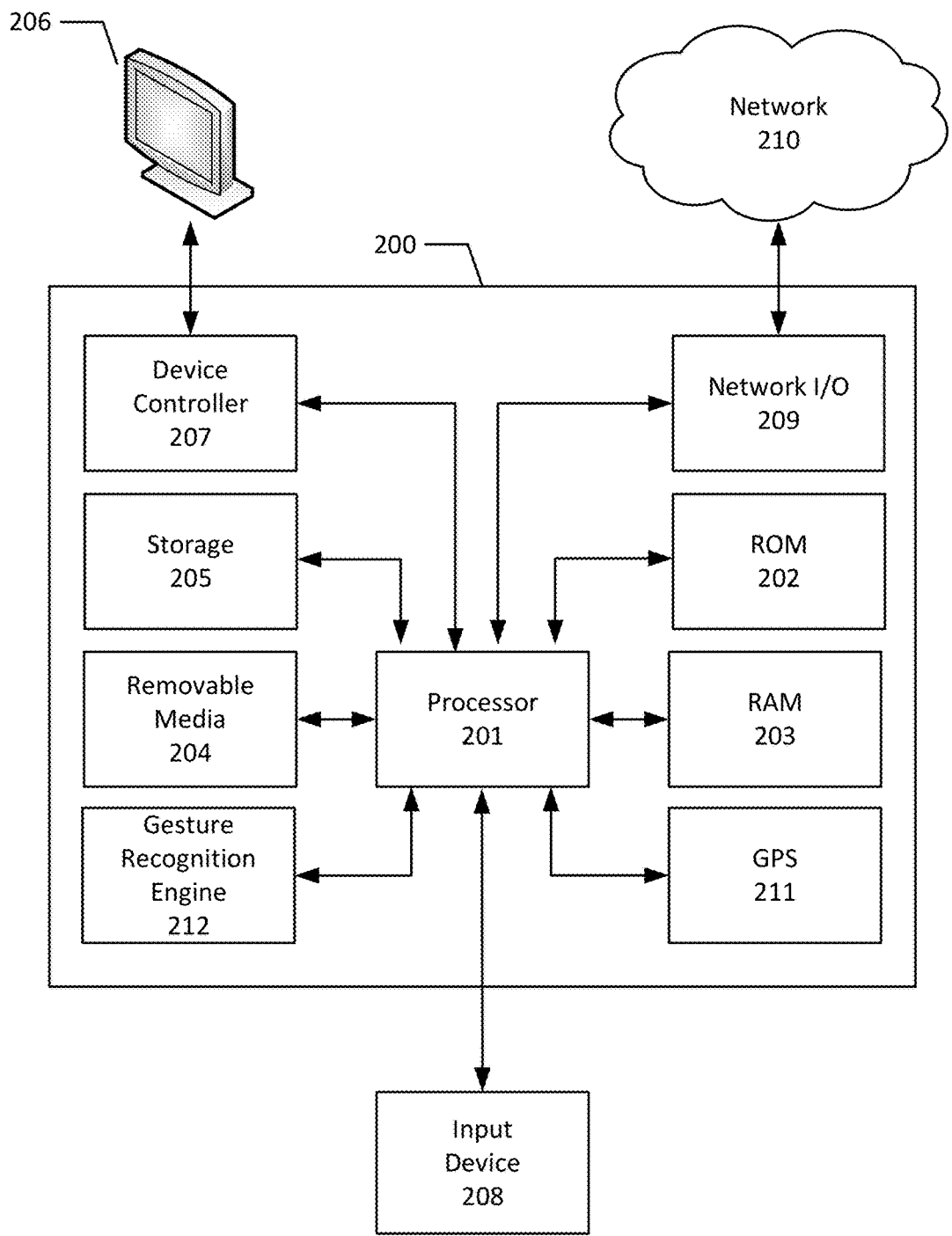
FIG. 2 shows hardware elements of an example computing device in which various features described herein may be implemented.

FIG. 2 shows general hardware elements that can be used to implement any of the various computing devices discussed herein. The computing device 200 (e.g., the set-top box/DVR 113, the mobile device 125, etc.) may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a microphone, remote control, keyboard, mouse, touch screen, a camera, a sensor device, etc. The computing device 200 may also include one or more network interfaces, such as a network input/output (I/O) circuit 209 (e.g., a network card) to communicate with an external network 210. The network I/O circuit 209 may be a wired interface, wireless interface, or a combination of the two. In some embodiments, the network I/O circuit 209 may include a modem (e.g., a cable modem), and the external network 210 may include the communication links 101 discussed above, the external networks 109, an in-home network, a provider's wireless, coaxial, fiber, or hybrid fiber/coaxial distribution system (e.g., a DOCSIS network), or any other desired network. The computing device 200 may include a location-detecting device, such as a global positioning system (GPS) microprocessor 211, which can be configured to receive and process global positioning signals and determine, with possible assistance from an external server and antenna, a geographic position of the computing device 200. The computing device 200 may additionally include a gesture recognition engine 212 which detects and recognizes gestures performed by a user. Such gestures may be received from the input device 208, such as a camera or other sensor device.

While the example shown in FIG. 2 is a hardware configuration, the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM 202, the display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

Features described herein may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. The functionality may be embodied in whole or in part in firmware or hardware equivalents such as integrated circuits, field programmable gate arrays (FPGA), or the like. Particular data structures may be used to more effectively to implement features described herein, and such data structures are contemplated within the scope of computer executable instructions and computer-usable data described herein.

Figure 3:
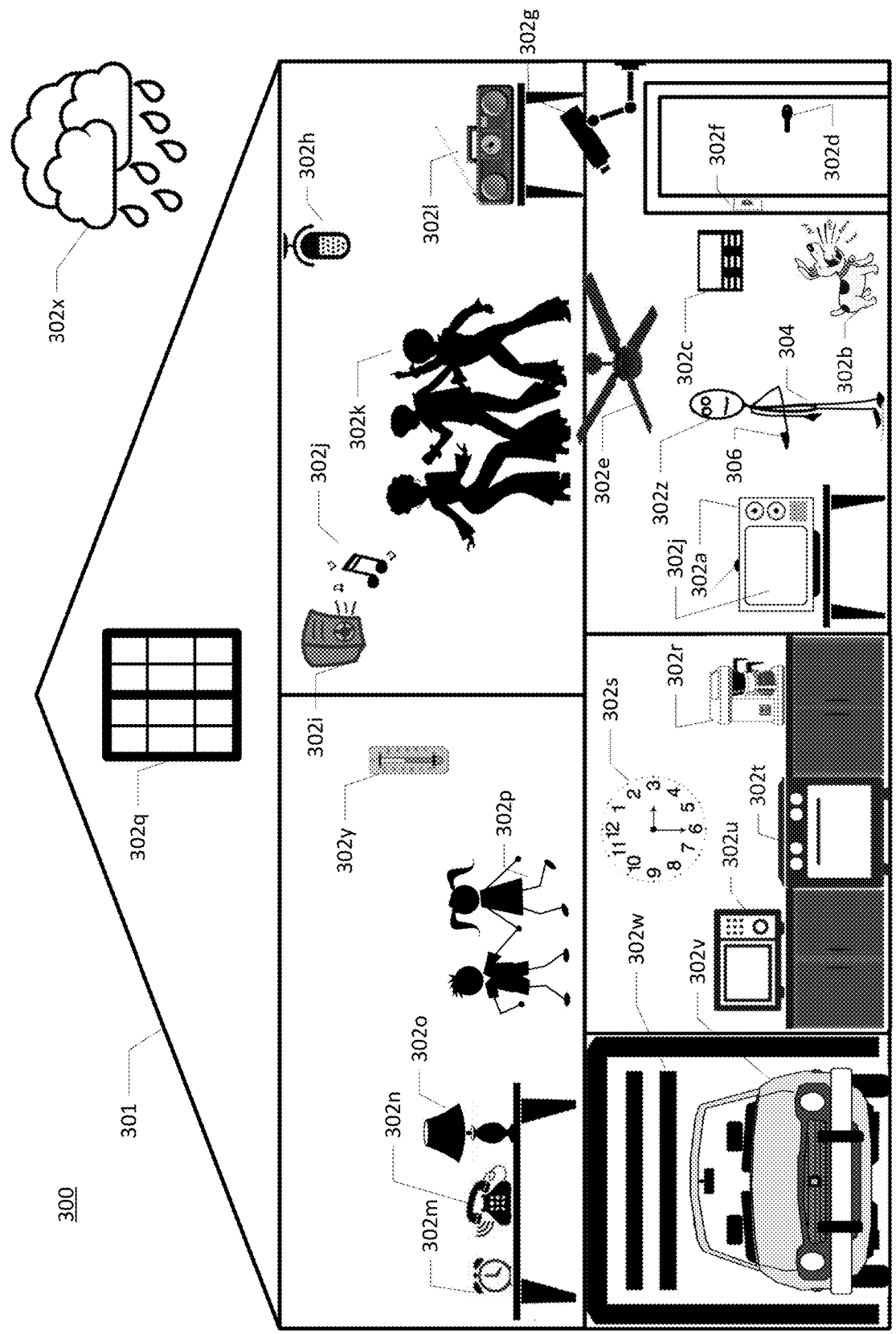
FIG. 3 shows various devices and example contextual scenarios that may be used in a gesture command execution system.
Figure 4:
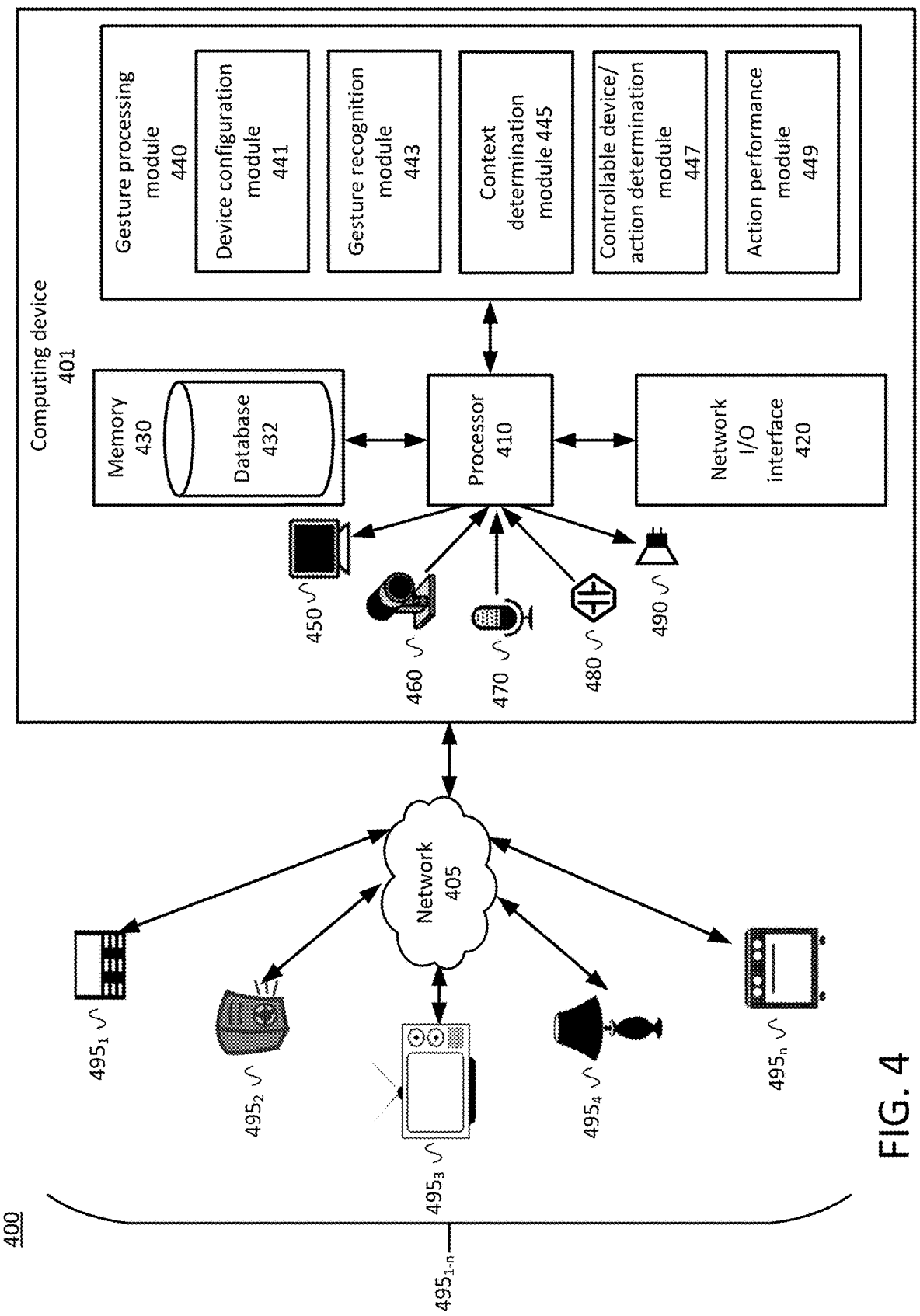
FIG. 4 shows an example configuration of a computing device that may be used in a gesture command execution system.

FIG. 3 shows various devices and example contextual scenarios that may be used by a gesture command execution system, such as gesture command execution system 400 shown in FIG. 4, in determining how to interpret a detected gesture for controlling one or more devices and/or performing one or more actions. FIG. 4 shows the gesture command execution system 400, including a network 405, an example configuration of a gesture control device, such as computing device 401, that may be used by the system to perform the various aspects described herein, and example devices, such as gesture-controllable devices $495_{1-n}$ (interchangeably referred to herein as gesture-controllable devices 495) that may be controlled by the system to perform various actions in response to detected gestures.

The computing device 401 may be used to detect a gesture performed by a user, determine a current context in which the gesture is performed, interpret the gesture in view of the current context, determine whether the gesture is likely intended by the user as a command to control a device or perform an action, and if so, determine the one or more gesture-controllable devices 495 to control and actions to perform based on the gesture, and send control commands to the determined one or more gesture-controllable devices 495 to perform the determined actions. The computing device 401 may be a computing device, such as the computing device 200, shown in FIG. 2. The computing device 401 may further be a gateway, such as the gateway interface device 111, a STB or DVR, such as STB/DVR 113, a personal computer, such as a personal computer 114, a laptop computer, such as a laptop computer 115, a wireless device, such as wireless device 116, or a mobile device, such as mobile device 125 shown in FIG. 1. The computing device 401 may further be a smartphone, a camera, an e-reader, a remote control, a wearable device (e.g., electronic glasses, an electronic bracelet, an electronic necklace, a smart watch, a head-mounted device, a fitness band, an electronic tattoo, etc.), a robot, an Internet of Things (IoT) device, a gesture detection device, etc. The computing device 401 may be one of the above-mentioned devices or a combination thereof. The computing device 401, however, is not limited to the above-mentioned devices.

The computing device 401 may comprise a processor 410, a network I/O interface 420, a memory 430, a gesture processing module 440, one or more input/output devices, such as one or more display devices 450, one or more cameras 460, one or more microphones 470, one or more sensor devices 480, and/or one or more speaker devices 490. Some, or all, of these elements of the computing device 401 may be embedded in the computing device 401 or may be implemented as physically separate devices, which may be communicatively coupled to the computing device 401.

The network 405 may comprise a local area network (LAN), a wide-area network (WAN), a personal area network (PAN), wireless personal area network (WPAN), a public network, a private network, etc.

The processor 410 may control the overall operation of the computing device 401. For example, the processor 410 may control the network I/O interface 420, the memory 430, the gesture processing module 440, the one or more display devices 450, the one or more cameras 460, the one or more microphones 470, the one or more sensor devices 480, and the one or more speaker devices 490 connected thereto to perform the various features described herein.

The network I/O interface 420, e.g., a network card or adapter, may be implemented using the network I/O circuit 209 and may be used to establish communication between the computing device 401 and external devices, such as the one or more gesture-controllable devices $495_{1-n}$. For example, the network I/O interface 420 may establish a connection to the one or more gesture-controllable devices $495_{1-n}$ via the network 405. The network I/O interface 420 may be a wired interface, a wireless interface, or a combination of the two. In some cases, the network I/O interface 420 may comprise a modem (e.g., a cable modem).

The memory 430 may be ROM, such as the ROM 202, RAM, such as the RAM 203, removable media, such as the removable media 204, a hard drive, such as the hard drive 205, or may be any other suitable storage medium. The memory 430 may store software and/or data relevant to at least one component of the computing device 401. The software may provide computer-readable instructions to the processor 410 for configuring the computing device 401 to perform the various features described herein. The memory 430 may additionally comprise an operating system, application programs, databases, such as database 432, etc. The database 432 may be a database for storing data related to the gesture command execution system 400.

The one or more display devices 450 may display various types of output. For example, the one or more display devices 450 may output one or more user interfaces for configuring the gesture command execution system 400. Any one of the one or more display devices 450 may be housed in the computing device 401 or may be a device external to and communicatively coupled with the computing device 401.

The one or more cameras 460 may capture images and/or video in two-dimensions (2D), three-dimensions (3D), or the like. The one or more cameras 460 may include, but are not limited to, video cameras, omnidirectional cameras, depth cameras, stereo cameras, or any other type of image capturing device.

The one or more microphones 470 may capture audio, such as speech, ambient/background sounds, or the like. The one or more microphones 470 may include, but are not limited to, bi-directional microphones, omnidirectional microphones, cardioid microphones, super/hyper cardioid microphones, switchable/multi-pattern microphones, or any other type of audio capturing device.

The one or more sensor devices 480 may be configured to detect a gesture performed by a user. The gesture may be a movement made by a user, such as with an appendage of the user's body (e.g., one or more fingers, hands, arms, legs), a torso of the user, the head of the user, a facial expression made by the user, or a combination of such movements. For example, a gesture may be a user pointing at a television, a user raising her arms, a user wiggling her fingers, or the like. The gesture may be a movement made by the user with a device comprising the one or more sensor devices 480, such as tilting the device back and forth, moving the device in a circle, shaking the device, etc. The gesture may be a movement made on a device comprising the one or more sensor devices 480, such as a tapping or a touch pattern. The gestures need not be limited to the described gestures and may include any other gestures detected by the one or more sensor devices 480. The one or more sensors devices 480 for detecting the gestures may include, but are not limited to, cameras, such as the one or more cameras 460, accelerometers, gyro sensors, electromyography (EMG) sensors, radar sensors, radio sensors, inertial sensors, infrared (IR) sensors, magnetic sensors, force sensitive resistor (FSR) sensors, flexible epidermal tactile sensors, LEAP MOTION sensor devices, or any other type of sensor that may be used to detect a gesture.

The one or more sensor devices 480 may include additional or different sensors and may additionally or alternatively be configured to collect information from the environment surrounding the computing device 401 and/or the environment in which a gesture is detected. For example, the one or more sensors devices 480 used for collecting information about the environment may be any one of the above-mentioned sensors or may, additionally or alternatively, be a sensor of a mobile device or a fitness bracelet, a thermostat/temperature sensor, a window sensor, a proximity sensor, a motion sensor, a biometric sensor, a vehicle seat sensor, a door sensor, an ambient light sensor, a GPS receiver, a magnetometer, a barometer, a grip sensor, a microphone, such as the one or more microphones 470, etc. The information collected from the one or more sensor devices 480 may be used to determine a context of the environment in which a gesture is detected, which may ultimately be used to interpret the meaning of the gesture (as described in further detail below). For example, a camera may detect certain movement in the environment and may be used to determine the presence of people in a room, or may detect a user pointing at a television and may be used to determine that the user is watching television; a microphone may capture audio and may be used to determine that a user is speaking or that content is being output from a speaker device, or a telephone is ringing, or a dog is barking, or the like; an accelerometer of the computing device 401 may detect acceleration of the computing device 401 and may be used to determine that the user is in a moving vehicle; a vehicle seat sensor embedded in a seat of a vehicle may detect the weight of a person and may be used to determine that the user is located in the vehicle; a biometric sensor of a fitness bracelet may detect a biometric reading of a user and may be used to determine that the user is in distress; a motion detector near an entrance door may detect movement and may be used to determine that a person is at the door; etc.

The one or more sensor devices 480 may be embedded in the computing device 401, in the gesture-controllable devices 495, in other devices, or may be stand-alone sensor devices. The one or more sensor devices 480 need not be limited to the above-mentioned devices and sensors and may include other devices or sensors that may be capable of detecting gestures and/or gathering information about the environment.

The gesture command execution system 400 may include multiple sensor devices 480 that may perform a similar task (such as multiple cameras that are capable of capturing an image/video, multiple microphones that are capable of capturing audio, multiple sensors that are capable of detecting a gesture, multiple sensors that are capable of detecting movement, or the like), and one sensor device 480 may serve as a primary sensor device for the task, while the other sensor devices 480 may serve as secondary sensor devices for the task. As an example, if there are multiple microphones located in a single room, one of the microphones may serve as a primary microphone while the other(s) may serve as secondary microphones. As another example, if there are multiple cameras in a room, one of the cameras may server as a primary camera, while the other(s) may serve as secondary cameras. The primary sensor device 480 may default to an activated (i.e., ON) state, such that by default the primary sensor device 480 is enabled (i.e., turned on) to, for example, detect a gesture or capture audio. The secondary sensor devices 480 may default to a deactivated (i.e., OFF) state, such that by default the secondary sensor devices 480 are disabled (i.e., turned off) from, for example, detecting gestures or capturing audio, or may be caused to ignore, for example, such detected gestures or captured audio. The one or more sensor devices 480 may be manually or automatically switched between enabled and disabled states. For example, a user of the gesture command execution system 400 may manually enable or disable one or more of the sensor devices 480 by engaging a switch thereon or via a remote interface for controlling the one or more sensor devices 480. Additionally or alternatively, the gesture command execution system 400 may automatically enable or disable one or more of the sensor devices 480. For example, one or more of the sensor devices 480 may be automatically enabled in response to the occurrence of certain situations, such as when an already enabled sensor device 480 is unable to properly or accurately perform its task. For instance, an enabled camera may be unable to properly or accurately detect a gesture, e.g., because it is too far away from a user performing a gesture or speaking, because it is a low resolution camera, etc.; or an enabled microphone may be unable to properly or accurately capture audio, e.g., because it is too far away from a user speaking, because it is a low fidelity microphone, etc. In such cases, the gesture command execution system 400 may automatically enable one or more of the sensor devices 480 that may be more capable of properly and accurately performing the task. For instance, the gesture command execution system 400 may enable a camera or microphone closer to the user, a higher resolution camera, a higher fidelity microphone, etc. The gesture command execution system 400 may additionally disable one or more of the sensor devices 480 in such situations, e.g., disable the sensor devices 480 that are unable to detect the gesture or capture the audio properly and accurately. The gesture command execution system 400 may automatically enable or disable one or more of the sensor devices 480 for other reasons, such as based on a current context determined by the gesture command execution system 400. The gesture command execution system 400 may automatically adjust one or more settings associated with one or more of the sensor devices 480, such as frame rate, white balance, aperture, shutter speed, resolution, ISO control, focus, etc. for a camera; or frequency, sensitivity, polar pattern, fidelity, sample rate, etc. for a microphone.

The one or more speaker devices 490 may output various types of audio. For example, the one or more speaker devices 490 may output configuration instructions, notifications, warnings, information identifying a gesture detected, etc.

The gesture-controllable devices $495_{1-n}$ may comprise any device capable of being controlled by the computing device 401. For example, the gesture-controllable devices 495 may comprise devices, such as a security system $495_1$, a speaker device $495_2$ (which may include the one or more speakers 490), a television $495_3$, a lamp $495_4$, or a stove $495_n$. The gesture-controllable devices $495_{1-n}$ need not be limited to the above-mentioned devices and may comprise other devices that may be capable of control by the computing device 401 (such as described with respect to FIG. 3). The computing device 401 may be used to control various operating functions of the gesture-controllable devices $495_{1-n}$. For example, the computing device 401 may be used to control the gesture-controllable devices $495_{1-n}$ to perform one or more actions by sending control commands to the gesture-controllable devices $495_{1-n}$, such as to control an on/off state or a setting of the gesture-controllable devices $495_{1-n}$. For example, the computing device 401 may be used to send control commands to disarm the security system $495_1$, adjust the bass on the speaker device $495_2$, turn on the television $495_3$, dim the light of the lamp $495_4$, adjust a temperature of the stove $495_n$, etc. The action may take many different forms and need not be solely related to controlling one of the gesture-controllable devices $495_{1-n}$, but may also be related to controlling the computing device 401 itself, such as adjusting a setting on the computing device 401 or performing a function on the computing device 401. A user of the gesture command execution system 400 may configure the system with a list of devices, i.e. the gesture-controllable devices $495_{1-n}$, that may be controlled by the system. Alternatively or additionally, the gesture command execution system 400 may be preconfigured with a list of the gesture-controllable devices $495_{1-n}$. The list of gesture-controllable devices $495_{1-n}$ may be stored in the database 432. The computing device 401 may be capable of controlling different gesture-controllable devices $495_{1-n}$ and performing different corresponding actions in different contexts. Further, the computing device 401 may be capable of controlling the gesture-controllable devices $495_{1-n}$ in response to gesture commands detected by the one or more sensor devices 480.

The gesture processing module 440 may be a module for causing the one or more gesture-controllable devices 495 to be controlled based on detected gestures and a context in which the gestures are detected. The gesture processing module 440 may comprise a device configuration module 441, a gesture recognition module 443, context determination module 445, a controllable device/action determination module 447, and an action performance module 449.

The computing device 401 may control the device configuration module 441 to perform one or more processes for configuring the computing device 401 with the gesture command execution system 400 for controlling one or more gesture-controllable devices 495 using gesture commands.

The computing device 401 may control the gesture recognition module 443 to monitor an environment for a gesture made by a user and detected by the one or more sensor devices 480. The gesture recognition module 443 may receive information identifying the detected gesture and determine whether the detected gesture is a gesture configured with the gesture command execution system 400 as a command for controlling one or more of the one or more gesture-controllable devices 495 to perform an action.

The computing device 401 may control the context determination module 445 to determine a current context associated with an environment in which the gesture is detected. The context may comprise observations about the state of devices, people, objects, etc. in, around, or associated with the environment in which the gesture is detected. For instance, the context may comprise the state of various devices (e.g., an on/off state, an open/closed state, a locked/unlocked state, armed/disarmed state, etc.), other information associated with usage of those devices (such as an audio volume level, an identification of a video program or of audio being output by the device, an indication of detection of the presence of individuals by the device, an identification of recognized individuals by the device, etc.), environmental measurements (e.g., temperature, ambient noise, etc.), and any other measurable aspect of the environment in which a gesture is made. The context determination module 445 may determine the current context in which the gesture is detected based on information collected by and received from a variety of devices, sensors, and/or data sources. For simplicity of description, this disclosure may refer to information, collected by the various devices, sensors, and/or data sources for determining a current context, as state information of the device from which it is collected.

Referring to FIG. 3, in an environment in which the gesture is detected, such as in or around a home or premises 301 of a user 304, there may be a variety of devices and/or sensors that may provide data for determining the current context. These devices may be referred to herein as contextual data sources or contextual data source devices or collection devices and may be the same as or similar to the one or more sensor devices 480. The environment where the gesture may be performed or detected need not be limited to a premises 301, such as a home of the user 304, but may include other locations as well, such as inside a vehicle 302*v*, on a bus, a train, a plane, etc., at a user's 304 workplace, in a store, in an outdoor setting, or the like.

For example, as shown in FIG. 3, the premises 301 may include one or more cameras, such as video camera 302*g*, which may detect certain movement in or around the premises 301 and may be used, for example, to determine the presence of people in a room, such as children 302*p*, activities occurring in the room, such as individuals having a party 302*k*, a user 304 watching television 302*a*, the user 304 performing a gesture 306, such as pointing at the television 302*a*, an emotional state 302*z* of the user 304, or the like.

The premises 301 may include one or more microphones, such as microphone 302*h*, which may detect speech from the user 304, audio indicative of individuals having the party 302*k*, content output 302*j* in the environment, such as from a program being played by the television 302*a*, STB, or DVR, music being output from the speaker device 302*i* or the music player 302*l*, the sound from a doorbell 302*f*, an alarm 302*m*, or a telephone 302*n* ringing, alerts or alarms output by a security system 302*c*, background noise 302*b*, such as a dog barking, or the like.

The premises 301 may include other sensors 480, such as a sensor 480 attached to an exterior or interior door 302*d*, a window 302*q*, a garage door 302*w*, or the like, which may detect a state of the window or door, such as opened, closed, locked, and/or unlocked; or a temperature sensor or a thermostat 302*y* that may detect the temperature in or around the premises 301; or a motion detector near an door, for example, may detect movement and may be used to determine that a person is at the door.

Various other contextual data sources in or around the premises 301 may be used to determine a current context. For example, a seat sensor embedded in a seat of a vehicle 302*v* may detect the weight of a person and may be used to determine that the user 304 is in the vehicle 302*v*. An accelerometer embedded in a mobile device carried by the user 304 may detect acceleration of the device and may be used to determine that the user 304 is moving and a speed of the movement, such as to determine that the user 304 is likely in a moving vehicle. A biometric sensor of a fitness bracelet worn by the user 304 may detect a biometric reading of the user 304 and may be used to determine that the user 304 is in distress. A GPS receiver may detect a location of a device associated with the user 304, such as a mobile device carried by the user 304, and may be used to determine a location of the user 304.

The current context need not be determined solely using sensor data and may additionally be determined using various forms of data. For instance, data such as the date and/or time 302*s* may be used to determine the current context. Data indicating an operational state of the computing device 401 or one of the gesture-controllable devices 495 (such as the television 302*a*, the security system 302*c*, a ceiling fan 302*e*, a stove 302*t*, a coffee maker 302*r*, a lamp 302*o*, a microwave 302*u*, etc.)

may be used to determine the current context. A battery level or cellular signal strength of the computing device 401 or one of the gesture-controllable devices 495 may be used to determine the current context. Data collected from a gateway or a network (e.g., network 405) to which the computing device 401 is connected may be used to determine, for example, the location of the computing device 401 (e.g., the computing device 401 may be connected to a home network or a work network and the computing device 401 may store information related to geographic locations associated with various networks) or other devices connected to the gateway/network 405. A television program schedule (such as a schedule of programs currently being broadcast or scheduled to be broadcast) may be used to determine the current context. A calendar schedule associated the user 304, an application being executed on a device associated with the user 304, a web browsing history associated with the user 304, information about the user 304, such as stored in a user profile, such as age, gender, level of authorization of the user 304 within the gesture command execution system 400, device preferences of the user 304, a learned pattern of the user 304 (such as movement patterns within the premises 301, exit/entry times from the premises 301, preferred devices within the premises 301, preferred content, etc.), or the like, may be used to determine the current context.

Data associated with an environment external to where a gesture is being performed may additionally be used to determine the current context. For example, data may be received from a database, device, server, data source, etc. external to the environment in which the gesture is being performed to determine the current context based on external conditions, such as weather conditions 302x, traffic conditions, or any other external condition.

Determining the current context may be useful in interpreting the meaning of a detected gesture with respect to which of the gesture-controllable devices the user intends to control and which particular action is intended to be performed in response to detecting the gesture. For instance, in some contexts, such as when the user is in the living of the premises 301 facing the television 302a, the gesture of a user raising his arms may mean that the user wants the television 302a to be turned on. While in other contexts, such as when the user is watching television and the there is significant background noise 302b, such as a barking dog, and the user has a facial expression 302z that suggests frustration, the gesture of the user raising his arms may mean to turn the volume of the television 302a up. Still in other contexts, such as when the user is watching a sporting event and raises his arms in excitement when his team scores, the gesture may have no meaning as it relates to controlling any of the gesture-controllable device 495, the user may simply be expressing excitement regarding the sporting event.

Accordingly, referring back to FIG. 4, the computing device 401 may further control the gesture recognition module 443 to determine, based on the current context, whether the detected gesture is likely intended by the user performing the gesture as a command to cause one or more of the one or more gesture-controllable devices 495 to be controlled. The gesture recognition module 443 may determine whether the gesture is likely intended as a command to control one or more of the gesture-controllable devices 495 based on whether the detected gesture satisfies a gesture recognition threshold. The gesture recognition threshold may be set at the time the gesture is configured and may be related to an aspect or characteristic of the gesture, such as an orientation of the gesture, a speed at which the gesture is performed, a length of time the gesture is performed, a distance of the gesture from a particular device, or any other aspect of the gesture that is capable of being measured. As an example, where the gesture is an "arms raised gesture" and the gesture recognition threshold is related to an orientation of the gesture, such as a position or angle of the user's arms relative to their shoulders, the gesture recognition threshold may be set to a number of degrees, e.g., 15 degrees—requiring that the user's arms form an angle of at least 15 degrees relative to their shoulders for the gesture to be recognized as the "arms raised gesture." As another example, where the gesture is an "arms raised gesture" and the gesture recognition threshold is related to a length of time the gesture is performed, the gesture recognition threshold may be set to a quantity of time, e.g., 3 seconds—requiring the user to perform the gesture for at least 3 seconds for the gesture to be recognized as the "arms raised gesture." The gesture recognition module 443 may adjust the gesture recognition threshold based on the current context (described below in further detail). For example, the gesture recognition threshold used for determining whether a gesture should be recognized as a control command may be raised as a result of the current context—for instance, requiring that the user's arms be positioned at least 30 degrees relative to their shoulders instead of 15 degrees, or requiring that the gesture be performed for 6 seconds instead of 3 seconds, in order for the gesture to be recognized as the "arms raised gesture." The gesture recognition module 443 may determine whether the detected gesture satisfies the adjusted threshold.

If the detected gesture satisfies the gesture recognition threshold, the gesture processing module 440 may control the controllable device/action determination module 447 to determine which of the one or more gesture-controllable devices 495 the detected gesture is intended to control and the corresponding action or actions that are to be performed in response to the detected gesture. In some cases, the detected gesture may be used to control gesture-controllable devices 495 in proximity to where the gesture is performed, such as gesture-controllable devices 495 in a same room in which the user performing the gesture is located, and in other cases, the detected gesture may be used to control gesture-controllable devices 495 located remotely from where the gesture is performed, such as in another room, another premises, another location, etc.

The computing device 401 may thereafter control the action performance module 449 to control the determined one or more gesture-controllable devices 495 to perform the determined action or actions by sending one or more control commands to the determined one or more gesture-controllable devices 495.

The various aspects of the gesture command execution system 400 may be described in further detail by reference to FIGS. 5, 6A-6B, 7A-7K, 8A-8B, 9, and 10A-10H.

Figure 5:
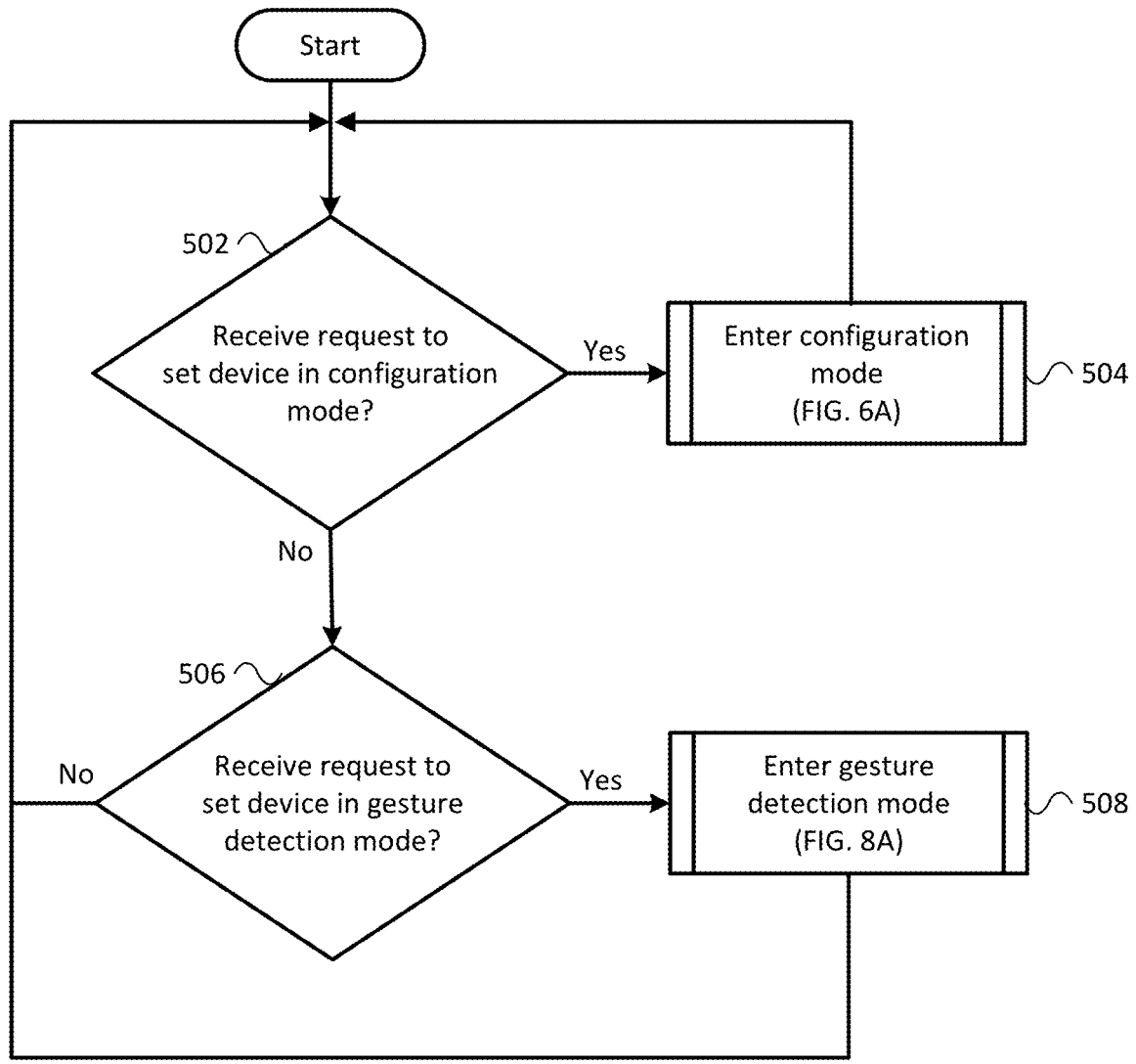
FIG. 5 shows a flowchart of an example method of a computing device that may be used in a gesture command execution system.

FIG. 5 is a flowchart of an example of a gesture command execution process. The process may be performed by any desired computing device, which may serve as a gesture control device, such as the computing device 401 used in the gesture command execution system 400. FIGS. 7A-7K show example user interfaces for use in the gesture command execution system 400.

Referring to FIG. 5, at step 502, a determination may be made as to whether a request has been received to enter into a configuration mode. The request to enter the configuration mode may occur by default upon an initial use of a gesture control device, such as the computing device 401, such as when the device is initially plugged in or powered on. Alternatively or additionally, a user interface may be displayed on a display, such as the display device 450, after the computing device 401 is plugged in or powered on, and the user interface may receive an input for requesting entry into the configuration mode. The user interface may, alternatively or additionally, be accessed via a soft key displayed on the display device 450 or via a hard key disposed on an external surface of the computing device 401. For example, referring to FIG. 7A, a user interface screen 700A may be displayed on the display device 450, after the computing device 401 is powered on or after a soft or hard key on the computing device 401 is pressed. The user interface screen 700A may display a main menu having an option 702 for configuring the gesture command execution system 400. The user may select the option 702 to enter into the configuration mode.

Figure 6A:
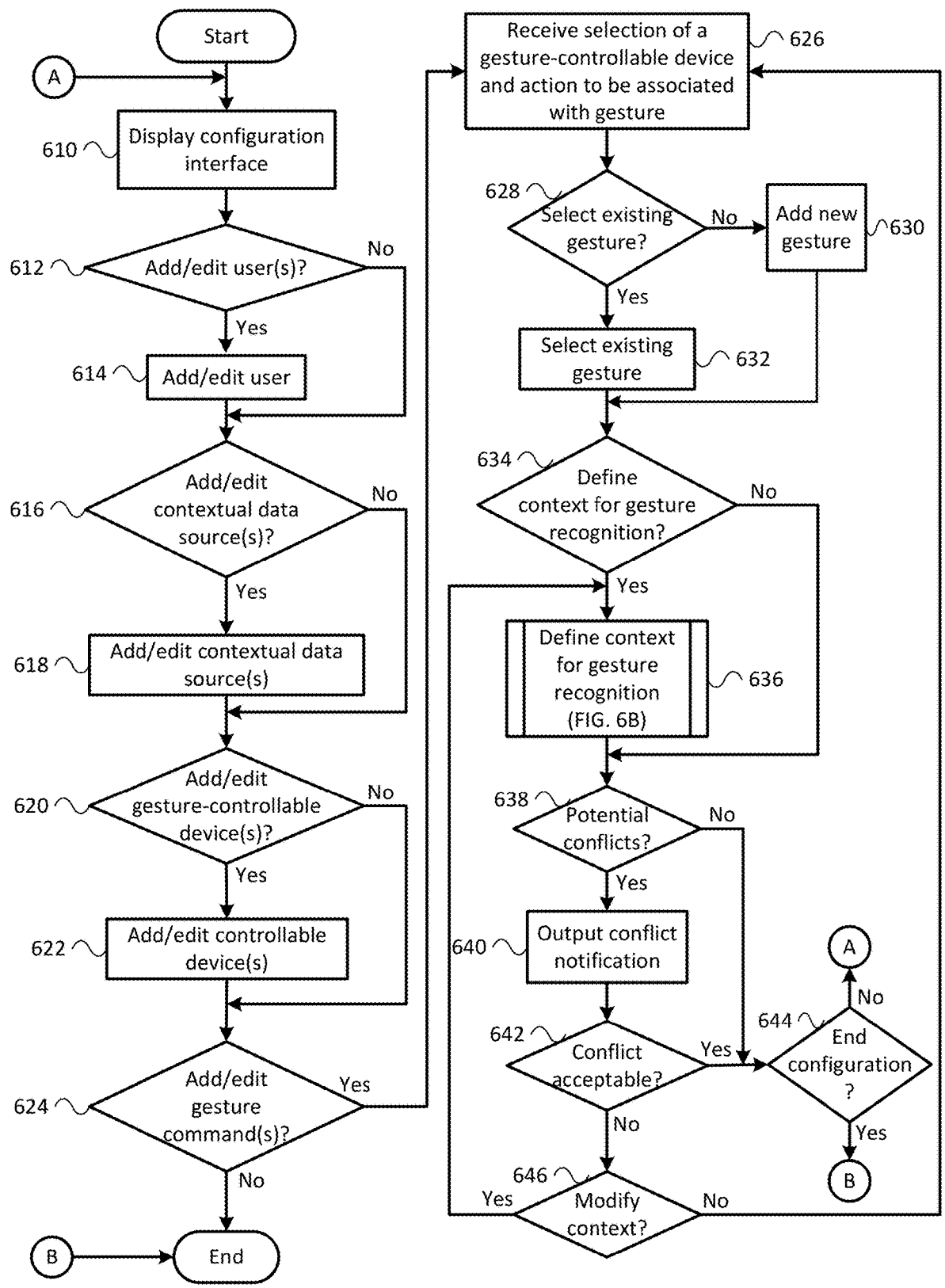
FIGS. 6A-6B show flowcharts of example methods of configuring a computing device for use in a gesture command execution system.
Figure 6B:
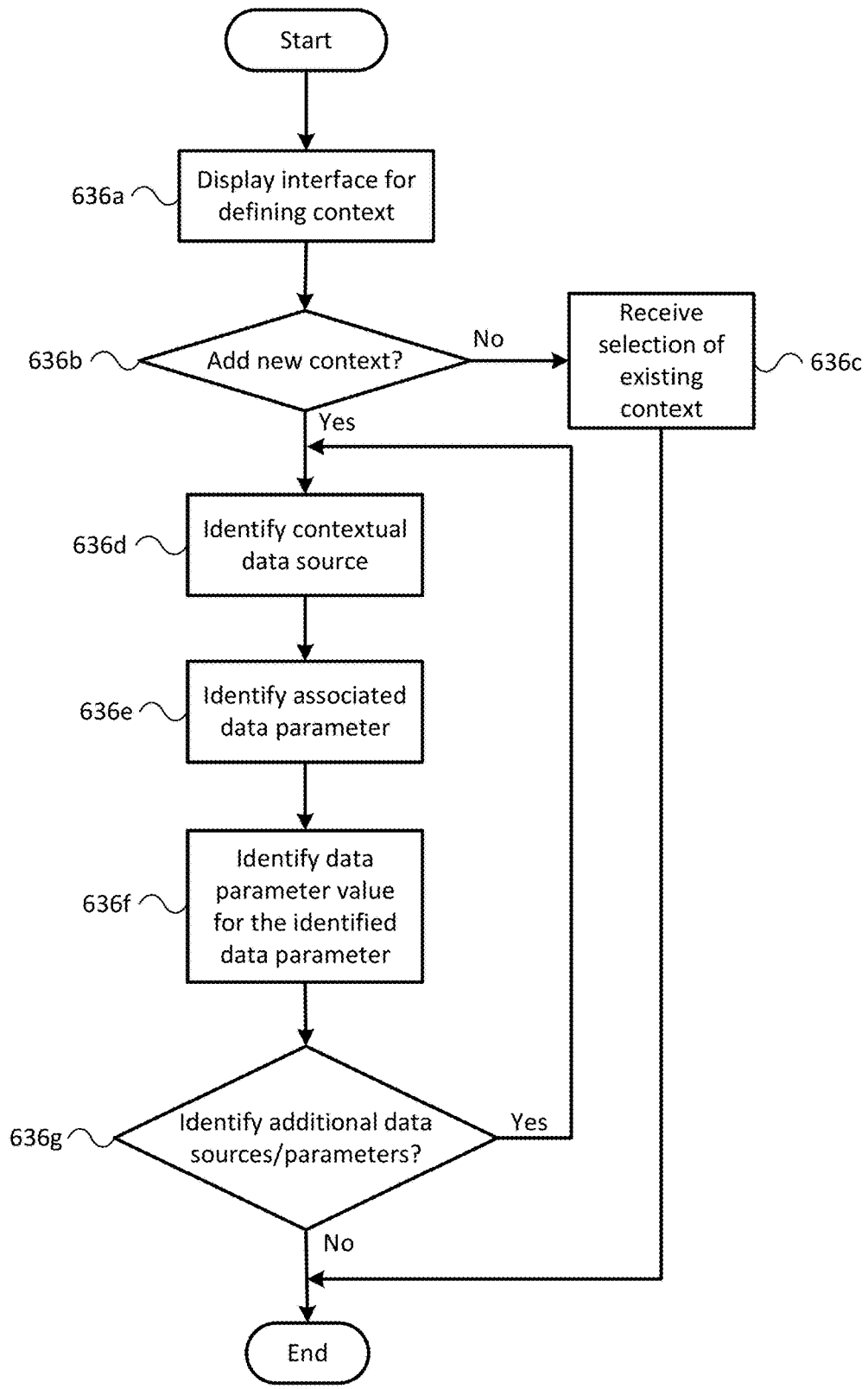

Referring back to FIG. 5, if the request to enter into a mode for configuring the gesture command execution system 400 is received, then at step 504, the configuration mode may be entered into (the configuration mode process is described with respect to FIGS. 6A-6B).

If a request to enter into a mode for configuring the gesture command execution system 400 is not received at step 502, then at step 506, a determination may be made as to whether a request has been received to enter into a gesture detection mode. The request to enter into the gesture detection mode may occur by default after the device is plugged in or powered on, e.g., where the computing device 401 has previously been configured. For example, during the configuration process, a setting may be enabled that causes the computing device 401 to thereafter default to the gesture detection mode upon being powered on or plugged in. Alternatively or additionally, a user interface may be displayed on a display, such as the display device 450, after the computing device 401 is plugged in or powered on, and the user interface may receive an input for requesting that the gesture detection mode be entered into. The user interface may, alternatively or additionally, be accessed via a soft key displayed on the display device 450 or via a hard key disposed on an external surface of the computing device 401. For example, referring back to FIG. 7A, the user interface screen 700A may display an option 704 for entering into a gesture detection mode. The user may select the option 704 to enter into the gesture detection mode.

Figure 8A:
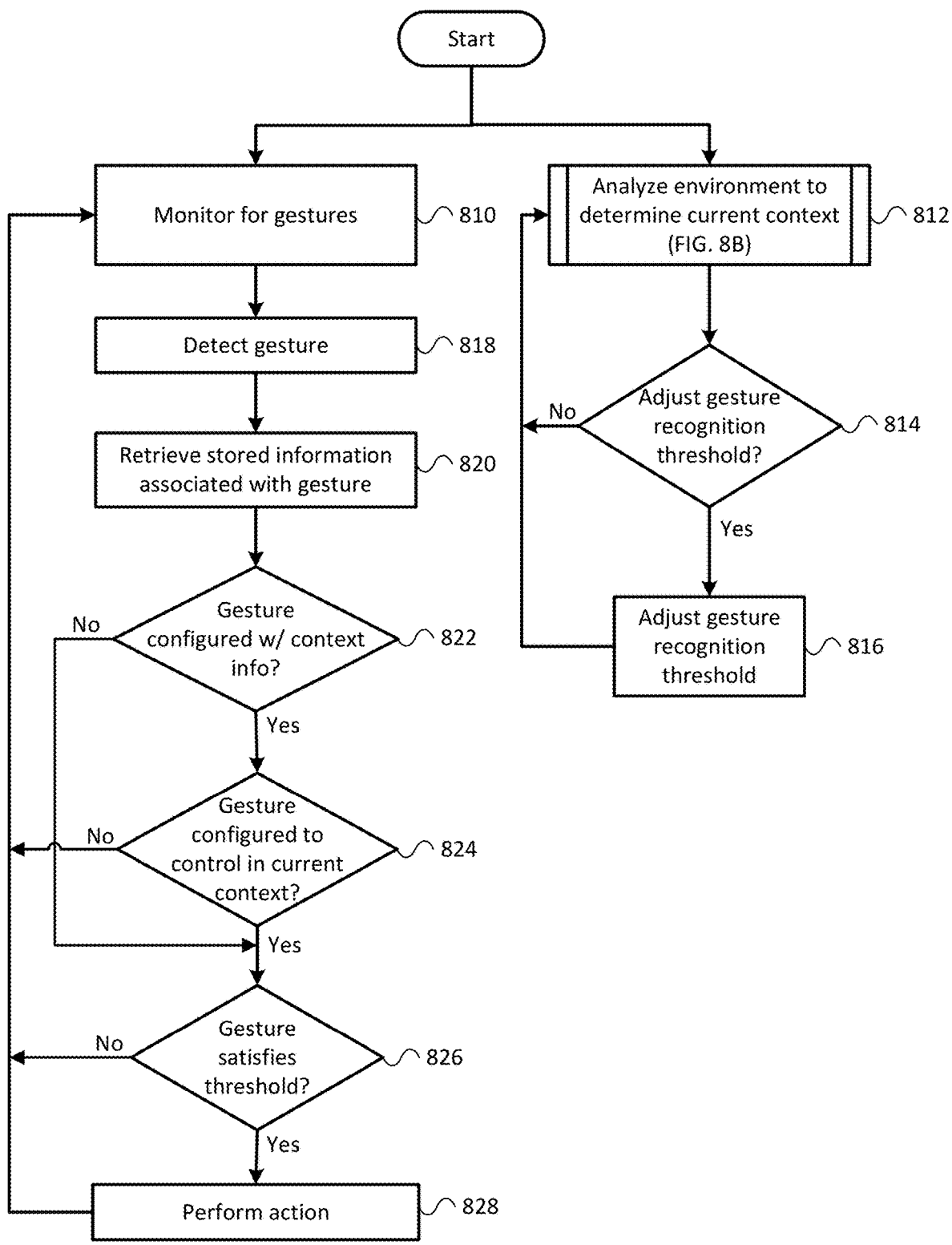
FIGS. 8A-8B show flowcharts of example methods of a computing device that may be used for controlling devices using gestures in a gesture command execution system.
Figure 8B:
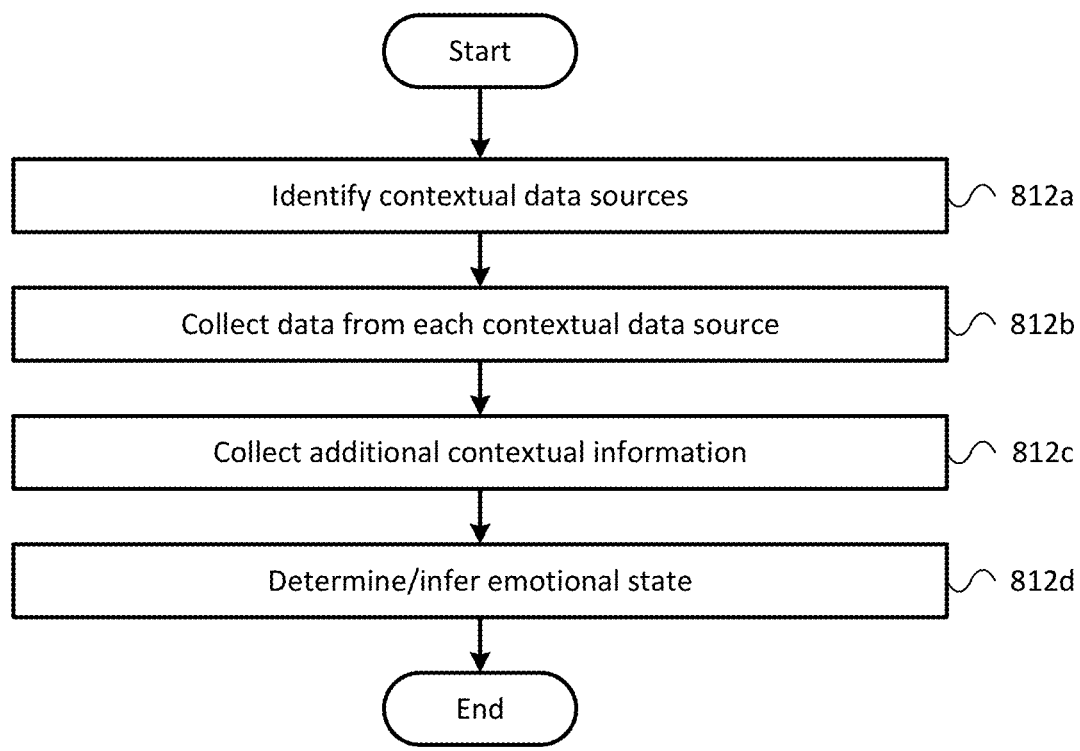

Referring back to FIG. 5, if the request to enter into the gesture detection mode is received, then at step 508, the gesture detection mode may be entered into to begin monitoring for, detecting, and processing gestures in accordance with the methods described herein (the gesture detection mode process is described with respect to FIGS. 8A-8B).

If the request to enter the gesture detection mode is not received at step 506, the method may return to step 502 and may again determine whether the request for entering the configuration mode is received. Alternatively, if the request to enter the gesture detection mode is not received at step 506, the process may end (not shown).

FIGS. 6A-6B are flowcharts of an example of a gesture command execution configuration process. The process may be performed by any desired computing device, which may serve as a gesture control device, such as the computing device 401 used in the gesture command execution system 400.

Referring to FIG. 6A, at step 610, a user interface may be displayed for allowing a user to configure the gesture command execution system 400. For example, the computing device 401 may control the device configuration module 441 to display a user interface for allowing a user to configure the gesture command execution system 400. For example, referring to FIG. 7B, a user interface screen 700B may be displayed, such as on the display device 450. The user interface screen 700B may display a menu for selecting various options for configuring the gesture command execution system 400. The menu may provide an option 706 to add or edit users, an option 708 to add or edit contextual data sources, an option 710 to add or edit gesture-controllable devices, and an option 712 to add or edit gesture commands.

Referring back to FIG. 6A, at step 612, a determination may be made as to whether a request to register a user with the gesture command execution system 400 is received. For example, the computing device 401 may control the device configuration module 441 to determine whether a request to register a user with the gesture command execution system 400 is received. For example, referring to FIG. 7B, a determination may be made as to whether a selection of option 706 for adding a new user or editing an existing user is received via the user interface screen 700B. That is, an individual may be registered to be authorized to use the gesture command execution system 400. Registering the individual as a user may mean that the user may be able to manage and further configure the gesture command execution system 400 and/or may be able to control one or more of the gesture-controllable devices 495 using gestures. For instance, in some cases, only registered uses may be recognized for the purpose of controlling the gesture-controllable devices 495 using gestures. In this case, any gesture performed by a visitor to a user's premises, who is not registered as a user of the gesture command execution system 400, may simply be ignored and not used to control any of the gesture-controllable devices 495 in the premises 301.

If a selection for adding or editing a user is received, the method may proceed to step 614, otherwise, the method may proceed to step 616.

At step 614, information for registering a new user with the gesture command execution system 400 or editing an existing user may be received. For example, the device configuration module 441 may receive information for registering a new user with the gesture command execution system 400 or for editing an existing user. For example, referring to FIG. 7C, a user interface screen 700C may be displayed on the display device 450. The user interface screen 700C may be for registering a new user to be authorized to manage and/or use the gesture command execution system 400 or for editing information associated with an existing user. The user interface screen 700C may be used to receive user profile information related to the user being registered/edited, such as the user's name 714, gender 716, age 718, system authorization level 720, weight/height or other information for identifying the user, such as an image of the user, a sample of the user's voice, etc. The system authorization level 720 may correspond to the level of control the user may have over the computing device 401 and/or the various gesture-controllable devices 495. The system authorization level 720 may also determine a user's ability to further configure or manage the gesture command execution system 400. The system authorization level 720 may be classified as high, medium, and low. A high authorization level may allow the user full control of the gesture command execution system 400 and/or the various gesture-controllable devices 495, and may allow the user to further configure or manage the gesture command execution system 400. A medium authorization level may allow the user some, but not full, control of the gesture command execution system 400 and/or the various gesture-controllable devices 495 and may prevent the user from configuring or managing some or all features of the gesture command execution system 400. A low authorization level may allow the user only very limited or, in certain cases, no control of the gesture command execution system 400 and/or the various gesture-controllable devices 495. The system authorization level 720 may use a scheme different from a high, medium, and low scheme. For example, the system authorization level 720 may use a numerical scheme, such as values ranging from 1 to 3 or a different range of values.

The user profile information may also be used in the context determination. For instance, a context related to the age of users watching television may be defined, so that in the case, for example, that a determination is made that only children are watching television and no adults are present, a gesture command received from one of the children for controlling the television 302a or an associated set-top box to make a video-on-demand purchase or to turn the channel to an age-inappropriate channel may be ignored as it may not be applicable for the user due to her age—thus restricting the child's ability to control the television 302a using a gesture command. Similarly, a user having a low authorization level may be restricted from controlling the gesture command execution system 400 or the gesture-controllable devices 495 from performing certain actions. The user profile information that may be collected might not be limited to the information shown in FIG. 7C, and may include other profile information related to the user. For example, additional profile information related to the user may be collected using the advanced settings 722. The advanced settings 722 may be used, for example, to register a device, such as a smartphone, a wearable device, etc. that the user may use to perform the features described herein. Multiple devices associated with a particular user may be registered in the system to perform the features described herein.

The user interface screen 700C may additionally provide an option 724 for performing a calibration process to record and learn the user's face, voice, and/or movement patterns. The user, upon selection of option 724, may be instructed to go about normal activities in a proximity of a device that may be used to detect the user's gestures, such as the computing device 401 or one of the one or more sensor devices 480, and the manner in which the user typically moves may be captured and analyzed. For instance, captured data indicating the manner in which the user uses her hands or arms when in typical conversation, whether the user typically uses head motions when talking, whether the user exhibits any physical conditions which may be reflected in the user's movement patterns (such as physical conditions that may cause involuntary movements), etc. may be analyzed. Other behavior patterns of the user may additionally be captured during the calibration process, such as a typical facial expression held by the user while performing various activities, the user's expressions when exhibiting certain emotions, such as excitement, frustration, sadness, etc., the user's voice, the user's typical speech pattern, such as a typical pitch or volume of the user's voice, or the like. Based on the information collected during the calibration process, the device configuration module 441 may determine a default gesture recognition threshold for the user. The default gesture recognition threshold may be related to an aspect or characteristic of a gesture, such as an orientation of a gesture, a speed at which a gesture is performed, a length of time a gesture is performed, a distance of a gesture from a particular device, or any other measurable aspect of a gesture. For instance, if the calibration process reveals that the user is one who typically uses their hands when talking, a default gesture recognition threshold associated with the length of time the gesture may need to be performed in order to be recognized as a command may be set higher for the user than perhaps for one who does not use their hands when talking. In this way, the user who typically uses their hands when talking would be required to more intentionally perform a gesture command, such as for a longer period time, in order for it to be recognized as a command. In this way, inadvertent gestures made by the user when the user is simply talking and using a lot of hand and/or arm motions may not inadvertently trigger control of a device. While an initial calibration process may be performed upon configuration of the gesture command execution system 400, the system may also employ various machine learning techniques to further learn, over time as the user regularly uses the system, the user's movement and/or other behavior patterns. In this way, the system may be further calibrated, and the default gesture recognition threshold for the user further adjusted over time. The gesture recognition threshold may additionally be further adjusted by the user manually. After the registration of the user is complete, information related to the registration may be stored in the database 432 and the method may return to the configuration menu on user interface screen 700B shown in FIG. 7B.

At step 616, a determination may be made as to whether a selection for adding or editing one or more contextual data sources is received. For example, the device configuration module 441 may determine whether a selection for adding or editing one or more contextual data sources is received. For instance, referring back to FIG. 7B, a determination may be made as to whether a selection of option 708 for adding or editing contextual data sources is received via the user interface screen 700B. The selection to add or edit contextual data sources may be for identifying and adding to the gesture command execution system 400, or editing information associated with, devices that may be used to monitor the environment to determine the current context, such as the video camera 302g, a motion detector, the microphone 302h, the television 302a, the thermostat 302y, etc., or other data sources that may be used to provide information related to the environment. The contextual data source devices may be one or more of the sensor devices 480, one or more of the gesture-controllable devices 495, the computing device 401, or other devices. Other contextual data sources may include, for example, databases, servers, files, or computing devices that may provide information related the environment, such as weather or traffic information.

If a selection for adding or editing one or more contextual data sources is received, the method may proceed to step 618, otherwise the method may proceed to step 620.

At step 618, one or more new contextual data sources may be added for use in the gesture command execution system 400 or existing ones may be edited. For example, to add one or more new contextual data source devices, the user may cause the device configuration module 441 to identify one or more available devices in the user's environment that may be used to monitor the environment to determine the current context. For instance, referring to FIG. 7D, a user interface screen 700D may be displayed, such as on the display device 450. The user interface screen 700D may be for identifying and enabling one or more contextual data source devices that may be available for use in monitoring the environment for determining the current context, or for editing an existing contextual data source device used by the gesture command execution system 400. The user interface screen 700D may provide a button 726 used to initiate a device discovery process for identifying available devices that are capable of collecting data for determining a current context. The device discovery process may identify devices in any number of ways, such as wirelessly by identifying devices which are connected to a network to which the computing device 401 is connected, such as the network 405, determining devices within a certain range or proximity of the computing device 401 using communication protocols such as Bluetooth, Zigbee, Wi-Fi Direct, near-field communication (NFC), etc. The device discovery process may identify a device having a wired connection to the computing device 401. Alternatively or additionally, a user may manually enter identification information for a contextual data source device. A list 728 of the identified devices may be displayed on the user interface screen 700D. A selection may be received through the user interface screen 700D, such as via a button 730, to enable one or more of the identified devices as contextual data source devices.

The user interface screen 700D may additionally be for adding or editing other contextual data sources that may provide information about the environment. For instance, the user interface screen 700D may include additional options (not shown) for receiving information to identify a location of such data sources. The location may be local, such as the memory 430 or database 432 of the computing device 401 or a networked device, and the user may provide a local or remote file path to the source. Alternatively or additionally, the location may be external from the computing device 401, such as an external device, server, database, etc., and the user may provide an appropriate address to the source, such as a uniform resource locator (URL), an IP address, etc. Once added and/or enabled, information associated with a contextual data source may be edited to change a location, a name (such as to provide a meaningful and/or user-friendly name for the device, such as "TV camera" or "Front door motion detector"), etc. or may be removed and/or disabled to discontinue use for determining a current context. After the user has completed adding or editing the contextual data sources, information identifying the contextual data sources may be stored in the database 432, and the method may return to the configuration menu on user interface screen 700B.

At step 620, a determination may be made as to whether a selection for adding or editing one or more gesture controllable devices 495 is received. For example, the device configuration module 441 may determine whether a selection for identifying one or more gesture-controllable devices 495 is received. For instance, referring back to FIG. 7B, a determination may be made as to whether a selection of option 710 for adding or editing gesture-controllable devices 495 is received via the user interface screen 700B. The selection to add or edit gesture-controllable devices 495 may be for identifying and adding new devices to the gesture command execution system 400, that may be controlled by the system using gestures, such as a set-top box, a television 302a, a lamp 302o, a security system 302c, etc., or for editing existing ones.

If a selection for adding or editing one or more gesture-controllable devices 495 is received, the method may proceed to step 622, otherwise the method may proceed to step 624.

Figure 7A:
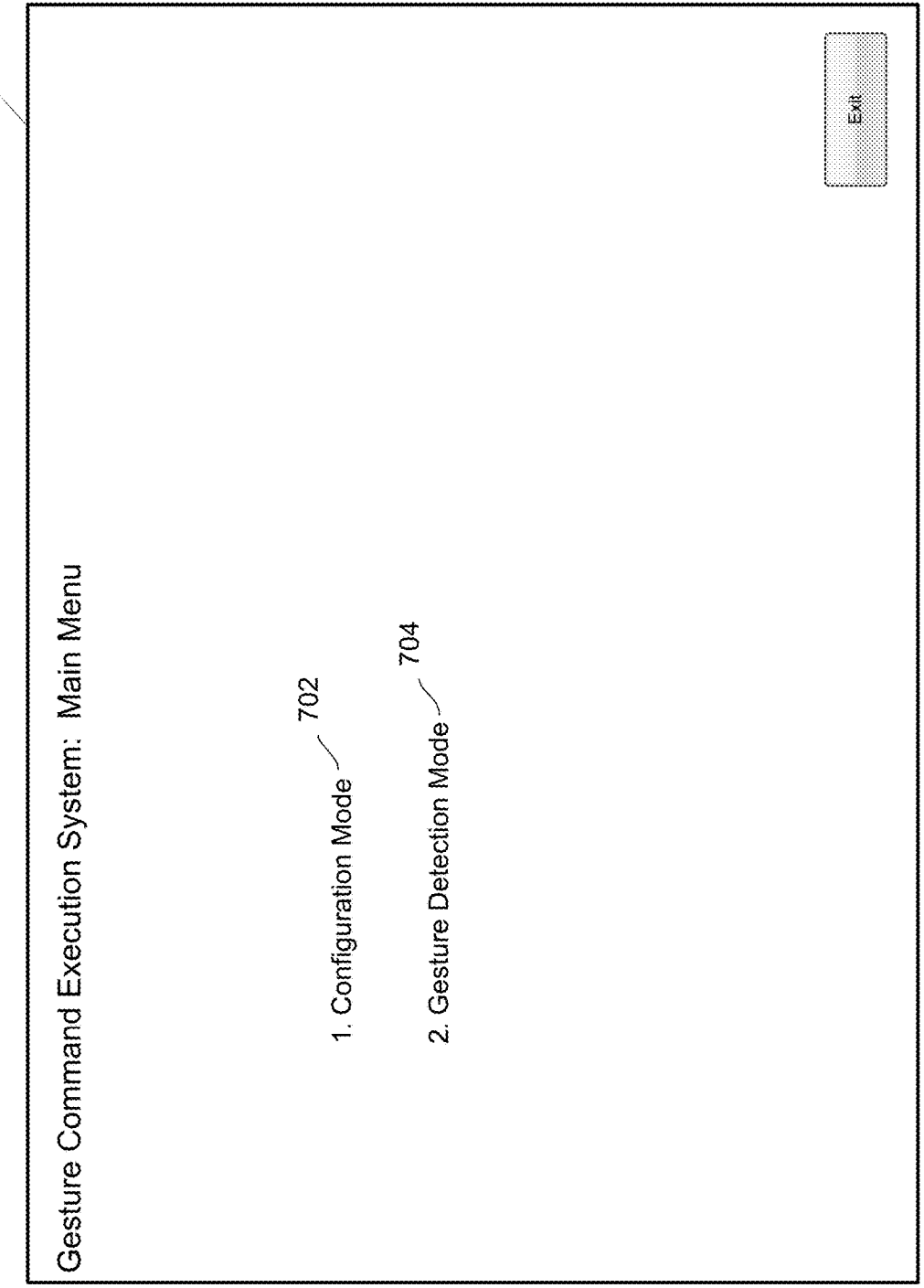
Figure 7B:
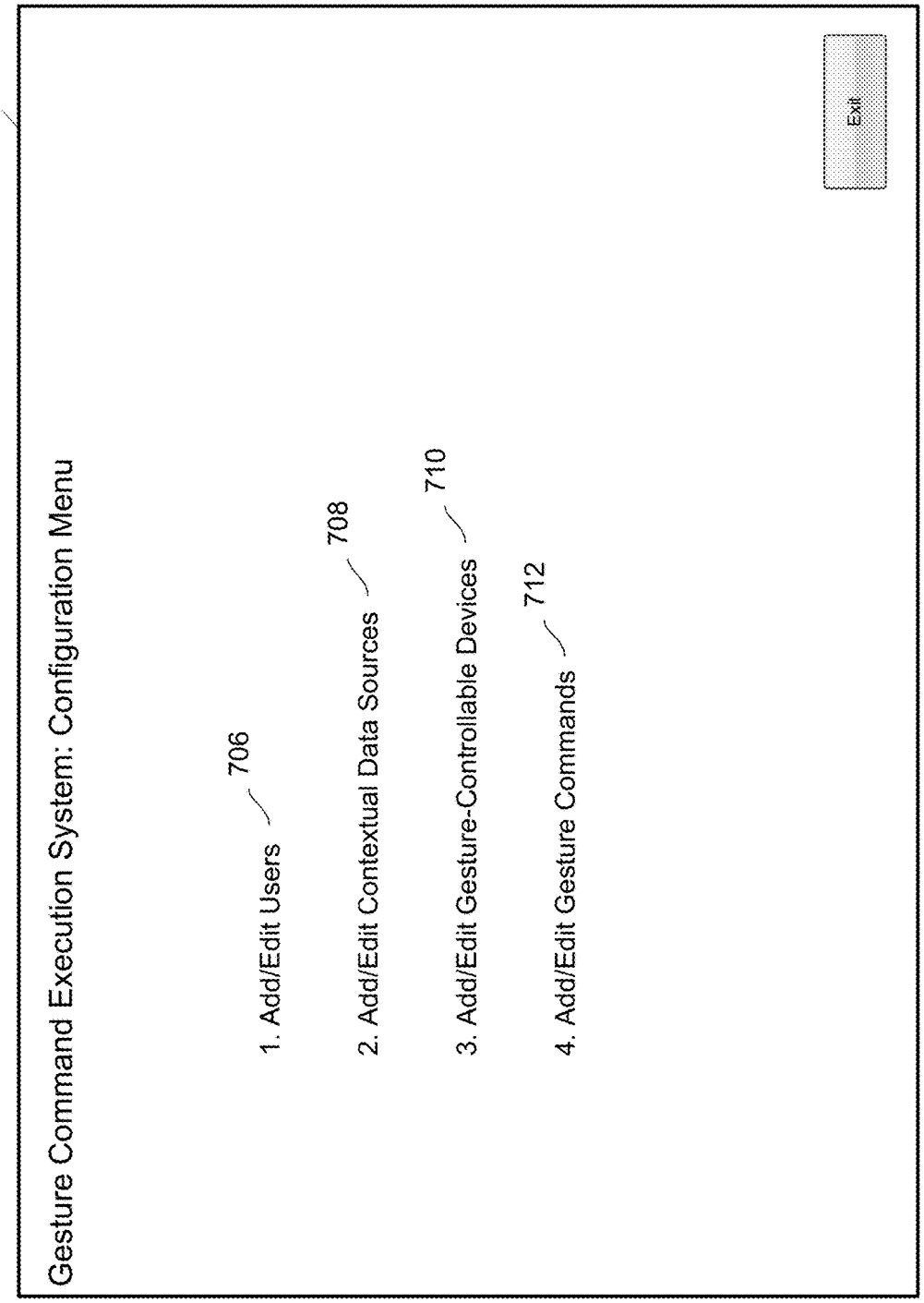
Figure 7D:
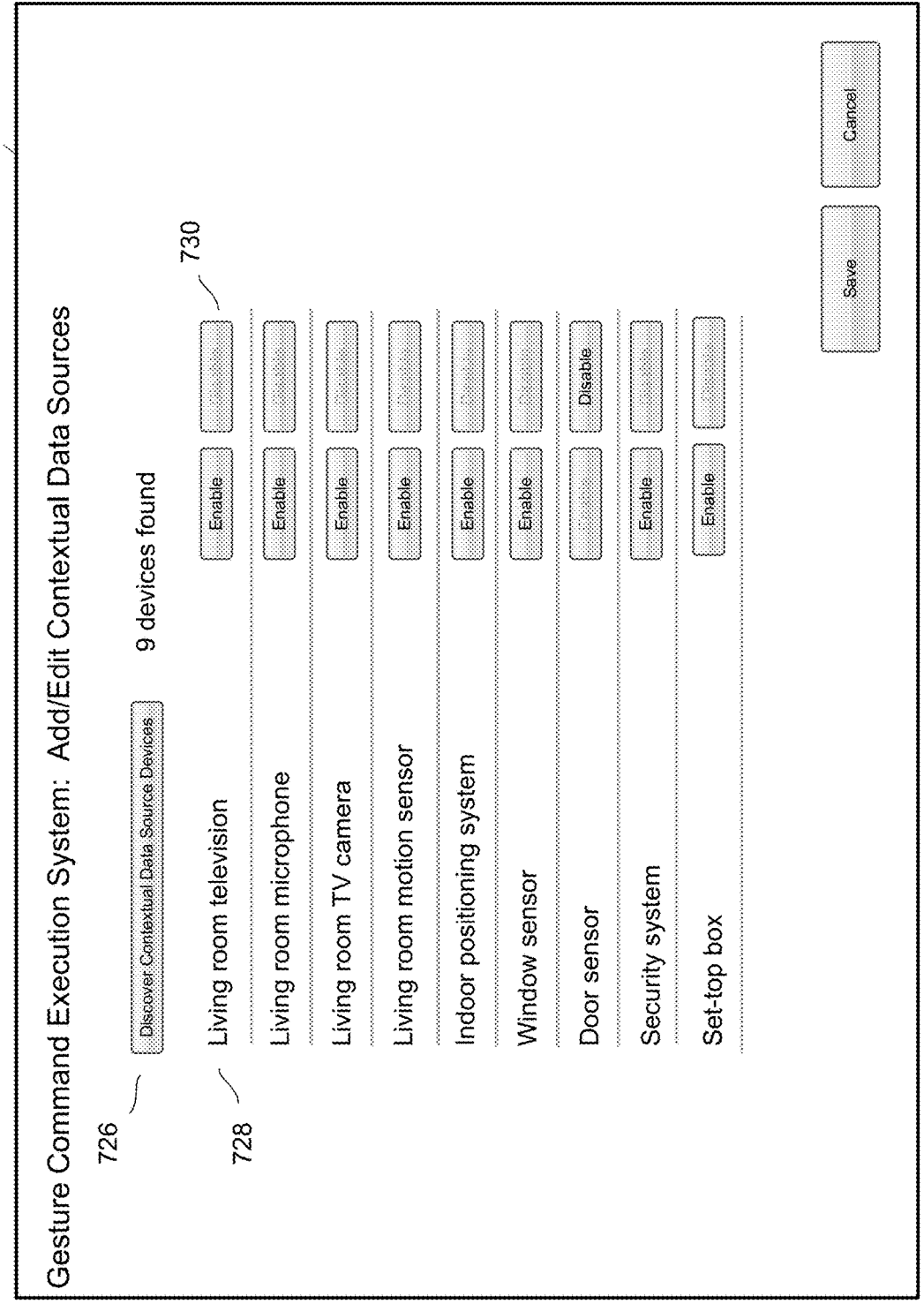
Figure 7E:
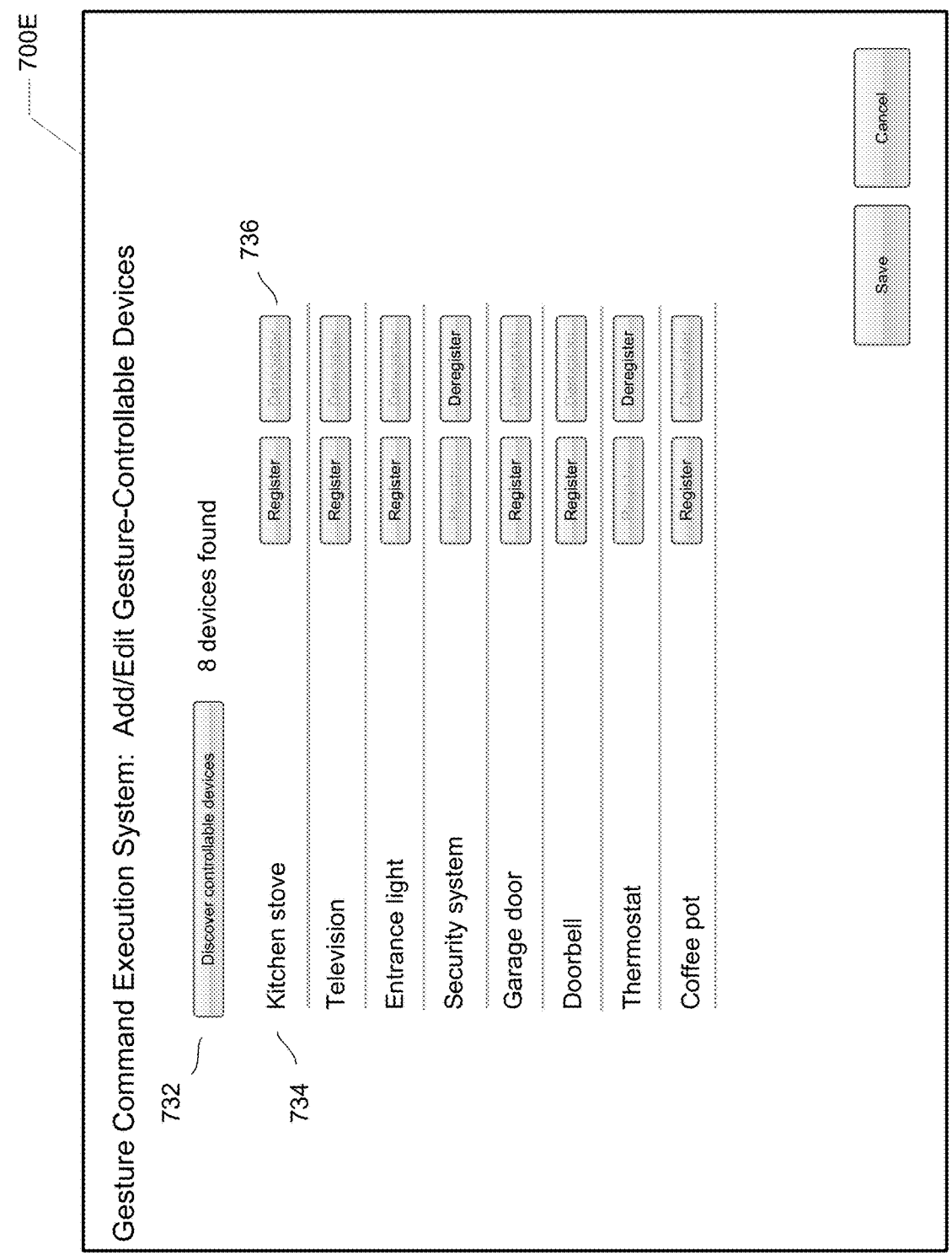
Figure 7F:
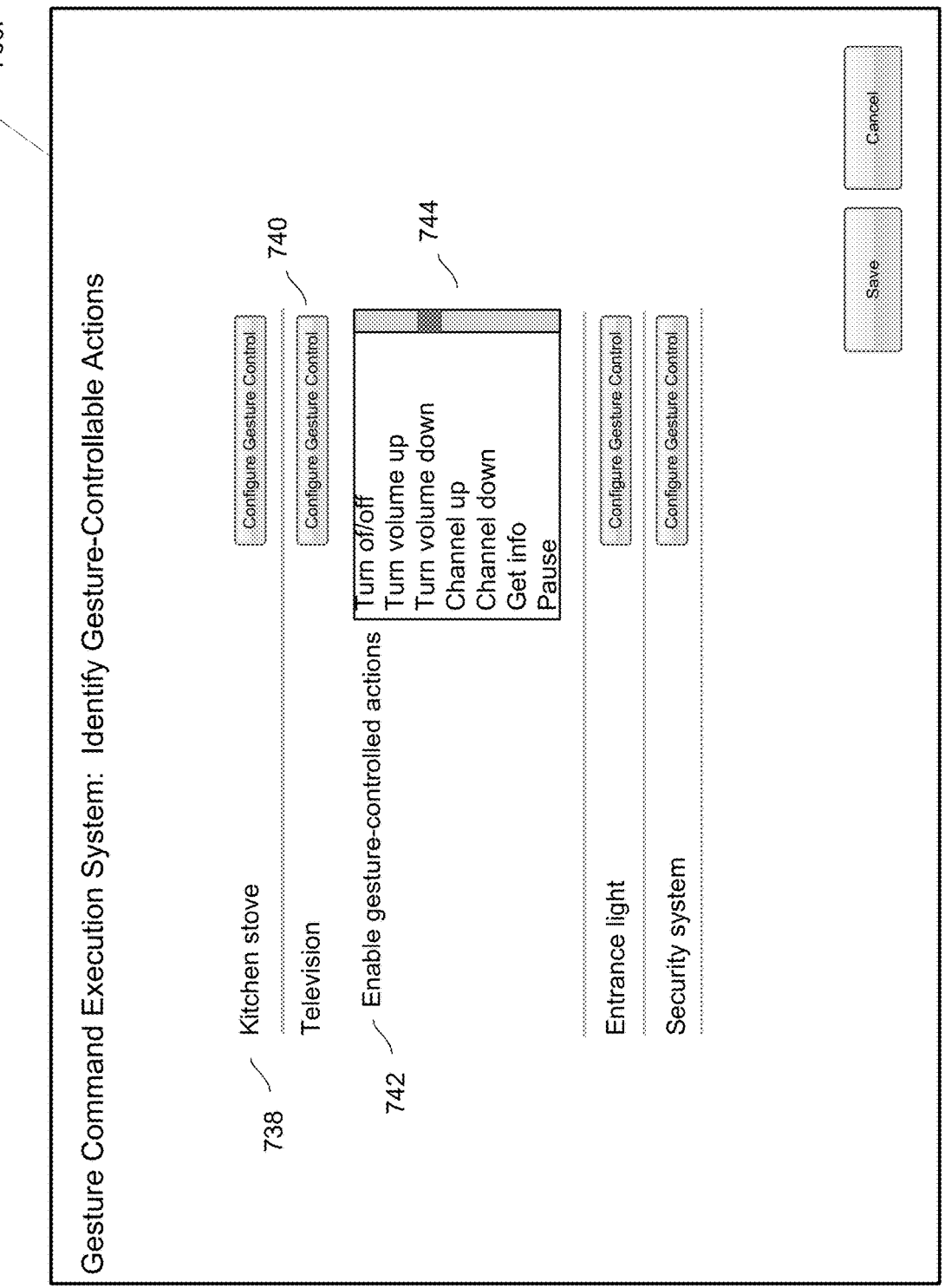
Figure 7G:
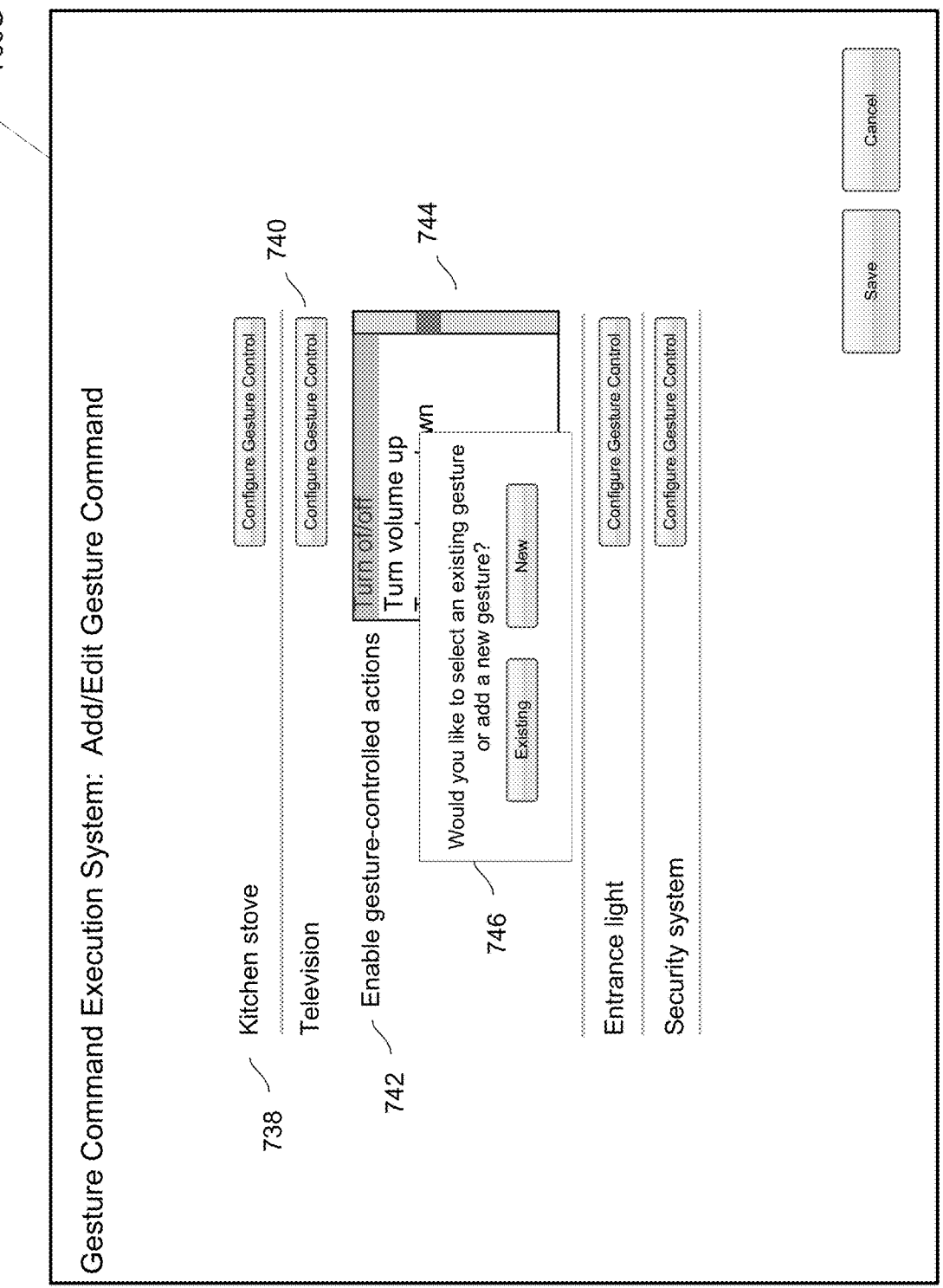
Figure 7H:
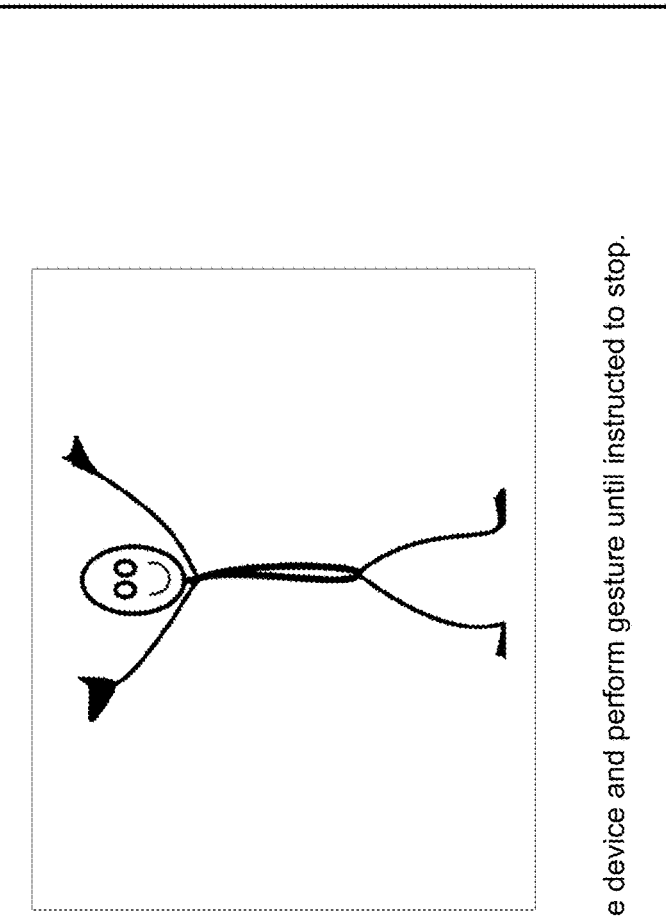
Figure 7I:
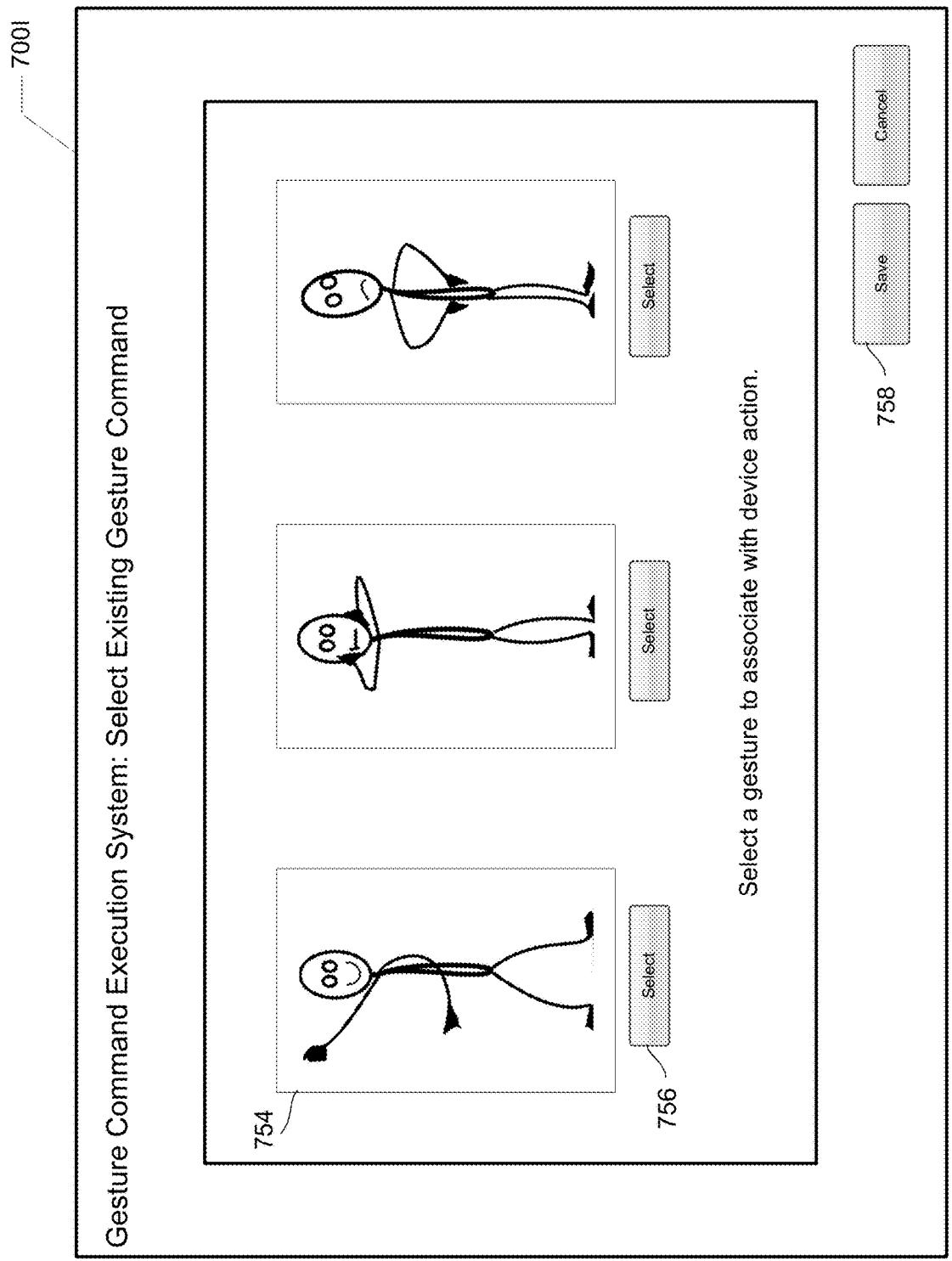
Figure 7J:
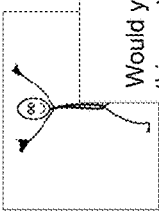

At step 622, one or more new gesture-controllable devices 495 may be added for use in the gesture command execution system 400 or existing ones may be edited. For example, to add one or more new gesture-controllable devices 495, the user may cause the device configuration module 441 to identify one or more devices which may be controlled by the gesture command execution system 400 remotely. The identified devices need not have gesture-recognition capabilities, but may need only the capability of being controlled remotely—such as via wireless or wired signals or control commands, sent by the computing device 401 to the gesture-controllable device 495, providing instructions indicating one or more actions to perform in response to a detected gesture interpreted by the computing device 401. Referring to FIG. 7E, a user interface screen 700E may be displayed, such as on the display device 450. The user interface screen 700E may be for identifying and registering one or more gesture-controllable devices 495 with the gesture command execution system 400, or for editing an existing gesture-controllable device 495 registered with the gesture command execution system 400. The user interface screen 700E may provide a button 732 used to initiate a device discovery process for identifying available devices that are capable of being controlled remotely. The device discovery process may identify the devices in a manner similar to the process described at step 618 with respect to identifying the contextual data source devices. Additionally or alternatively, the user may manually provide identification information for adding a gesture-controllable device 495. A list 734 of the identified devices may be displayed on the user interface screen 700E. A selection may be received through the user interface screen 700E, such as via a button 736, to register one or more of the identified devices as gesture-controllable devices 495. Once added and/or registered, a gesture-controllable device 495 may be removed or deregistered from use with the gesture command execution system 400. Information about a gesture-controllable device 495 may be edited to provide a meaningful and/or user-friendly name for the device, such as "Kitchen stove" or "Living room TV" or the like. After the user has completed identifying and registering the gesture-controllable devices 495, information identifying the gesture-controllable devices 495 may be stored in the database 432, and the method may return to the configuration menu on user interface screen 700B.

At step 624, a determination may be made as to whether a selection for adding or editing a gesture command is received. For example, the device configuration module 441 may determine whether a selection for adding or editing one or more gesture commands is received. For instance, referring back to FIG. 7B, a determination may be made as to whether a selection of option 712 for adding or editing gesture commands is received via the user interface screen 700B. The selection to add or edit gesture commands may be for configuring new gestures to be added to the gesture command execution system 400 and/or identifying one or more gesture-controllable devices 495 that may be controlled to perform one or more actions when the gesture is recognized.

If a selection for adding or editing gesture commands is received, the method may proceed to step 626, otherwise the method may end. Alternatively, the method may return to step 610.

At step 626, a selection may be received indicating a gesture-controllable device 495 for which a gesture is to be configured. For example, the device configuration module 441 may receive a selection of a gesture-controllable device 495 for which a gesture is to be configured or an existing gesture edited. For example, referring to FIG. 7F, a user interface screen 700F may be displayed, such as on the display device 450. The user interface screen 700F may be for selecting a gesture-controllable device 495 and one or more actions that may be performed in response to recognizing an associated gesture. A list 738 of the gesture-controllable devices 495 may be displayed on the user interface screen 700F. The list may include those devices that were previously added at step 622. A selection may be received through the user interface screen 700F, such as via a button 740, to select one of the gesture-controllable devices 495. Once selected, a list 744 of actions associated with the selected gesture-controllable device 495 may be displayed. A selection of one or more of the actions on the list 744 to be associated with and performed in response to detecting a particular gesture may be received. For example, in some cases, the user may want a single gesture to perform multiple actions, such as to both turn on the television 302a and tune to a particular channel. The user interface screen 700F may provide further options for the user to indicate additional details related to the actions to be performed, such as a particular channel to tune to, an amount of a volume adjustment, etc.; or to provide information associated with a sequence for performing multiple actions controlled by a single gesture.

At step 628, a determination may be made as to whether a selection is received to select an existing gesture or create a new gesture. For example, the device configuration module 441 may determine whether a selection is received to select an existing gesture (i.e., one previously stored with the gesture command execution system 400) or to create a new gesture to be used to control the selected gesture-controllable device 495 to perform the one or more selected actions. For example, referring to FIG. 7G, a user interface screen 700G may be displayed on the display device 450, with an option 746 for the user to indicate whether an existing gesture is to be selected or a new gesture is to be added. The user interface screen 700G may be a view of the user interface screen 700F after the user selects one or more of the actions in the list 744. A determination may be made as to whether a selection, via option 746, for selecting an existing gesture or creating a new gesture is received.

If a selection for selecting an existing gesture is received, the method may proceed to step 632, otherwise if a selection for creating a new gesture is received the method may proceed to step 630.

At step 630, a new gesture may be added. For example, the user may cause the device configuration module 441 to sample a new gesture to be added to the gesture command execution system 400 and to be configured to control the selected gesture-controllable device 495 to perform the one or more selected actions. Accordingly, a process that trains the computing device 401 to recognize a new gesture may be performed. Instructions may be output requesting that the user perform the gesture to be added. For example, referring to FIG. 7H, a user interface screen 700H may be displayed on the display device 450. The user interface screen 700H may output instructions 748 requesting that the user perform the gesture that is to be associated with the selected gesture-controllable device 495 and one or more actions. The instructions may request that the user perform the gesture for a predetermined period of time, such as for 5 seconds, 10 seconds, etc., or for a predetermined number of times, such as 4 times, 6 times, etc. For example, the user's gesture may be an "arms raised gesture," which may involve a motion of moving the user's arms from a position at his sides to a raised position above his head, and the user may be instructed to perform the movement repeatedly for 10 seconds or may be instructed to repeat the movement 6 times. While the user is performing the gesture, one or more sensors, such as the one or more sensor devices 480, may be controlled to sample the gesture by capturing detected gesture data. For example, a camera or an accelerometer may be controlled to detect and capture data associated with the user's performance of the gesture—such as capturing the various repetitions of the user raising his arms. The captured gesture data may be received from the one or more sensor devices 480. For instance, images captured by a camera or a sequence of sensor data values, such as acceleration or deceleration values, captured by an accelerometer may be captured. The captured gesture data may be analyzed to identify patterns of movement associated with the gesture. The identified patterns of movement, the captured sensor data reflective of such movement, or the like may be stored in the database 432 as sampled gesture data or a training gesture command.

A gesture recognition threshold may be determined and set for the gesture. The gesture recognition threshold may be specific to the particular gesture and the particular user performing the gesture, and may be used when in the gesture detection mode to determine when the gesture, once detected, should be recognized as a gesture intended as a command to control one of the gesture-controllable devices 495. The gesture recognition threshold may be a threshold level of an aspect or characteristic of the gesture that must be satisfied for a detected gesture to be recognized as a command for controlling one of the gesture-controllable devices 495. One or more gesture recognition thresholds may be determined based on analyzing the training gesture. For instance, the one or more gesture recognition thresholds may be related to an orientation of the gesture (such as the position of the gesture relative to the user's body, a position of the gesture (or the user) relative to a device performing the gesture detection or a device to be controlled, or the like); a distance of the gesture or the user from a device (such as the device performing the gesture detection or the device to be controlled or the like); a speed at which the user performs the gesture; or a length of time the gesture may need to be performed. The one or more gesture recognition thresholds may include thresholds related to any other measurable aspect or characteristic of the gesture.

Below provides an example of determining and setting one or more of the above-mentioned gesture recognition thresholds where the gesture being configured is a "single arm raised waving gesture," which controls security system 302c to be disarmed. The "single arm raised waving gesture" may involve the user moving one of his arms from a position located at the side of his body to a position located above his head and waving the raised arm.

In this example, an orientation gesture recognition threshold may be determined by analyzing the training gesture to determine a position or angle of the user's raised arm relative to the user's shoulders. It may be determined that the user's raised arm is positioned at an approximate 15 degree angle relative to the user's shoulders. In this case, the orientation gesture recognition threshold may be set to 15 degrees, so that the user, when performing the "single arm raised waving gesture" in the future, may be required to form an angle with their raised arm of at least 15 degrees relative to their shoulders for the gesture to be recognized as the command to control the security system 302c to be disarmed. In some cases, the threshold may be set as a range. For instance, when the user performs the training gesture, the user's arm may have been moving (such as during the waving) within a range of 12-18 degrees, and the threshold may be set accordingly, in this case requiring that the angle formed by the user's raised arm be between 12 and 15 degrees for the detected "single arm raised waving gesture" to be recognized as the command to control the security system 302c to be disarmed. Performing the gesture with the arm positioned at a greater or lesser degree range may result in the gesture not being recognized as one intended as the command to control the security system 302c to be disarmed.

As mentioned above, in some cases, the orientation gesture recognition threshold may be determined and set based on a position or angle of the gesture or of the user's body relative to a device, such as the device performing the gesture detection or the device to be controlled.

A distance gesture recognition threshold may also be determined and set. The distance gesture recognition threshold may be determined by analyzing the training gesture to determine the user's distance from a device, such as the device performing the gesture detection or the device to be controlled. For instance, it may be determined that the user is standing approximately 5 feet from the device performing the gesture detection, and the distance gesture recognition threshold may be set to 5 feet. In some cases, the threshold may be set as a range, such as 3-7 feet. In this case, when performing the "single arm raised waving gesture" in the future, the user may be required to be within 3-7 feet of the device performing the gesture detection for the gesture to be recognized as the command to control the security system 302c to be disarmed. Performing the gesture from a further distance or at a closer distance may result in the gesture not being recognized as one intended as the command to control the security system 302c to be disarmed.

A speed gesture recognition threshold may also be determined and set. The speed gesture recognition threshold may be determined by analyzing the training gesture to detect a speed of the gesture. For instance, a speed of the waving hand in the "single arm raised waving gesture" may be determined by calculating a number of repetitions of waves detected within a period of time, such as within 2 seconds. The speed of the gesture may be characterized as a numeric value, such as on a scale of 1 to 10, with 1 being relatively slow and 10 being relatively fast. Different ranges or scales may be used. The calculated number of repetitions per time period may be mapped to a speed value. For instance, 3-6 wave movements performed within a 2 second period of time may be mapped to a speed value of 5 on the scale of 1 to 10. Accordingly, a speed gesture recognition threshold for a training gesture performed at such speed may be set to speed value 5. In some cases, the threshold may be set as a range, such as speed value range of 4-6. In this case, when performing the "single arm raised waving gesture" in the future, the user may be required to perform the gesture within the 4-6 speed value range for the gesture to be recognized as the command to control the security system 302c to be disarmed. Performing the gesture at a slower or faster speed may result in the gesture not being recognized as one intended as the command to control the security system 302c to be disarmed.

A length of time gesture recognition threshold may also be determined and set. The length of time gesture recognition threshold may be determined by analyzing the training gesture to determine an amount of time necessary to capture the complete gesture or to distinguish the gesture from another gesture. In some cases, it may not be necessary to analyze the training gesture and a default amount of time may be used, such as 2 seconds, 5 seconds, etc. In some cases, the threshold may be set as a range, such as 2-5 seconds. In this case, when performing the "single arm raised waving gesture" in the future, the user may be required to perform the gesture for between 2-5 seconds for the gesture to be recognized as the command to control the security system 302c to be disarmed. Performing the gesture for a shorter or longer period of time may result in the gesture not being recognized as one intended as the command to control the security system 302c to be disarmed.

The above are merely examples, and other threshold values may be used and other aspects of a gesture may be analyzed and measured to determine and set other gesture recognition thresholds. The threshold values may additionally be set differently for different users performing the same gesture. The user interface screen 700H may further output an option 751 to allow the user to manually set or adjust one or more of the gesture recognition thresholds—for instance, if the training conditions may be different from the conditions under which the user expects to perform the gesture, the user may want to modify one or more of the gesture recognition thresholds.

Accordingly, when in the gesture detection mode and upon detection of the gesture, one or more aspects of the gesture may be analyzed and measured, and then compared to a corresponding one of the defined gesture recognition thresholds to determine whether the gesture satisfies the corresponding gesture recognition threshold and should be recognized as a gesture intended as a command to control one of the gesture-controllable devices 495. While more than one gesture recognition threshold may be set during gesture configuration, in some cases, only one or some of the defined gesture recognition thresholds may be used in determining whether a detected gesture should actually be recognized as a command for controlling a gesture-controllable device 495. For example, the user may additionally configure the gesture to indicate that a threshold quantity of the gesture recognition thresholds must be satisfied for the gesture to be recognized as one intended as a command to control a gesture-controllable device 495—e.g., 100% of the gesture recognition thresholds must be satisfied, 50% of the gesture recognition thresholds must be satisfied, etc.

One or more of the gesture recognition thresholds may be adjusted based on learned movement patterns or behaviors of the user. For instance, if the computing device 401 learns over time that the user often raises his arms in the air in excitement, the length of time gesture recognition threshold for an "arms raised gesture" may be increased so that the user would be required to maintain his arms in the raised arm position for a longer period of time in order for the gesture to be recognized as one intended to control a device. Or if the user typically uses fast hand motions in conversation, a speed gesture recognition threshold may be lowered, requiring the user to perform the gesture more slowly and deliberately in order for the gesture to be recognized as one intended to control one of the gesture-controllable devices 495, or a length of time gesture recognition threshold may be raised, requiring the user to perform the gesture for a longer period of time for the gesture to be recognized as a command intended to control one of the gesture-controllable devices 495.

The training gesture and corresponding gesture recognition threshold may be stored in response to receiving a user request to save the gesture. For instance, in user interface screen 700H, an image 750 of the training gesture command may be output for the user's confirmation and, if acceptable, the user may request that the gesture be saved by selecting a save option 752 displayed on the user interface. In this case, the training gesture may be stored in the database 432.

At step 632, a user interface for selecting an existing gesture command may be output. For example, the device configuration module 441 may output a user interface for the user to select an existing gesture command. For instance, one or more previously-defined gestures may be output for the user to choose from to use to control the gesture-controllable device 495 and perform the one or more actions selected in step 626. For example, referring to FIG. 7I, a user interface screen 700I may be displayed on the display device 450. The user interface screen 700I may output one or more existing gestures 754 and a corresponding selection option 756 to select one of the one or more existing gestures 754 and a user selection of one of the one or more existing gestures 754 may be received.

At step 634, a determination may be made as to whether a context in which the gesture is to be recognized as a control command should be defined. For example, the device configuration module 441 may determine whether a selection is received for defining a context in which the gesture should be recognized as a command for controlling the selected gesture-controllable device 495 to perform the one or more selected actions. For example, referring to FIG. 7J, a user interface screen 700J may be displayed, such as on the display device 450 with an option 760 for the user to indicate whether a context for using the gesture to control the gesture-controllable device 495 to perform the one or more selected actions should be defined. The user interface screen 700J may be a view of the user interface screen 700I after a gesture command has been configured for controlling the selected gesture-controllable device 495 to perform the one or more selected actions.

If a request to define a context for recognition of the gestion is received, the method may proceed to step 636, otherwise the method may proceed to step 638. For instance, in some situations the user may chose not to define a context in which the gesture is to be recognized as a control command, because the user may want the gesture to control the selected gesture-controllable device 495 to perform the one or more selected actions regardless of any context in which it is detected—that is, the user may want the gesture to always cause the selected gesture-controllable device 495 to perform the one or more selected actions. In other situations, the user may want the gesture to control the selected gesture-controllable device 495 to perform the one or more selected actions only in certain contexts and, in other contexts, not control the device or perform the actions at all, or perhaps may intend to control a different gesture-controllable device 495 and/or perform one or more different actions in those other contexts (assuming the gesture has been so configured).

It may be advantageous for the user to give the gesture commands different meanings in different contexts so that the user need not remember large quantities of gesture commands for controlling different devices in the user's environment. For instance, it may be easier for the user to remember that an "arms raised gesture" means to "turn on" generally (e.g., in one context, such as when the user is in proximity to the television 302a, it may mean to turn on the television 302a, while in another context, such as at a certain time of day, it may mean to turn on the lamp 302o, while in yet another context, such as when the user is in the kitchen, it may mean to turn on the coffee maker 302r), rather than remembering distinct gesture commands for performing the different actions. In this way, gesture commands may be reused so that a smaller quantity of gesture commands may be remembered by the user and used to control multiple gesture-controllable devices to perform a variety of different actions.

If the user made a selection to define a context in which to use the gesture as a command to control the selected gesture-controllable device 495 to perform the one or more selected actions, then at step 636, the user may provide input to define a context in which the newly configured gesture is to be used as a command for controlling the selected gesture-controllable device 495 to perform the one or more selected actions. The process for defining a context is described with respect to FIG. 6B.

Referring to FIG. 6B, a process for defining a context in which a gesture is to be recognized to perform a specified action is described. As discussed above, if the user only wants the gesture to control the selected gesture-controllable device 495 to perform the selected one or more actions in certain situations, then the context in which the gesture is recognized to do so may be defined in this process. For example, the user may input into a user interface for defining the context, various combinations of environmental parameters or criteria that are required to be satisfied in order for the gesture to be recognized as a command for controlling the selected gesture-controllable device 495 to perform the selected one or more actions. For example, the user may want the "arms raised gesture" to adjust the brightness of the lamp 302o, but only when the television 302a is turned on and is playing content 302j that is a movie.

At step 636a, an interface may be displayed for defining a context in which the gesture being configured is to be recognized as a command for controlling the selected gesture-controllable device 495 to perform the selected one or more actions. For example, the computing device 401 may cause the device configuration module 441 to output a user interface for receiving information for defining a context in which the gesture being configured is to be recognized as a command for controlling the selected gesture-controllable device 495 to perform the selected one or more actions. For instance, referring to FIG. 7K, the user interface screen 700K may be displayed, such as on the display device 450. The user interface screen 700K may be a user interface for defining a context in which a gesture is to be recognized as a command for controlling the selected gesture-controllable device 495 to perform the selected one or more actions.

At step 636b, a determination may be made as to whether a selection is received for adding a new context or selecting an existing/previously-defined context. For example, the device configuration module 441 may determine whether a selection to add a new context or select an existing context is received. For instance, the user interface screen 700K may provide an option 762 for the user to indicate a name for a new context or to select an existing context from a list of previously-defined contexts. If a user input identifying a name for a new context is received, the method may proceed to step 636d, otherwise the method may proceed to step 636c, and a selection of an existing context from the list of previously-defined contexts may be received.

Figure 7K:
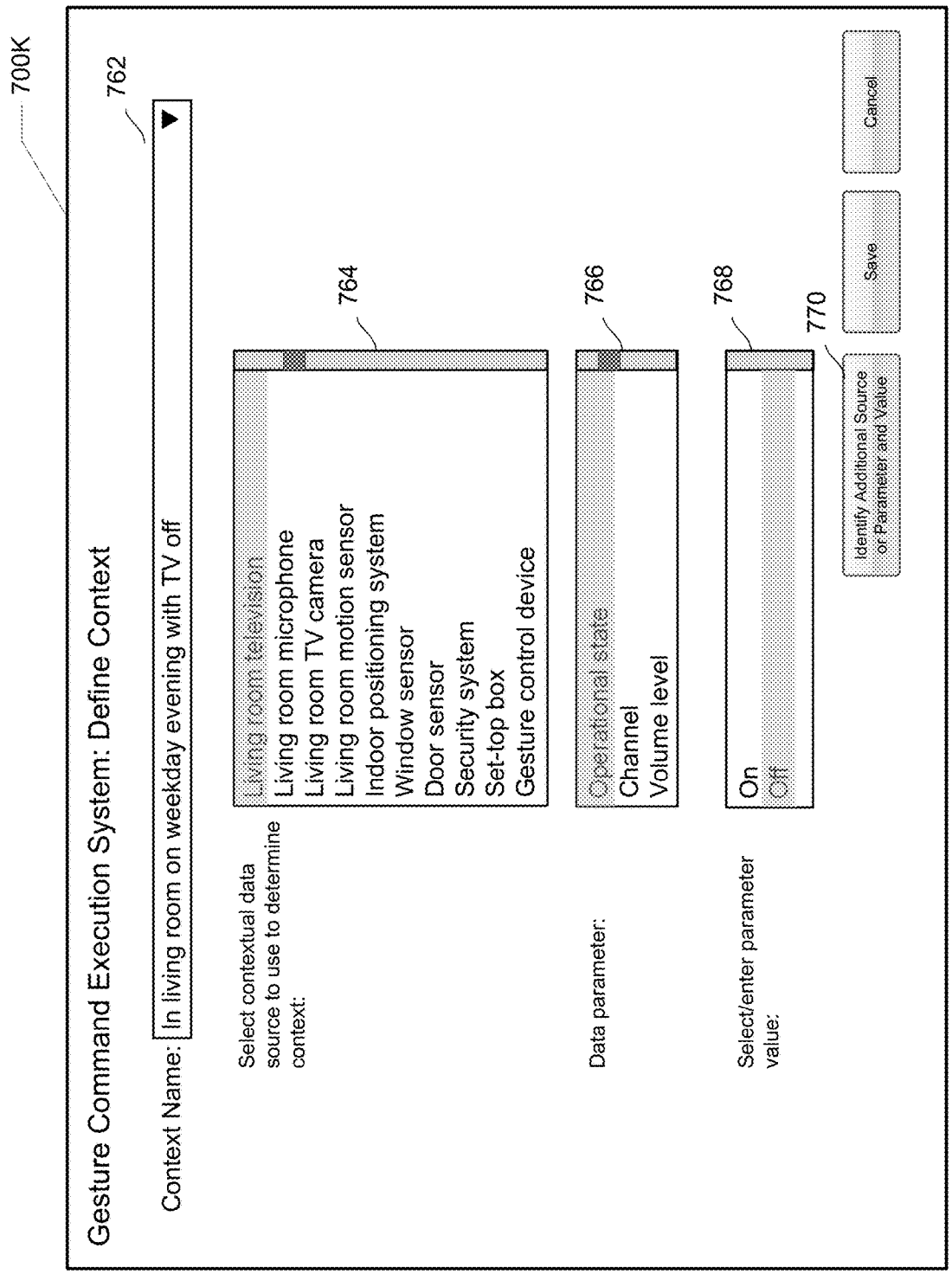

At step 636d, the user may identify a contextual data source to use to identify the context being defined. For example, the user interface screen 700K may display a list 764 of contextual data sources that may be used to identify the context being defined. The items in the list may include the contextual data sources identified at step 618 of FIG. 6A and shown, for example, in FIG. 7D. The list may additionally include the gesture control device itself, such as the computing device 401, which may be used to collect, receive, or determine information (or to process information received from other contextual data sources) such as, a date/time 302s, the weather 302x, an emotional state of an individual or of the environment 302z, a device location, an application being executed, content being output 302j in the environment, an identification of the user performing the gesture, an authorization level of user performing the gesture, etc. A selection may be received of one of the contextual data source items from the list 764. For instance, if the user is defining a context "In living room on weekday evening with TV off," which is associated with the user being located in the living room on a weekday evening with the television 302a currently in an OFF state, the user may wish to use a number of contextual data sources to monitor the environment in order to detect when this context occurs. Accordingly, when in the gesture detection mode, data acquired from such contextual data sources may be analyzed to determine whether the conditions defined for the context as configured have been met. For instance, the user may wish to use the living room camera situated on top of the living room television 302a to detect an image of the user in the living room. The user may additionally wish to use the television 302a itself to report whether it is in an OFF state. The user may further wish to use the gesture control device, such as the computing device 401, to determine the date/time 302s and whether the day of week is a Monday, Tuesday, Wednesday, Thursday, or Friday, and the time is between the hours of 5:00 PM and 9:00 PM, for example. Only when all of these conditions are met should it be determined that the context of "In living room on weekday evening with TV off" is detected. Accordingly, to define such a context, the user may initially select one of the contextual data sources used to detect the context. For example, as shown in FIG. 7K, the user may select the "Living room television."

At step 636e, the user may identify a particular data parameter, associated with the selected contextual data source, which may be used to determine that the necessary condition is met for the context being defined. For instance, the user interface screen 700K may display a list 766 of parameters associated with the particular contextual data source selected from the list 764. For example, if the user selects "Living room television" as the contextual data source at step 636d, the data parameters displayed in the list 766 may be those associated with data that may be collected from the television 302a, such as an operational state of the television 302a, the channel to which the television 302a is tuned, the volume level of the television 302a, or the like. The user may select, for example, the "Operational state" parameter from the list 766 for determining whether the television 302a is in the OFF state for detecting the context being defined. The listed data parameters may be different for different contextual data sources. For example, for the contextual data source "Living room TV camera," the listed data parameters may include the operational state of the camera, the camera priority status (e.g., primary or secondary), Is Person detected indicator, or the like. For the contextual data source "Gesture control device," the listed data parameters may include date, time, start date, end date, start time, end time, day of week, location (e.g., a location within a premises or a geographic location), executing application (e.g., an application currently being executed), gesture user (e.g., the individual performing the gesture), emotional state (e.g., of the individual performing the gesture or of the environment in general), an authorization level (e.g., of the individual performing the gesture), etc. As another example, for a contextual data source, such as "Weather server," the listed data parameters may include temperature, humidity, rainfall, or the like.

At step 636f, the user may identify a data parameter value for the identified data parameter, which may be used to determine that the necessary condition is met for the context being defined. For instance, the user interface screen 700K may display a list 768 of parameter values or may allow a user input of a parameter value associated with the particular data parameter selected from the list 766. For example, if the user selects "Living room television" as the contextual data source at step 636d, and selects "Operational state" at step 636e, the parameter values displayed in the list 768 may be those applicable to the parameter "Operational state"—such as On and Off. The user, for example, may select the "Off" parameter value from the list 768 for determining whether the television 302a is in the OFF state for detecting the context being defined. The listed data parameter values may be different for different data parameters. For example, for the data parameter "Channel," the listed parameters values may include a list of channel numbers or channel names. For the data parameter "Volume level," the listed parameters values may include a range of numbers indicating a volume level.

At step 636g, a determination may be made as to whether an input is received for identifying additional contextual data sources and/or parameters for the context being defined. For example, the device configuration module 441 may determine whether a selection is received for identifying an additional contextual data source and/or an additional data parameter and corresponding parameter value. That is, multiple contextual data sources, and additionally, multiple parameters for each selected contextual data source, may be identified for determining the necessary conditions for detecting the context being defined. For example, the user interface screen 700K may provide an option 770 to receive a selection for identifying another contextual data source or another data parameter and corresponding parameter value. For instance, in addition to the "Living room television," contextual data source, the user may wish to identify the "Gesture control device" as a contextual data source, with a parameter value of "Monday, Tuesday, Wednesday, Thursday, Friday" for data parameter "Day of week," a parameter value of "5 PM" for data parameter "Start Time," and a parameter value of "8 PM" for data parameter "End Time." If a selection is received for identifying an additional contextual data source and/or an additional data parameter and corresponding parameter value, the method may return to step 636d to continue defining the context, otherwise information associated with the newly defined context may be stored in the database 432, and the method of FIG. 6B may end and the process may proceed to step 638 of FIG. 6A.

Returning to FIG. 6A, at step 638, after the context has been defined, a determination may be made as to whether any potential conflicts exist in view of the gesture command being configured. For example, the device configuration module 441 may determine whether any potential conflicts exist between the gesture command being configured, and the associated context in which it is recognized as a control command, and any previously-configured gesture commands. As mentioned, in some cases, the user may wish to use the same gesture to perform different actions. In some cases, these different actions may be intended by the user to be performed together upon recognition of the gesture, such as the "arms raised gesture" causing the television 302a to be turned on and tuned to a particular channel. In other cases, these different actions may be intended by the user to be performed in different/separate contexts, such as the "arms raised gesture" causing the television 302a to be turned on in the context of the user being in proximity to the television 302a, or causing the coffee maker 302r to be turned on in the context of the user being in the kitchen, or causing the lamp 302o to be turned on if it is a certain time of day. In some cases, however, the user may not actually want or intend for the gesture command to be configured to perform particular multiple actions, because doing so may cause a conflict in reality or a conflict from the user's perspective. For instance, if the "arms raised gesture" had been previously configured to turn on the coffee maker 302r in the context of the user being in the kitchen and the time 302s being between 6:00 AM and 10:00 AM, and then the user subsequently attempts to add the same "arms raised gesture" to turn on the microwave 302u in the context of the user being in the kitchen (without the user actually intending for the "arms raised gesture" to control both the coffee maker 302r and the microwave 302u to be turned on in the same context), a potential conflict may result—at least from the user's perspective—since no qualifying time for controlling the microwave 302*u* has been configured with respect detecting the "arms raised gesture" while the user is in the kitchen. As another example, the "arms raised gesture" may have previously been configured to cause a security system 302*c* to be armed in any/all contexts (i.e., without the user defining a particular context in which the gesture should cause the arming). If the user subsequently attempts to configure the same "arms raised gesture" to disarm the security system 302*c* in any/all contexts, an actual conflict may result—i.e., the gesture would cause the security system 302*c* to be turned both armed and disarmed. In such cases, where the same gesture and the same (or overlapping) contexts (or no context) are used to perform one or more different actions, a potential conflict may be detected during the configuration process. If a potential conflict is detected, then the method may proceed to step 640, otherwise if no potential conflicts are detected, the gesture command may be stored in the database 432 in association with the selected gesture-controllable device 495 and the selected one or more actions to be performed (selected at step 626) in response to recognizing the gesture, and the corresponding context (if defined) in which the gesture should be recognized as a control command, and the method may proceed to step 644.

If a potential conflict is detected, then at step 640, a notification of the potential conflict may be output. For example, the device configuration module 441 may output a notification of the potential conflict to allow the user to determine whether the conflict requires resolution. The device configuration module 441 may output, to the display device 450 for example, information indicating the gesture-controllable devices 495 and actions that are currently configured to be controlled by the gesture and may request that the user indicate whether the potential conflict is acceptable.

At step 642, a determination may be made as to whether an indication that the potential conflict is acceptable is received. For example, the device configuration module 441 may determine whether an indication that the potential conflict is acceptable is received. If an indication that the potential conflict is acceptable is received, the conflict may be allowed to exist and the gesture command may be stored in the database 432 in association with the selected gesture-controllable device 495 and the selected one or more actions to be performed (selected at step 626) in response to recognizing the gesture, and the corresponding context (if defined) in which the gesture should be recognized as a command for controlling the selected gesture-controllable device 495. The method may then proceed to step 644. If an indication that the conflict is not acceptable is received, the method may proceed to step 646.

At step 644, a determination may be made as to whether a selection is received to end the configuration process. For example, the device configuration module 441 may again display the user interface screen 700B providing the menu for selecting the various options for configuring the gesture command execution system 400. A determination may be made as to whether a selection to end the configuration process is received, such as whether a selection of an exit button is received. If a selection to end the configuration process is received, the method of FIG. 6B may end and may return to step 502 of FIG. 5 and again display the user interface screen 700A. Otherwise, the method may return to step 610 to continue the configuration process.

If the user indicated that the potential conflict is not acceptable, then at step 646, a determination may be made as to whether a selection is received for the context associated with the gesture to be modified so as to resolve the conflict. For example, the device configuration module 441 may require the user to resolve the conflict by adjusting the context associated with the gesture being configured, by changing the gesture being configured to a different gesture, or by changing the gesture-controllable device 495 to be controlled and the one or more actions to be performed. Accordingly, a request may output, for example to the display device 450, for the user to indicate whether the user wants to adjust the context or change the gesture and/or the device to be controlled. A determination may be made as to whether an indication is received to adjust the context or change the gesture and/or the device to be controlled. If an indication to adjust the context is received, the method may return to step 636 and the user may modify the context so as to distinguish from the context in which the previously-configured gesture command is being used. For instance, using the example provided at step 638, if the "arms raised gesture" had been previously configured to turn on the coffee maker 302*r* in the context of the user being in the kitchen between 6:00 AM and 10:00 AM, and then the user subsequently attempts to add the same "arms raised gesture" to turn on the microwave 302*u* in the context of the user being in the kitchen (without any qualifying time) (such as at steps 626-636), a potential conflict may be detected (such as at step 638). That is, if the user performs the "arms raised gesture" while in the kitchen between the hours of 6:00 AM and 10:00 AM, both the coffee maker 302*r* and the microwave 302*u* may be caused to be controlled. The user may be notified of the conflict (such as at step 640), and requested to indicate if the conflict is acceptable (such as at step 642). If the user did not actually intend for the "arms raised gesture" to control both the coffee maker 302*r* and the microwave 302*u* to be turned on in the context of the user being in the kitchen between 6:00 AM and 10:00 AM, the user may indicate that the potential conflict is not acceptable (such as at step 642) and that he would like to adjust the context associated with the gesture currently being configured (such as at step 646). In this case, a user interface (such as a user interface screen 700K shown in FIG. 7K and described with respect to FIG. 6B), for receiving information for defining a context to be associated with the gesture may be again output (such as at step 636). The user may, in this case, modify the context in which the "arms raised gesture" may be recognized for controlling the microwave 302*u* to be turned on, such as by instead indicating, for example, a context of the user being in the kitchen between 3:00 PM and 11:00 PM. After modifying the context, the process may again perform step 638 to determine if any conflicts result from the new gesture/context combination. In this case, no conflict may be detected since the "arms raised gesture" may control the coffee maker 302*r* when recognized in the context of the user being in the kitchen between 6:00 AM and 10:00 AM and may control the microwave 302*u* when recognized in the context of the user being in the kitchen between 3:00 PM and 11:00 PM.

Otherwise, if at step 646 an indication to adjust the context is not received and, instead, the user prefers to either change the gesture to a different gesture or change the gesture-controllable device 495 to be controlled or the action to be performed in response to recognizing the gesture, the method may return to step 626 to begin again the process of selecting a gesture-controllable device 495 and one or more actions to be performed and, at step 628, selecting/adding a different gesture for controlling the selected gesture-controllable device 495 and one or more actions to be performed.

After the modifications, the conflict check may again be performed to determine if any potential conflicts are caused by the modifications.

After successfully configuring a gesture without any potential conflicts, or with conflicts that the user has confirmed are acceptable, the gesture command may be stored in the database 432 in association with the selected gesture-controllable device 495 and the selected one or more actions to be performed in response to recognizing the gesture (selected at step 626), and the corresponding context in which the gesture should be recognized (if defined at step 636). The method may then proceed to step 644 to determine whether a selection for ending the configuration process is received.

FIGS. 8A-8B are flowcharts of an example of a gesture control process for controlling one or more gesture-controllable devices 495 using gestures, after the gesture-controllable devices 495 have been configured in the FIG. 6A-6B process. The process may be performed by any desired computing device, which may serve as a gesture control device, such as the computing device 401 used in the gesture command execution system 400.

Referring to FIG. 8A, if the computing device 401 has been set to enter into gesture detection mode (such as at step 508 in FIG. 5), then at step 810, an environment associated with the computing device 401 may be monitored for gestures. For example, the computing device 401 may control the gesture recognition module 443 to begin monitoring the environment associated with the computing device 401 for gesture commands. The environment may be monitored using the one or more sensor devices 480, such as one or more cameras, microphones, accelerometers, gyro sensors, electromyography (EMG) sensors, radar sensors, radio sensors, inertial sensors, infrared (IR) sensors, magnetic sensors, force sensitive resistor (FSR) sensors, flexible epidermal tactile sensors, LEAP MOTION sensor devices, or the like. The sensor data may be received from one or more of the one or more sensor devices 480 and compared to stored sensor data and/or movement patterns corresponding to previously-configured gestures (such as configured during the configuration process described with respect to FIGS. 6A-6B) to determine whether a configured gesture is performed.

Further, while the environment associated with the computing device 401 is being monitored for gestures, there may exist a parallel or concurrent process that monitors and analyzes the environment to determine the current context and adjust one or more gesture recognition thresholds as needed. Accordingly, at step 812, information associated with the environment associated with the computing device 401 may be gathered and analyzed to determine the current context. For example, the computing device 401 may control the context determination module 445 to analyze information, collected from one or more contextual data sources, about the environment in which the gesture may be detected to determine a current context. For instance, the current context may be determined based on activities being performed in the environment, an activity being performed by a user performing a gesture, an application being executed on the computing device 401 or another device, content or audio being output in the environment, such as from the television 302*a*, the doorbell 302*f*, the telephone 302*n*, an alarm, background noises 302*b*, etc., individuals in proximity to the computing device 401 or one of the gesture-controllable devices 495, a distance of the user performing a gesture from the computing device 401, the one or more sensor devices 480, or one of the one or more gesture-controllable devices 495, an authorization level of a user performing a gesture, a facial expression or an inferred emotional state 302*z* of a user performing a gesture, an inferred emotional state/mood 302*z* of the environment in which a gesture is performed (e.g., based on multiple individuals in the environment or activities performed in the environment), a date/time 302*s*, a temperature 302*y* of the environment, a television programming schedule, a calendar schedule associated with a user performing a gesture, an operational state of one or more of the gesture-controllable devices 495, information received from one or more of the sensor devices 480, etc. The process of analyzing the environment to determine the current context is described in further detail with respect to FIG. 8B.

Referring to FIG. 8B, a process for analyzing the environment in which a gesture is detected for determining the current context may be described. At step 812*a*, one or more of the contextual data sources being used with the gesture command execution system 400 may be identified. For instance, the contextual data source devices added at step 618 of FIG. 6A may be identified, e.g., those devices in or around the user's premises 301 that may have been enabled by the user for use in gathering information associated with the user's environment. The context determination module 445 may additionally identify other contextual data sources, such as one or more of the controllable devices 495, a gateway or a network (e.g., network 405) to which the computing device 401 is connected, etc.

At step 812*b*, data may be collected from each of the contextual data sources. For example, the context determination module 445 may collect data from each of the contextual data sources identified at step 812*a*. For instance, for each of one or more parameters associated with the particular contextual data source, a corresponding parameter value may be received. For example, if the contextual data source is the television 302*a*, the television 302*a* may collect data associated with its operational state, a currently tuned channel, a current volume level, etc. Parameter values corresponding to each of these parameters may be collected from the television 302*a*. For example, when the television 302*a* is turned on, tuned to channel 4, and the volume is at level 10, the context determination module 445 may receive from the television 302*a*, a parameter value of "ON" for data parameter "operational state"; a parameter value of "4" for data parameter "channel"; and a parameter value of "10" for data parameter "volume level." The received data may be stored in a buffer of the computing device 401, such as in the memory 430, for use during the gesture recognition process described in FIG. 8A.

At step 812*c*, additional contextual information may be collected. For example, the context determination module 445 may collect additional information associated with the environment in which the gesture is detected, which may be useful in determining the current context. For instance, a location associated with where the gesture is performed may be determined. The location may be a geographic location, such as a geographic location of the computing device 401. The geographic location may be determined, for example, based on data received from a location-detecting device, such as a global positioning system (GPS), or based on determining a network to which the computing device 401 is connected (e.g., and the computing device 401 may store information related to geographic locations associated with various networks—such as the user's home or work networks). Alternatively or additionally, the location may be a location within a premises in which the gesture was detected, such as the living room, the kitchen, the garage, etc., which may be determined based on known locations (as identified by the user) of certain devices in the premises. For example, it may be known, based on user-provided information, that the camera that detected the gesture is located in the living room. Alternatively, the location may be inferred based on a configured name associated with a device (such as one identified by the user), such as "bedroom TV" for a television located in the user's bedroom.

An identity of the user who is performing the gesture may be determined. For instance, facial recognition may be performed on an image of the user performing the gesture to identify the user. Additionally or alternatively, the user may be identified based on performing voice recognition from captured audio if the user performing the gesture is also speaking. The user may be identified based on learned patterns of behavior, such as interactions with various devices in the environment, time of day, activities being performed, etc. A user profile associated with the identified user may be retrieved, for example from the database 432, to determine information about the user that may be relevant to the context, such as an age and/or gender of the user, a level of authorization within the gesture command execution system 400, device preferences of the user, etc.

The presence of other individuals in proximity to the user performing the gesture and/or an environment associated with where the gesture is performed may be determined. For example, facial recognition or voice recognition may be performed to determine whether other individuals are in an environment associated with where the gesture is performed or within proximity of the user performing the gesture. Other or additional data may be used to determine the presence of other individuals, such as data from a proximity sensor, a motion detector, or the like. If one or more of such detected individuals are able to be recognized (such as other users living in the home or visitors, who are registered with the gesture command execution system 400), those individuals may be identified and corresponding user profiles may be retrieved for each.

Devices that are in proximity to the user performing the gesture may be identified. For example, the context determination module 445 may determine other devices known to be in a location associated with where the gesture is performed. An indoor positioning system may be used to determine locations of devices in proximity to the user. A captured image, or audio captured from microphones embedded or located near such devices, may be analyzed to determine devices in proximity to the user and/or a distance of the user from the devices.

An orientation of the gesture or of the user performing the gesture relative to one or more other devices may be determined. For example, the context determination module 445 may use captured image data, or other sensor data, to determine whether the user is facing a particular device, looking at a particular device, pointing to a particular device, or the like.

A facial expression and/or speech characteristics of the user performing the gesture may be determined. For example, the context determination module 445 may use one or more techniques for analyzing an image of a user's face and/or body movement to determine a facial expression and/or body language of the user. For example, it may be determined whether the user's facial expression or body language expresses happiness, sadness, frustration, anger, etc. Audio associated with the user's speech, such as the user's voice, e.g., pitch, tone, volume, etc., or even the words used, e.g., as profanity, may be analyzed.

Content being output in the environment may be identified, such as background noise (e.g., children playing 302*p*, a dog barking 302*b*, construction noises, wind, rain, etc.), a doorbell 302*f* ringing, a security system 302*c* alarm sounding, a telephone 302*n* ringing, music playing 302*j*, a program playing 302*j* on the television 302*a*, etc. In some cases, the specific content may be identified, such as a particular program being output on the television 302*a*, a sporting event being output on a radio, etc. For instance, information related to the program being output may be received, such as the title, the duration, associated audio, closed-captioning data, or the like. The program information may be received from a DVR (e.g., from a video file including audio or video associated with the program being output), from a STB, or directly from a head end outputting the program. A broadcast schedule may be used to determine what program is being output or is to be output, and a request, may be sent to the head end, for information (or portions of the information, such as portions of associated audio or closed-captioning data, throughout the program) associated with the program, in some cases, prior to the program being output/broadcast. Any of the information related to the program being output (or to be output) may be used as part of the context determination process.

Additional or different information may be collected for determining the current context, such as a calendar schedule associated with the user, an application being executed on a device associated with the user, a web browsing history associated with the user, one or more activities being performed in the environment, etc.

At step 812*d*, an emotional state 302*z* of the user or an environment may be determined or inferred. For example, the context determination module 445 may determine or infer the emotional state or mood 320*z* associated with the user performing the gesture and/or the environment in which the gesture is performed. For instance, the emotional state or mood 302*z* of the user or the environment may be determined based on other of the collected contextual information, such as the user's facial expression, body language, or speech pattern, based on the activities that are being performed in the environment, based on content or audio output in the environment, such as content playing 302*j* on a television 302*a*, or some combination thereof. The context determination module 445 may infer or predict the emotional state or mood 302*z* based on what it knows will be output in the environment in the near-term. For instance, in advance of output to the user's television 302*a*, a portion of audio or a closed-captioning feed associated with a program to be output may be received. For instance, portions of information (e.g., program audio, closed-captioning feed, etc.) associated with a program being output on the television 302*a* may be received, for example, 1 minute in advance of that portion being output. The received information may be analyzed and a determination may be made that the program may likely elicit a particular emotional state 302*z* of the user, such as excitement for an exciting upcoming scene in a movie. As another example, a person may be detected, by a video camera 302*g*, approaching the user's front door as the user is watching television 302*a*, and a determination may be made that the user is likely to soon express an emotional state 302*z* of frustration for being interrupted by the doorbell 302*f* ringing while the user is watching television 302*a*. In these ways, the facial expression, body language, or speech patterns of the user need not actually be analyzed to determine the user's emotional state 302*z*, and the emotional state or mood 302*z* may instead be inferred based on what is happening in the environment or what may be anticipated to happen in the near-term.

After the environment is analyzed for determining the current context, the method of FIG. 8B may end and the process may proceed to step 814 of FIG. 8A.

Returning to FIG. 8A, at step 814, a determination may be made as to whether to adjust a gesture recognition threshold. For example, the gesture recognition module 443 may determine whether a threshold should be adjusted for recognizing detected gestures as commands for controlling one or more of the gesture-controllable devices 495. As noted above at step 630 of FIG. 6A, one or more gesture recognition thresholds may be set for each gesture configured in the gesture command execution system 400. The gesture recognition threshold may be used to determine when a detected gesture should be recognized as a command intended to control one of the one or more gesture-controllable devices 495. As mentioned above, the gesture recognition threshold may be related to an aspect of the gesture (such as an orientation of the gesture, a speed at which the gesture is performed, a length of time the gesture is performed, a distance of the gesture from a particular device, etc.), and when the gesture is detected one or more of the aspects of the gesture may be measured and compared to its corresponding threshold. If the measured aspect of the gesture satisfies the corresponding gesture recognition threshold (or a threshold quantity of one or more gesture recognition thresholds for the gesture), it may be determined that the detected gesture is intended as a command to control one of the one or more gesture-controllable devices 495. Otherwise, it may be determined that the gesture was an inadvertent movement by the user not intended to control any device. However, before making such a determination, a determination may first be made as to whether the gesture recognition threshold for the detected gesture (and gestures that may be received subsequent to the just-detected gesture) should be adjusted. The determination as to whether the gesture recognition threshold for the gesture (and any future detected gestures) should be adjusted may be based on the current context (as being continuously determined at step 812).

For example, the determination to adjust one or more gesture recognition thresholds may be based on an emotional state 302z of the user performing the gesture as determined from the current context, an emotional mood 302z of the environment in which the gesture is performed as determined from the current context (e.g., if there is a party in the environment and the current context indicates that music is playing in the background, individuals are laughing and dancing, etc.), a user profile of the user making the gesture, etc. For instance, if the "arms raised gesture" is detected and the current context indicates that there is a party 302k occurring in the environment, the gesture recognition threshold may be adjusted, such as by raising the threshold, so that inadvertent movements made by the user, such as raising his arms while dancing, are not incorrectly interpreted as gestures for controlling one of the one or more gesture-controllable devices 495. The gesture recognition module 443 may be pre-configured to determine particular contexts in which the gesture detection thresholds should be adjusted—such as when there is a festive mood in the environment, when the user is determined to be excited or angry—and the degree of any such adjustment. Alternatively or additionally, the user may configure the system to adjust the gesture recognition threshold in certain contexts—such as for a particular user—or may modify the pre-configured settings. Accordingly, if the gesture recognition threshold should be adjusted, then the method may proceed to step 816, otherwise the method may proceed to step 820.

At step 816, the gesture recognition threshold may be adjusted. For example, the gesture recognition module 443 may determine the degree of adjustment based on pre-configured settings or user-defined settings and may adjust the gesture recognition threshold accordingly. In some cases, the gesture recognition threshold may be adjusted higher, such as in the case where the party is detected. Adjusting the gesture recognition threshold higher may mean that the user performing the gesture may have to perform the gesture faster, or longer, or be closer to the gesture detection device, or the like, in order for the gesture to be recognized as one intended to control one of the gesture-controllable devices 495. In some cases, the gesture recognition threshold may be adjusted lower, such as when the threshold was previously raised and the current context now indicates that the previous conditions that caused the threshold to be raised no longer exist, for example, in the case where the party is no longer occurring. In such cases, the gesture recognition threshold may return to its default state (e.g., the threshold value set when the gesture was configured or based on the default threshold value set in response to learned the movement patterns and/or behaviors of the user over time) and the gesture may be performed as normal for recognition as a command to control one of the gesture-controllable devices 495. After, adjusting the gesture recognition threshold, the method may return to step 812 to continue analyzing the environment for determining the current context.

As mentioned, the process of monitoring the environment for detecting gestures and the process of monitoring and analyzing the environment to determine the current context and determine whether gesture recognition thresholds need adjustment may be performed in parallel, such that step 812 and its subsequent steps may be performed concurrently with step 810 and its subsequent steps. For instance, the gesture recognition module 443 and the context determination module 445 may, respectively, perform parallel processes of continually monitoring the environment for gestures and continually monitoring the environment to detect, determine, and/or update the current context and adjust any gesture recognition thresholds if needed. As the context changes, whether or not a gesture has been detected, one or more gesture recognition thresholds may be adjusted so that when a gesture is eventually detected, the context of the current environment may have been determined immediately prior to or during the time the gesture is detected, and the gesture recognition threshold may be reflective of that current context. Alternatively, to reduce processing and computational costs associated with continuously monitoring the environment for the current context, the process of determining the current context and adjusting the gesture recognition thresholds (at steps 812-816) may occur only after initially detecting a gesture (at step 818). Whether the current context is continually determined or is determined only upon or after detection of a gesture, may be configured by the user during the system configuration process.

At step 818, a gesture may be detected. For example, the gesture recognition module 443 may determine, based on monitoring the environment for gestures, that one of the configured gestures has been detected. For instance, based on monitoring the environment using the one or more sensor devices 480, such as a camera, and based on receiving sensor data that matches stored sensor data and/or movement patterns corresponding to those of a configured gesture, a determination may be made that a gesture has been detected. For example, the one or more sensor devices 480 may detect a user performing the "arms raised gesture."

At step 820, stored information associated with the detected gesture may be retrieved. That is, the controllable device/action determination module 447 may retrieve, from the database 432 for example, information identifying the one or more gesture-controllable devices 495 that have been configured to be controlled in response to the detected gesture and/or one or more corresponding actions to be performed. The information may further identify a context in which the gesture may have been configured to control the identified one or more gesture-controllable devices 495 to perform the identified one or more actions.

At step 822, a determination may be made as to whether the gesture is configured to control one or more of the gesture-controllable devices 495 in a particular context. That is, the computing device 401 may control the controllable device/action determination module 447 to determine, based on the retrieved stored information, whether the detected gesture is configured to control the identified one or more gesture-controllable devices 495 to perform the one or more actions in a particular context or whether the identified one or more of the gesture-controllable devices 495 are configured to be controlled regardless of any context. For instance, in some cases, the gesture may have been configured to control the identified one or more gesture-controllable devices 495 without regard to any particular context; and in other cases, the gesture may have been configured to control the identified one or more gesture-controllable devices 495 in only particular contexts. Accordingly, if the gesture was configured to control the one or more gesture-controllable devices 495 regardless of the current context, e.g., the retrieved stored information does not indicate any context information, a step of checking that the current context satisfies a configured context may not apply and may be skipped. In this case, the method may proceed to step 826, otherwise the method may proceed to step 824, where the current context may be checked.

At step 824, the computing device 401 may control the controllable device/action determination module 447 to determine whether the detected gesture is configured to control the identified one or more gesture-controllable devices 495 to perform the one or more actions in the determined current context.

Accordingly, the retrieved stored information identifying the context or contexts for which the detected gesture has been configured to be recognized in may be compared to information identifying the current context (such as determined at step 812). The retrieved stored information identifying the context(s) for which the detected gesture has been configured to be recognized in may indicate one or more contextual data sources that were configured to be used to determine information about the environment, one or more data parameters associated with each of the indicated one or more contextual data sources, and a corresponding parameter value for each of the one or more data parameters. For example, the "arms raised gesture" may have been configured to turn on the television 302a in a context in which the living room television 302a is off. Therefore, it may be determined whether the current context (as determined at step 812) indicates that the television 302a is currently off. For example, for the "arms raised gesture," the retrieved stored information may indicate the following:

---
[contextual data source = "living room television"; data parameter = "operational state"; parameter value = "OFF"]
---

A determination may be made as to whether the information associated with the current context indicates that the value of the "operational state" data parameter for the contextual data source "living room television" is currently "OFF." If so, then it may be determined that the detected gesture is configured to control the identified gesture-controllable device 495 to perform the indicated action (e.g., turning on the television 302a) in the current context.

In some cases, the retrieved stored information may indicate that gesture command is associated with control of more than one gesture-controllable devices 495 and corresponding actions. In such cases, how to interpret which of the different gesture-controllable devices 495 and/or actions the user intended to be performed may be determined based on the context in which the gesture is performed. For instance, the "arms raised gesture" may have been configured to turn on the television 302a in a first context, such as a context in which the living room television 302a is off and the time 302s is 8:00 PM, and to turn on the coffee maker 302r in a second context, such as in a context in which the coffee maker 302r is off and the time 302s is 7:00 AM. Therefore, it may be determined whether the current context (as determined at step 812) indicates that the television 302a is currently off, that the coffee maker 302r is currently off, and/or what the current time is.

For example, for the "arms raised gesture" associated with the action of turning on the television 302a, the retrieved stored information may indicate the following:

---
[contextual data source = "living room television"; data parameter = "operational state"; parameter value = "OFF"]
AND
[contextual data source = "gesture control device"; data parameter = "time"; parameter value = "20:00"]
---

Further, for the "arms raised gesture" associated with the action of turning on the coffee maker 302r, the retrieved stored information may indicate the following:

---
[contextual data source = "coffee maker"; data parameter = "operational state"; parameter value = "OFF"]
AND
[contextual data source = "gesture control device"; data parameter = "time"; parameter value = "07:00"]
---

The retrieved stored information identifying the context(s) may be compared with corresponding information associated with the current context (as determined at step 812). For instance, a determination may be made as to whether the information associated with the current context indicates that the value of the "operational state" data parameter for the contextual data source "living room television" is currently "OFF" and that the value of the "time" data parameter for the contextual data source "gesture control device" is currently "20:00." If so, then it may be determined that the detected gesture is configured to control performance of turning on the television 302a in the current context. If, on the other hand, current context indicates that the value of the "operational state" data parameter for the contextual data source "coffee maker" is currently "OFF" and that the value of the "time" data parameter for the contextual data source "gesture control device" is currently "07:00," then it may be determined that the detected gesture is configured to control performance of turning on the coffee maker 302r.

In some cases, the detected gesture may have been configured to control multiple gesture-controllable devices in the same or overlapping context. For instance, the "arms raised gesture" may have been configured to turn on the bedroom lamp 302o in a first context, such as a context in which the bedroom lamp 302o is off and the time 302s is 7:00 AM, and to turn on the coffee maker 302r in a second context, such as in a context in which the coffee maker 302r is off and the time 302s is 7:00 AM. In this case, since both conditions may be true at the same time, the contexts may be overlapping. Therefore, if the current context satisfies both conditions, the detected gesture may cause both gesture-controllable devices 495 to be controlled. Therefore, it may be determined whether the current context indicates that the bedroom lamp 302o and/or the coffee maker 302r are currently off and/or what the current time is.

For example, for the "arms raised gesture" associated with the action of turning on the bedroom lamp 302o, the retrieved stored information may indicate the following:

[contextual data source = "bedroom lamp"; data parameter = "operational state"; parameter value = "OFF"]
AND
[contextual data source = "gesture control device"; data parameter = "time"; parameter value = "07:00"]

And for the "arms raised gesture" associated with the action of turning on the coffee maker 302r, the retrieved stored information may indicate the following:

[contextual data source = "coffee maker"; data parameter = "operational state"; parameter value = "OFF"]
AND
[contextual data source = "gesture control device"; data parameter = "time"; parameter value = "07:00"]

Accordingly, a determination may be made as to whether the information associated with the current context indicates that the value of the "operational state" data parameter for the contextual data source "bedroom lamp" is currently "OFF" and that the value of the "time" data parameter for the contextual data source "gesture control device" is currently "07:00." If so, then it may be determined that the detected gesture is configured to turn on the bedroom lamp 302o in the current context. A further determination may be made as to whether the detected gesture is configured to perform any other actions in the current context. For instance, a determination may be made as to whether the information associated with the current context indicates that the value of the "operational state" data parameter for the contextual data source "coffee maker" is currently "OFF" and that the value of the "time" data parameter for the contextual data source "gesture control device" is currently "07:00." If so, then it may be determined that the detected gesture is additionally configured to turn on the coffee maker 302r in the current context. In this case, both the bedroom lamp 302o and the coffee maker 302r may be controlled based on detection of the "arms raised gesture."

Accordingly, if it is determined that the gesture is configured to control performance of the one or more of the identified actions in the current context, the method may proceed to step 826. Otherwise, if it is determined that the information identifying the current context does not match the retrieved stored information identifying the context(s) associated with the detected gesture, then the detected gesture may be ignored and the method may return to step 810 to again monitor the environment for a gesture command.

At step 826, a determination may be made as to whether the detected gesture satisfies one or more gesture recognition thresholds. For example, the gesture recognition module 443 may determine whether the detected gesture satisfies the gesture recognition threshold for recognizing the gesture as a command to control one of the gesture-controllable devices 495. In some cases, the gesture recognition threshold may be the adjusted threshold after performance of step 816. As mentioned, the gesture recognition threshold may relate to an aspect of the gesture, such as an orientation of the gesture, a speed at which the gesture is performed, a length of time the gesture is performed, a distance of the gesture from a particular device, etc. The various aspects of the detected gesture may be measured and compared to one or more of the gesture's corresponding gesture recognition thresholds. If one or more of the measured gesture aspects satisfies the configured threshold quantity (as configured at step 630 of FIG. 6A) of the corresponding gesture recognition thresholds that are required to be satisfied, it may be determined that the detected gesture is an intentional gesture command, and the method may proceed to step 828. Otherwise the detected gesture may be treated as an unintended movement and ignored, and the method may return to step 810 to continue monitoring for gestures. Step 826 may alternatively be performed after step 818 and before step 820, such that the determination regarding whether the detected gesture is intended to control a device is determined prior to retrieving stored information associated with the detected gesture.

After determining that the detected gesture is an intended gesture for controlling the identified one or more of the gesture-controllable devices 495 to perform one or more actions in the current context, then at step 828, the determined one or more gesture-controllable devices 495 may be controlled to perform the one or more determined actions. For example, the computing device 401 may control the action determination module 449 to cause the one or more determined gesture-controllable devices 495 to perform the one or more determined actions. For instance, the action determination module 449 may cause the television 302a, the bedroom lamp 302o, and/or the coffee maker 302r to be turned on. The action determination module 449 may cause the determined gesture-controllable devices 495 to perform the one or more determined actions by sending control commands to the one or more determined gesture-controllable devices 495. The control commands may be sent via wireless or wired connections to the determined gesture-controlled devices 495. The control commands may be sent wirelessly when the determined gesture-controllable devices 495 have wireless capabilities. As an example, where the determined gesture-controllable device 495 has IEEE 802.11 Wi-Fi capabilities, the action determination module 449 may cause the computing device 401 to connect and send the control commands to the gesture-controllable device 495 via Wi-Fi. As another example, where the determined gesture-controllable device 495 has Bluetooth capabilities, the action determination module 449 may cause the computing device 401 to connect and send the control commands to the gesture-controllable device 495 via Bluetooth. Other wireless communication protocols may, additionally or alternatively, be used to send control commands from the computing device 401 to the gesture-controllable devices 495. Alternatively, if the determined gesture-controllable device 495 is physically wired to the computing device 401 via control wires, then the action determination module 449 may cause the computing device 401 to send the control commands to the gesture-controllable device 495 via the wired connection. When multiple controllable devices 495 are to be controlled or multiple actions are to be performed, a further determination may be made, based on configuration information, of a sequence of controlling the gesture-controllable devices 495 and performing the actions. For instance, the order in which of the bedroom lamp 302o and the coffee maker 302r are to be controlled may be determined based on the stored configuration information. Information identifying the detected gesture and the contextual information may additionally or alternatively be sent to the one or more determined gesture-controllable devices 495, and the one or more determined gesture-controllable device 495 may use the contextual information to interpret the gesture to determine the action(s) to be performed, and the gesture-controllable devices 495 may then perform the determined action(s). After controlling the gesture-controllable devices 495 to perform the actions, the method may then return to step 810 to again monitor the environment for a gesture.

FIGS. 9 and 10A-10H provide example contextual scenarios and corresponding actions performed in response to a detected gesture, such as described with respect to the method of FIG. 8A-8B.

Referring to FIGS. 9 and 10A-10H, examples of different contextual scenarios in which a gesture may be detected and how the gesture may be interpreted in view of the particular contextual scenario are provided. In each of the example contextual scenarios, the user 304 may be located in a room of the premises 301 having one or more contextual data source devices for determining a context, one or more sensor devices 480, such as a camera (not shown), for detecting when the user 304 performs a gesture, and one or more gesture-controllable devices 495 that may be controlled based on detecting the gesture. In some cases, the one or more contextual data source devices and the one or more gesture-controllable devices 495 may be the same devices. Further, in each of the example scenarios, for simplicity of explanation, the user 304 may perform the same "arms raised gesture." The gesture command execution system 400 may have been previously configured to recognize the "arms raised gesture" and, based on the context in which the gesture is performed, to control one or more of the gesture-controllable devices 495 to perform one or more actions. The device to be controlled and/or the action to be performed may differ depending on the context in which it is detected. In some cases, the context will be such that no device is to be controlled—e.g., the gesture command execution system 400 might not have been configured to recognize the gesture as one that should control a device in the particular context; or a gesture recognition threshold used for determining whether the gesture was intended as a command to control a device may have been set or adjusted to filter out unintentional gestures. In each of the example scenarios, for simplicity of explanation, only an emotional state/mood 302z of the user performing the gesture or of the environment in which the gesture is performed is used in determining whether the gesture recognition threshold necessitates adjustment. However, as previously discussed, the gesture recognition threshold may be adjusted for other reasons as well. It is also further assumed in each of the example scenarios for simplicity of explanation, that only one gesture recognition threshold has been configured for the "arms raised gesture." Further, the process described with respect to each of the provided scenarios may be performed by any desired computing device, which may serve as a gesture control device, such as the computing device 401.

Figure 10A:
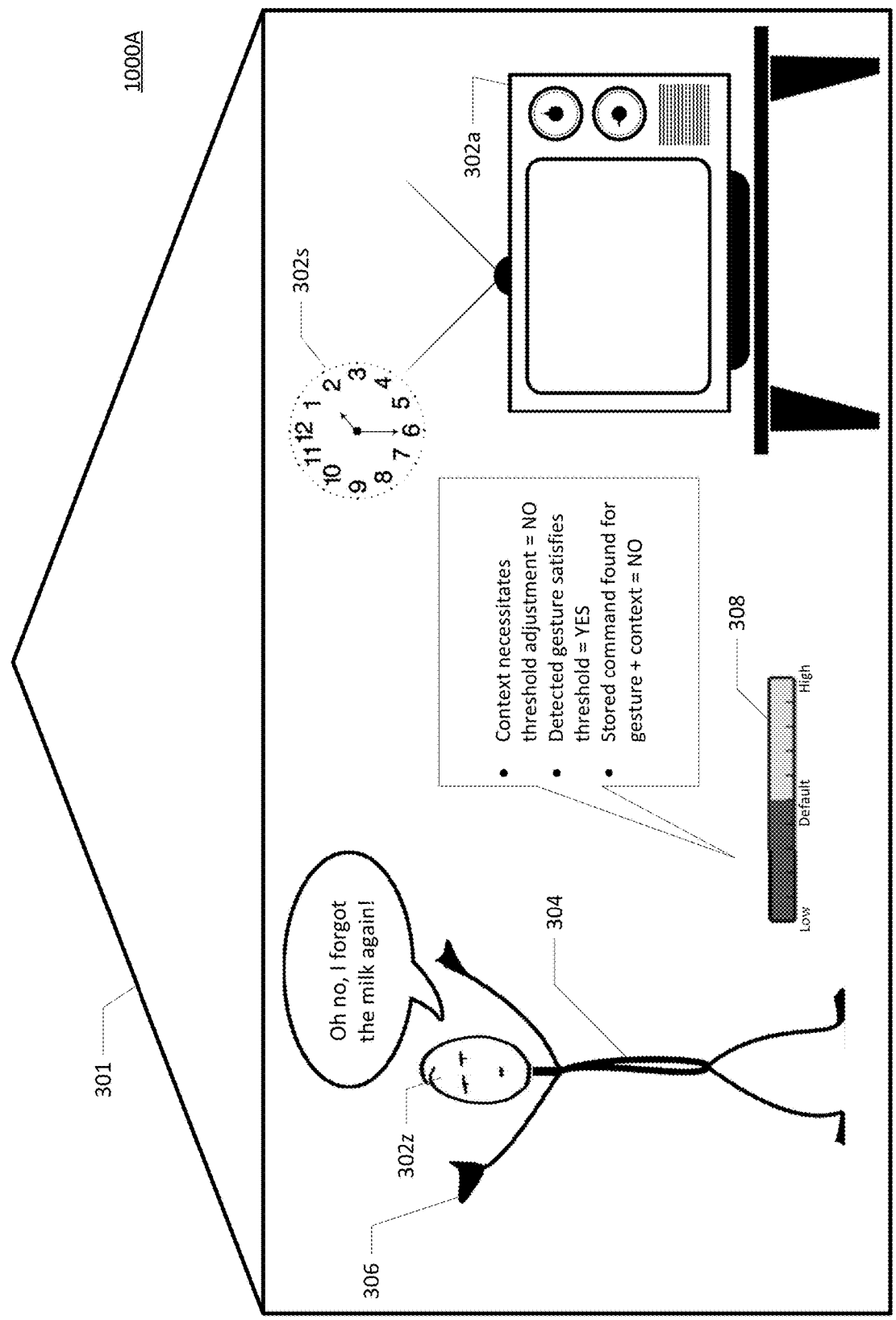

Referring to FIG. 9 and FIG. 10A, in example contextual scenario 1000A, the user 304 may be located at the premises 301 in a room having the television 302a. In this contextual scenario, the gesture control device, such as the computing device 401 (used for determining the time 302r) and the television 302a may serve as contextual data sources, e.g., to be used in determining the current context. Additionally, in this scenario, the television 302a may also serve as the gesture-controllable device 495, e.g., the device to potentially be controlled based on detecting a gesture. In this scenario, the "arms raised gesture" may have been configured, such as shown below in Table 1, to turn on the television 302a in a context where the television 302a is in the OFF state and where the time 302r is between 6:00 PM and 11:00 PM. Table 1 may reflect the stored data after the gesture has been configured at steps 626-636 of FIG. 6A.

TABLE 1

| Gesture | Controllable Device | Action/ Command | Context Name | Contextual Data Source | Parameter | Parameter Value |
|---|---|---|---|---|---|---|
| Arms Raised Gesture | Television 302a | Turn On | Context A | Television 302a | Operational State | OFF |
|  |  |  |  | Gesture Control Device | Start Time | 6:00 PM |
|  |  |  |  | Gesture Control Device | End Time | 11:00 PM |

In contextual scenario 1000A, the gesture recognition module 443 and the context determination module 445 may operate in parallel to monitor the environment for gestures and to collect information for determining the current context of the environment, respectively. Based on the information collected about the current context, the gesture recognition module 443 may determine whether the gesture recognition threshold 308 for the gesture requires adjustment. The gesture recognition module 443 may determine, based on the information collected about the current context, such as the emotional state 302z, that the gesture recognition threshold 308 need not be adjusted. The gesture recognition module 443 may detect the "arms raised gesture" and may compare the detected gesture with the default gesture recognition threshold 308 set for the gesture. The gesture recognition module 443 may determine that the detected gesture satisfies the default gesture recognition threshold 308. Accordingly, the controllable device/action determination module 447 of the computing device 401 may determine whether the gesture is configured to control one of the one or more gesture-controllable devices 495 in the current context. The controllable device/action determination module 447 may retrieve stored information associated with the gesture, such as shown above in Table 1, and may determine that the gesture is not configured to control a device in the current context. That is because, in the current context, while the television 302a is in the OFF state, the time 302r at which the gesture is performed is 1:30 PM, however the gesture in this scenario has been configured to control the television 302a between 6 PM and 11 PM, as shown in Table 1. Accordingly, the gesture recognition module 443 may ignore the detected gesture and return to monitoring for additional gestures. In this scenario, the user may have simply raised his arms because he realized he forgot to buy milk and did not actually intend to control the television.

Figure 10B:
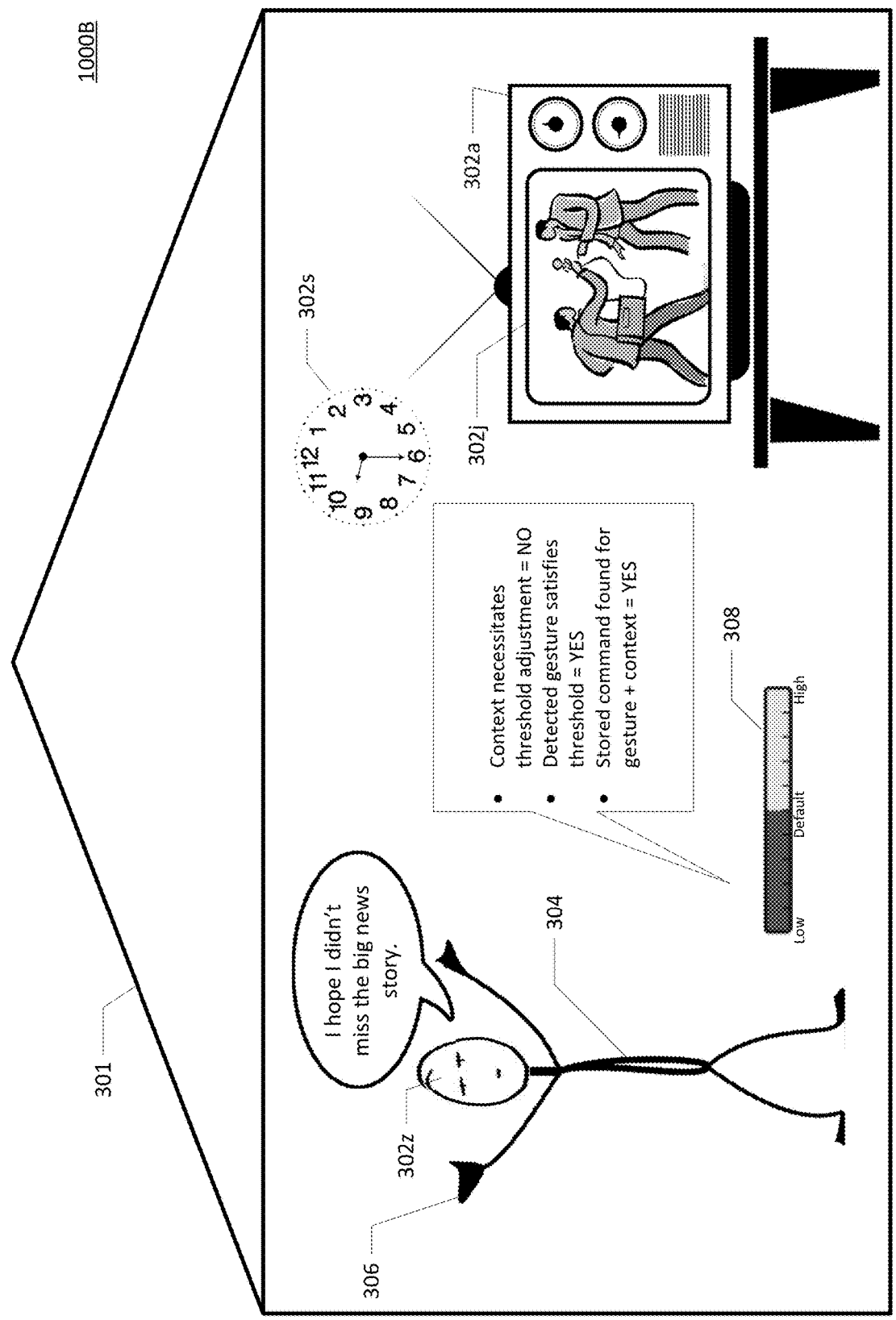

Referring to FIG. 9 and FIG. 10B, in example contextual scenario 1000B, the user 304 may be located at the premises 301 in a room having the television 302a. In this contextual scenario, the gesture control device, such as computing device 401 (used for determining the time 302r) and the television 302a may serve as contextual data sources. The television 302a may also serve as the gesture-controllable device 495. In this scenario, the "arms raised gesture" may have been configured, such as shown below in Table 2, to turn the television 302a ON and to tune the television 302a to channel 4, in a context where the television 302a is in the OFF state and where the time 302r is between 6 PM and 11 PM. Table 2 may reflect the stored data after the gesture has been configured at steps 626-636 of FIG. 6A.

In contextual scenario 1000B, the gesture recognition module 443 and the context determination module 445 may operate in parallel to monitor the environment for gestures and to collect information for determining the current context of the environment, respectively. Based on the information collected about the current context, such as the emotional state 302z, the gesture recognition module 443 may determine that the gesture recognition threshold 308 need not be adjusted. The gesture recognition module 443 may detect the "arms raised gesture" and may determine that the detected gesture satisfies the default gesture recognition threshold 308 that was set for the gesture. Since the gesture satisfies the gesture recognition threshold 308, the controllable device/action determination module 447 may determine whether the gesture is configured to control one of the gesture-controllable devices 495 in the current context. The controllable device/action determination module 447 may retrieve stored information associated with the gesture, such as shown in Table 2, and may determine that the gesture is configured to control the television 302a in the current context. That is because, in the current context, the television 302a is in the OFF state, and the time 302r at which the gesture is performed, i.e., 9:30 PM, is between 6:00 PM and 11:00 PM. Accordingly, the action performance module 447 may send a control command to the television 302a to turn on and to tune to channel 4. In this scenario, the user really did intend to have the gesture control the television 302a.

Figure 10C:
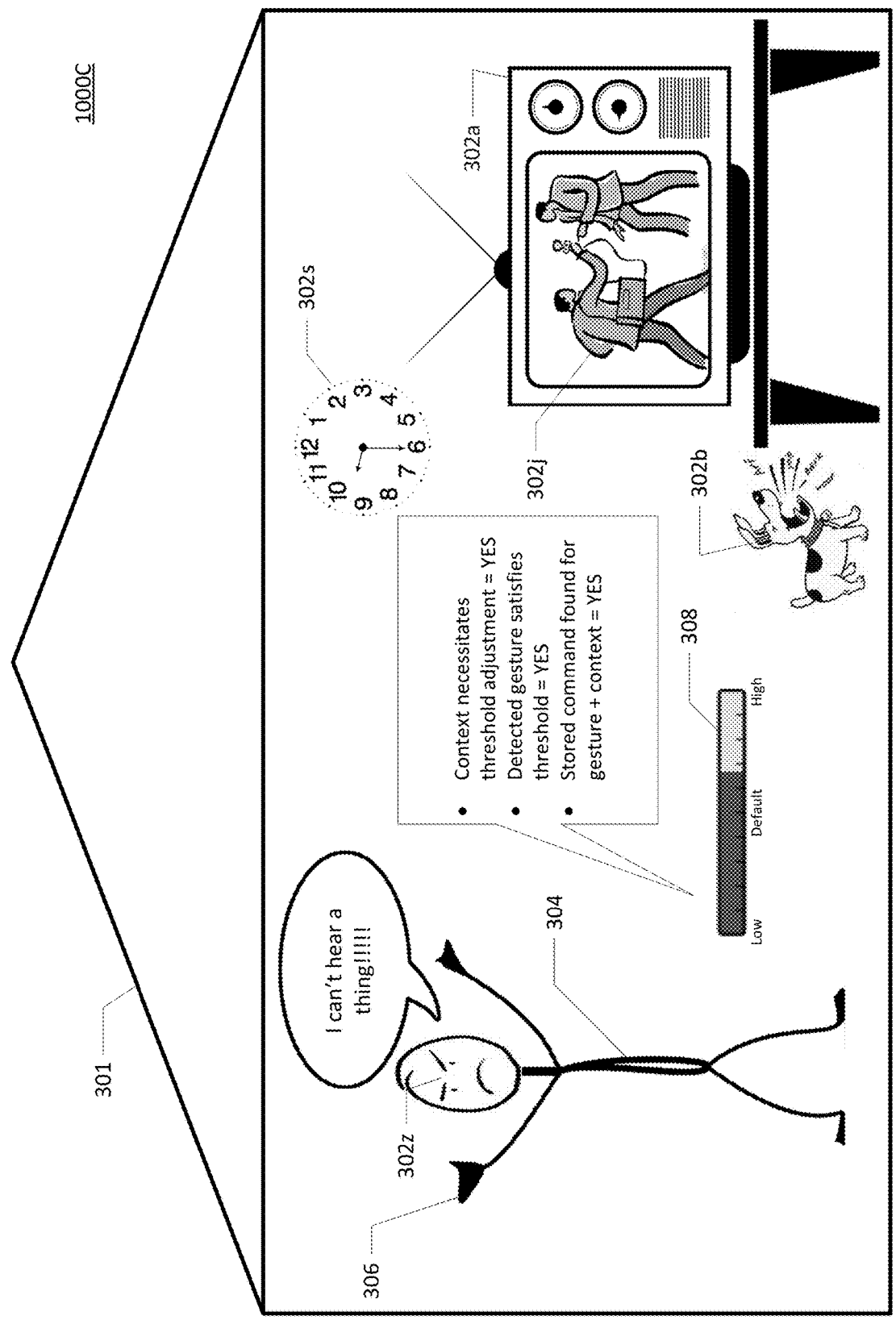

Referring to FIG. 9 and FIG. 10C, in example contextual scenario 1000C, the user 304 may be located at the premises 301 in a room having the television 302a. In this contextual scenario, the microphone 302h (used for detecting background noise 302b) and the television 302a may serve as contextual data sources. The television 302a may also serve as the gesture-controllable device 495. In this scenario, the "arms raised gesture" may have been configured, such as shown below in Table 3, to raise the volume of the television 302a two levels in the context where the television 302a is in the ON state and where background noise 302b is greater than 65 decibels. Table 3 may reflect the stored data after the gesture has been configured at steps 626-636 of FIG. 6A.

TABLE 2

| Gesture | Controllable Device | Action/ Command | Context Name | Contextual Data Source | Parameter | Parameter Value |
|---|---|---|---|---|---|---|
| Arms Raised Gesture | Television 302a | Turn On; Tune Channel 4 | Context B | Television 302a | Operational State | OFF |
|  |  |  |  | Gesture Control Device | Start Time | 6:00 PM |
|  |  |  |  | Gesture Control Device | End Time | 11:00 PM |

TABLE 3

| Gesture | Controllable Device | Action/Command | Context Name | Contextual Data Source | Parameter | Parameter Value |
|---|---|---|---|---|---|---|
| Arms Raised Gesture | Television 302a | Turn Volume up 2 levels | Context C | Television 302a Microphone 302h | Operational State Background Noise | ON >65 dB |

In contextual scenario 1000C, the gesture recognition module 443 and the context determination module 445 may operate in parallel to monitor the environment for gestures and to collect information for determining the current context of the environment, respectively. Based on the information collected about the current context, such as the emotional state 302z, the gesture recognition module 443 may determine that the gesture recognition threshold 308 necessitates adjustment. Here the emotional state 302z may have been determined or inferred based on an indication that the television 302a is on and an indication that background noise 302b, for example a barking dog, registers at 70 db. In this context, it may be inferred that the user's emotional state 302z may be frustration. Further, the emotional state 302z of frustration may cause the user to raise his arms as a way of expressing frustration, and in such cases the user may not intend to actually control a device with such movement. Accordingly, the gesture recognition threshold 308 may be raised to require the user to perform a more intentional gesture to control a device—such as to perform the gesture for an extended period of time, perform the gesture faster, perform the gesture closer to the gesture detection device, etc. The gesture recognition module 443 may detect the "arms raised gesture" and may determine whether the detected gesture satisfies the adjusted gesture recognition threshold 308. In this scenario, the gesture recognition module 443 may determine that the user performs the gesture in a manner that satisfies the gesture recognition threshold 308. The controllable device/action determination module 447 may then determine whether the gesture is configured to control any of the gesture-controllable devices 495 in the current context. The controllable device/action determination module 447 may retrieve stored information associated with the gesture, such as shown in Table 3, and may determine that the gesture is configured to control the television 302a in the current context. That is because, in the current context, the television 302a is in the ON state, and the background noise 302b is greater than 65 decibels. Accordingly, the action performance module 447 may send a control command to the television 302a to turn the volume up two levels. In this scenario, although the user was frustrated by the noise and the user's emotional state 302z caused the gesture recognition threshold 308 to be adjusted, the user performed the gesture in an intentional manner (such as faster, longer, closer to the device, etc.) that satisfied the adjusted gesture recognition threshold 308.

Referring to FIG. 9 and FIG. 10D, in example contextual scenario 1000D, the user 304 may be located at the premises 301 in a room having the television 302a. In this contextual scenario, the telephone 302n and the television 302a may serve as contextual data sources. The television 302a may also serve as the gesture-controllable device 495. In this scenario, the "arms raised gesture" may have been configured, such as shown in Table 4, to pause the television 302a in the context where the television 302a is in the ON state and an incoming call is received on the telephone 302n. Table 4 may reflect the stored data after the gesture has been configured at steps 626-636 of FIG. 6A.

TABLE 4

| Gesture | Controllable Device | Action/Command | Context Name | Contextual Data Source | Parameter | Parameter Value |
|---|---|---|---|---|---|---|
| Arms Raised Gesture | Television 302a | Pause | Context D | Television 302a Telephone 302n | Operational State Incoming Call | ON YES |

In contextual scenario 1000D, the gesture recognition module 443 and the context determination module 445 may operate in parallel to monitor the environment for gestures and to collect information for determining the current context of the environment, respectively. Based on the information collected about the current context, such as the emotional state 302z, the gesture recognition module 443 may determine that the gesture recognition threshold 308 need not be adjusted. The gesture recognition module 443 may detect the "arms raised gesture" and may determine that the detected gesture satisfies the default gesture recognition threshold 308. Since the gesture satisfies the gesture recognition threshold 308, the controllable device/action determination module 447 may determine whether the gesture is configured to control any of the gesture-controllable devices 495 in the current context. The controllable device/action determination module 447 may retrieve stored information associated with the gesture, such as shown in Table 4, and may determine that the gesture is configured to control the television 302a in the current context. That is because, in the current context, the television 302a is in the ON state and an incoming call is received on the telephone 302n. Accordingly, the action performance module 447 may send a control command to the television 302a to pause.

Figure 10E:
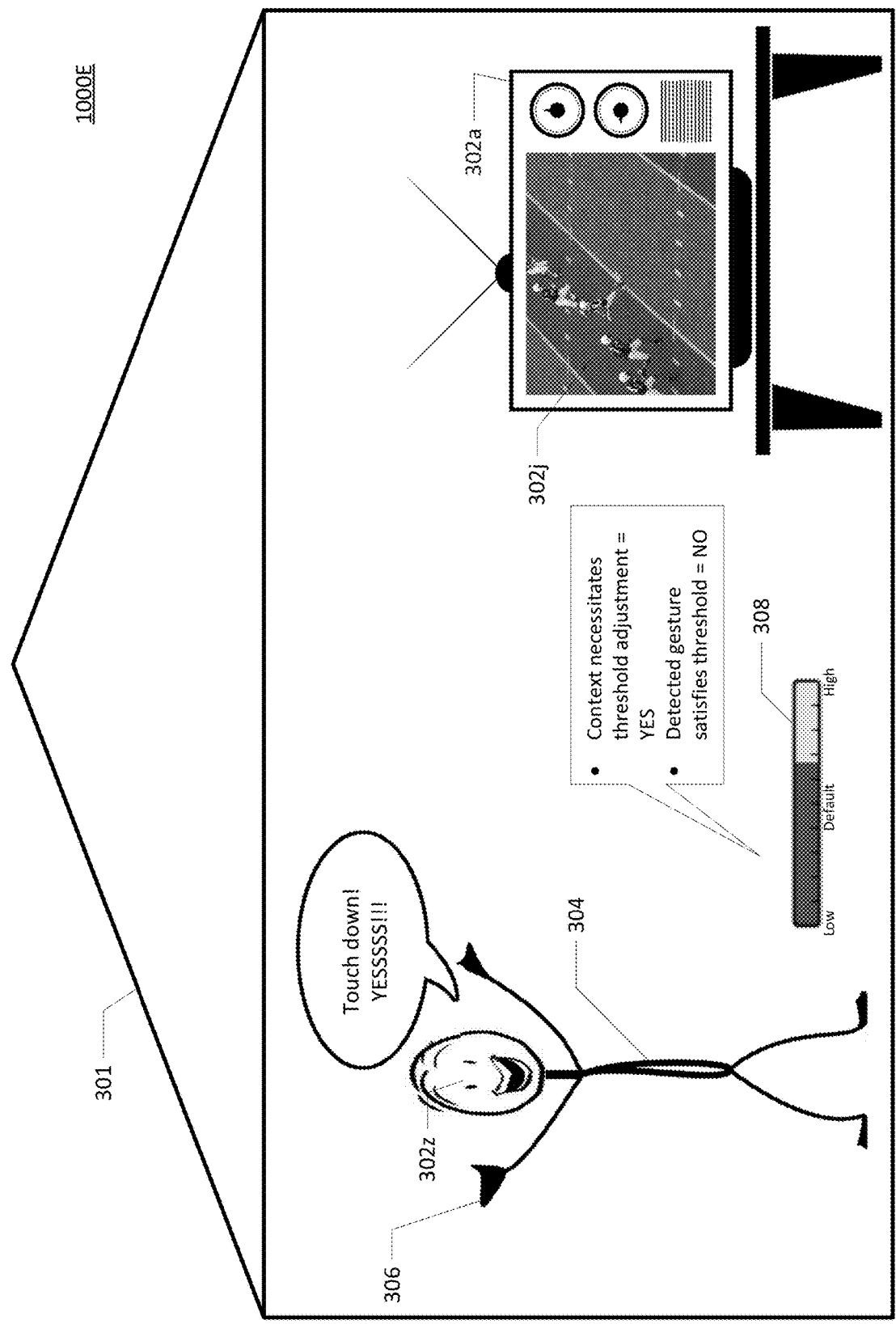

Referring to FIG. 9 and FIG. 10E, in example contextual scenario 1000E, the user 304 may be located at the premises 301 in a room having the television 302a. In this contextual scenario, the television 302a and content 302j being output from the television 302a may serve as contextual data sources. The television 302a may also serve as the gesture-controllable device 495. In this scenario, the "arms raised gesture" may have been configured, such as shown in Table 5, to turn the television 302a OFF in a context where the television 302a is in the ON state. Table 5 may reflect the stored data after the gesture has been configured at steps 626-636 of FIG. 6A.

TABLE 5

| Gesture | Controllable Device | Action/ Command | Context Name | Contextual Data Source | Parameter | Parameter Value |
|---|---|---|---|---|---|---|
| Arms Raised Gesture | Television 302a | Turn Off | Context E | Television 302a | Operational State | ON |

In contextual scenario 1000E, the gesture recognition module 443 and the context determination module 445 may operate in parallel to monitor the environment for gestures and to collect information for determining the current context of the environment, respectively. Based on the information collected about the current context, such as the emotional state 302z, the gesture recognition module 443 may determine that the gesture recognition threshold 308 necessitates adjustment. Here the emotional state 302z may have been determined or inferred based on the content 302j output from the television 302a indicating that a score was detected in the football game being output. In this context, it may be inferred that the user's emotional state 302z may be excitement. Further, the emotional state 302z of excitement may cause the user to raise his arms as a way of expressing excitement, and in such cases the user may not intend to actually control a device with such movement. Accordingly, the gesture recognition threshold 308 may be raised to require the user to perform a more intentional gesture to control a device—such as to perform the gesture for an extended period of time, perform the gesture faster, perform the gesture closer to the gesture detection device, etc. The gesture recognition module 443 may detect the "arms raised gesture" and may determine whether the detected gesture satisfies the adjusted gesture recognition threshold 308. In this scenario, the gesture recognition module 443 may determine that the user does not perform the gesture in a manner that satisfies the gesture recognition threshold 308. The gesture recognition module 443 may, in this case, simply ignore the detected the gesture. Here, the user did not intend to control the television 302a to turn off and was simply raising his arms in excitement.

Figure 10F:
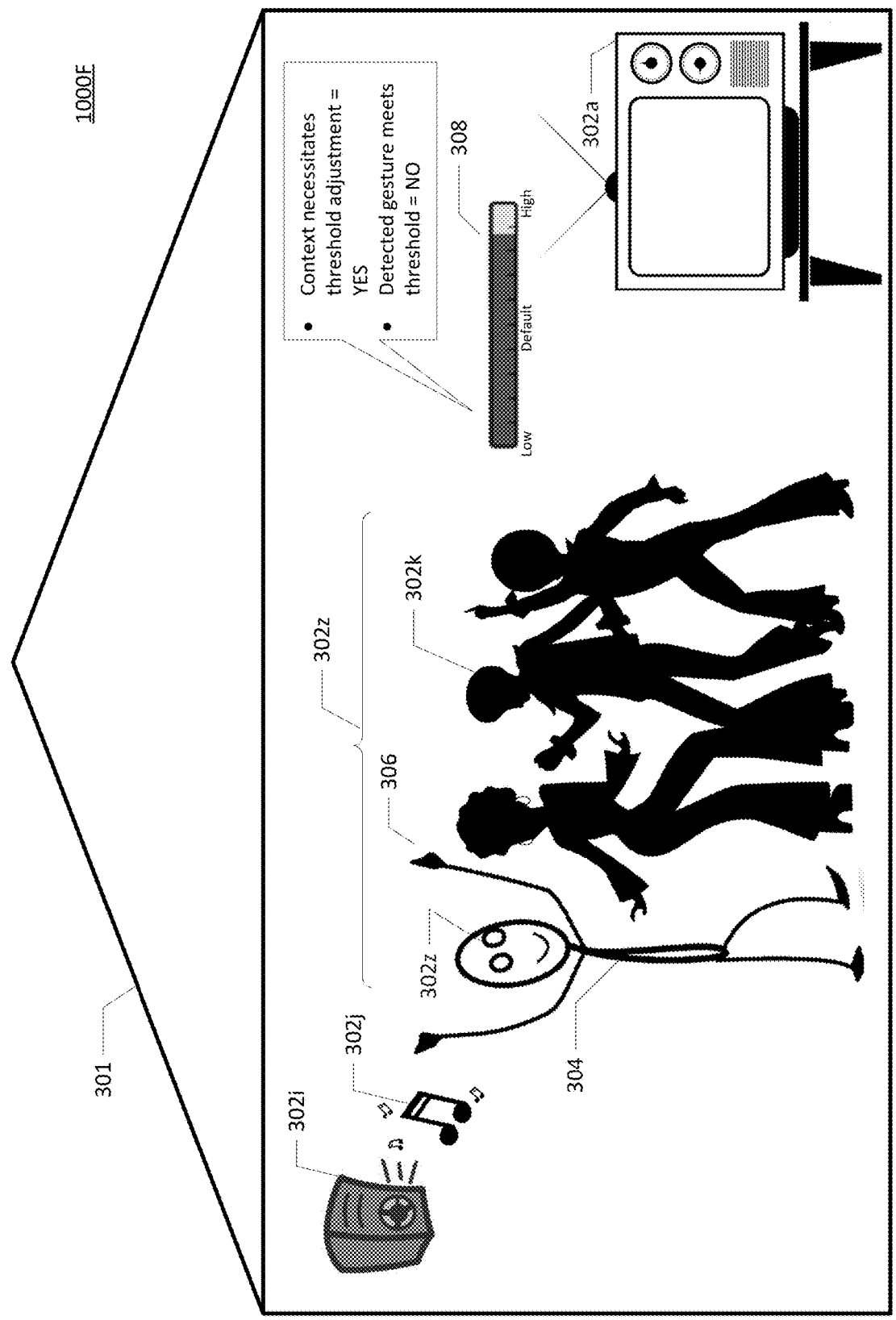

Referring to FIG. 9 and FIG. 10F, in example contextual scenario 1000F, the user 304 may be located at the premises 301 in a room having the television 302a. In this contextual scenario, the television 302a, the speaker device 302i, and the content 302j being output from the speaker device 302i may serve as contextual data sources. The television 302a may also serve as the gesture-controllable device 495. In this scenario, the "arms raised gesture" may have been configured, such as shown in Table 6, to turn on the television 302a in a context where the television 302a is in the OFF state. Table 6 may reflect the stored data after the gesture has been configured at steps 626-636 of FIG. 6A.

In contextual scenario 1000F, the gesture recognition module 443 and the context determination module 445 may operate in parallel to monitor the environment for gestures and to collect information for determining the current context of the environment, respectively. Based on the information collected about the current context, such as the emotional state 302z of the environment, the gesture recognition module 443 may determine that the gesture recognition threshold 308 necessitates adjustment. Here the emotional state 302z may have been determined or inferred based on the content 302j output from the speaker device 302i and an activity, such as a party 302k, detected in the environment. In this context, it may be inferred that the emotional state 302z of the environment may be excitement. As previously noted, the emotional state 302z of excitement may cause the user to raise his arms as a way of expressing excitement, and in such cases the user may not intend to actually control a device with such movement. Accordingly, the gesture recognition threshold 308 may be raised to require the user to perform a more intentional gesture to control a device. The gesture recognition module 443 may detect the "arms raised gesture" and may determine whether the detected gesture satisfies the adjusted gesture recognition threshold 308. In this scenario, the gesture recognition module 443 may determine that the user does not perform the gesture in a manner that satisfies the gesture recognition threshold 308. The gesture recognition module 443 may, in this case, simply ignore the detected the gesture. Here, the user did not intend to control the television 302a to turn on and was simply raising his arms in excitement while dancing.

Figure 10G:
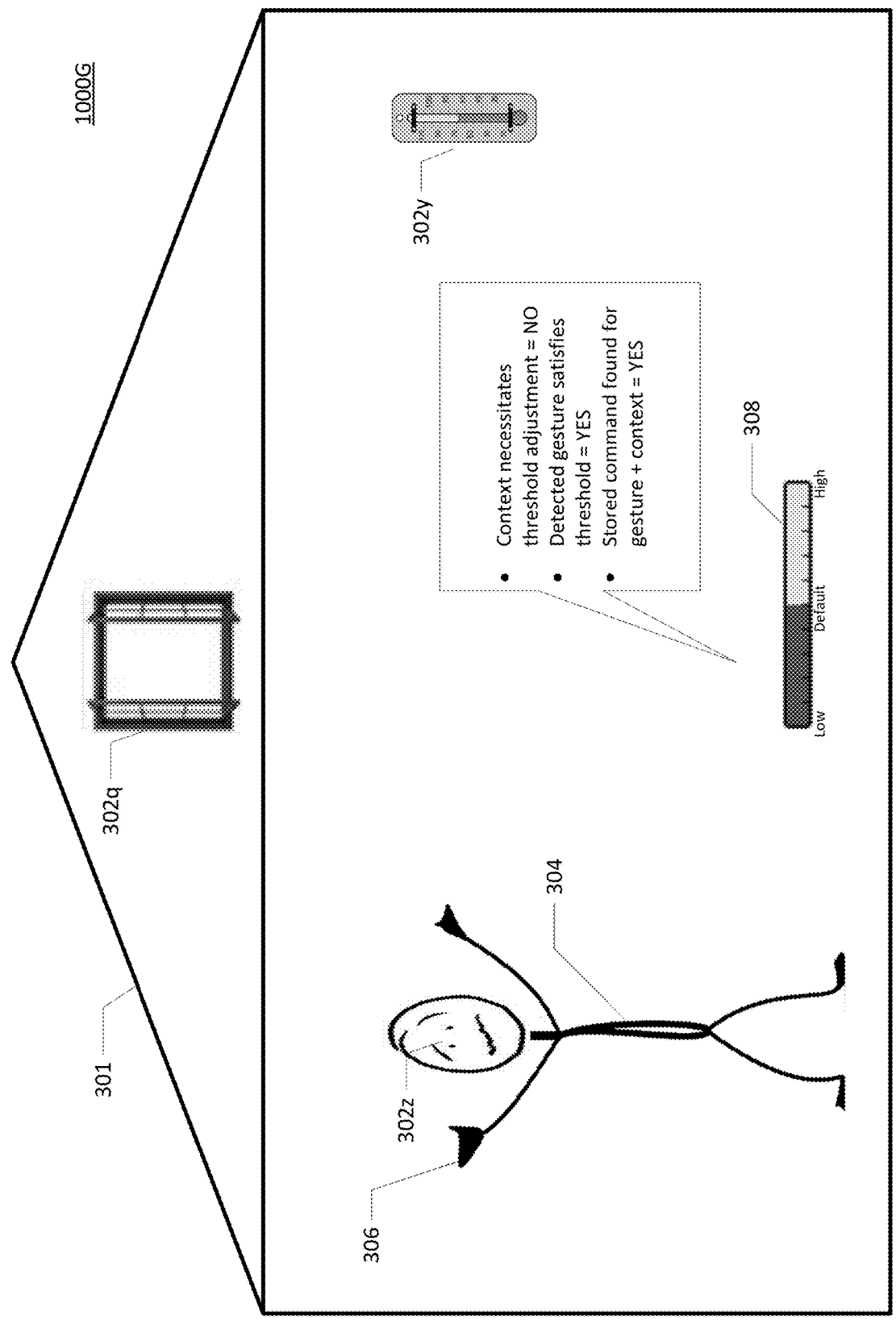

Referring to FIG. 9 and FIG. 10G, in example contextual scenario 1000G, the user 304 may be located at the premises 301 in a room having the thermostat 302y. In this contextual scenario, the thermostat 302y, a window 302q, and the gesture control device, such as the computing device 401 (used for determining the user's emotional state 302z) may serve as contextual data sources. The thermostat 302y may also serve as the gesture-controllable device 495. In this scenario, the "arms raised gesture" may have been configured, such as shown below in Table 7, to raise a temperature level five degrees on the thermostat 302y in a context where the thermostat 302y registers a temperature below 70 degrees Fahrenheit, the window 302q is in an open state, and the user's emotional state 302z is discomfort.

TABLE 6

| Gesture | Controllable Device | Action/ Command | Context Name | Contextual Data Source | Parameter | Parameter Value |
|---|---|---|---|---|---|---|
| Arms Raised Gesture | Television 302a | Turn On | Context F | Television 302a | Operational State | OFF |

TABLE 7

| Gesture | Controllable Device | Action/ Command | Context Name | Contextual Data Source | Parameter | Parameter Value |
|---|---|---|---|---|---|---|
| Arms Raised Gesture | Thermostat 302y | Raise temperature 5 degrees | Context G | Thermostat 302y | Temperature | <70 degrees |
| | | | | Window 302q | State | Open |
| | | | | Gesture Control Device | User Emotional State | Discomfort |

In contextual scenario 1000G, the gesture recognition module 443 and the context determination module 445 may operate in parallel to monitor the environment for gestures and to collect information for determining the current context of the environment, respectively. Based on the information collected about the current context, such as the emotional state 302z, the gesture recognition module 443 may determine that the gesture recognition threshold 308 need not be adjusted. The gesture recognition module 443 may detect the "arms raised gesture" and may determine that the detected gesture satisfies the default gesture recognition threshold 308. Since the gesture satisfies the gesture recognition threshold 308, the controllable device/action determination module 447 may determine whether the gesture is configured to control any of the gesture-controllable devices 495 in the current context. The controllable device/action determination module 447 may retrieve stored information associated with the gesture, such as shown in Table 7, and may determine that the gesture is configured to control the thermostat 302y in the current context. The controllable device/action determination module 447 may determine that the gesture is configured to control the thermostat 302y in the current context, because in the current context, the thermostat 302y has registered a temperature that is below 70 degrees (i.e., it is 58 degrees), the window 302q is in an open state, and the user's emotional state 302z is discomfort. Accordingly, the action performance module 447 may send a control command to the thermostat 302y to raise the temperature level by 5 degrees.

Figure 10H:
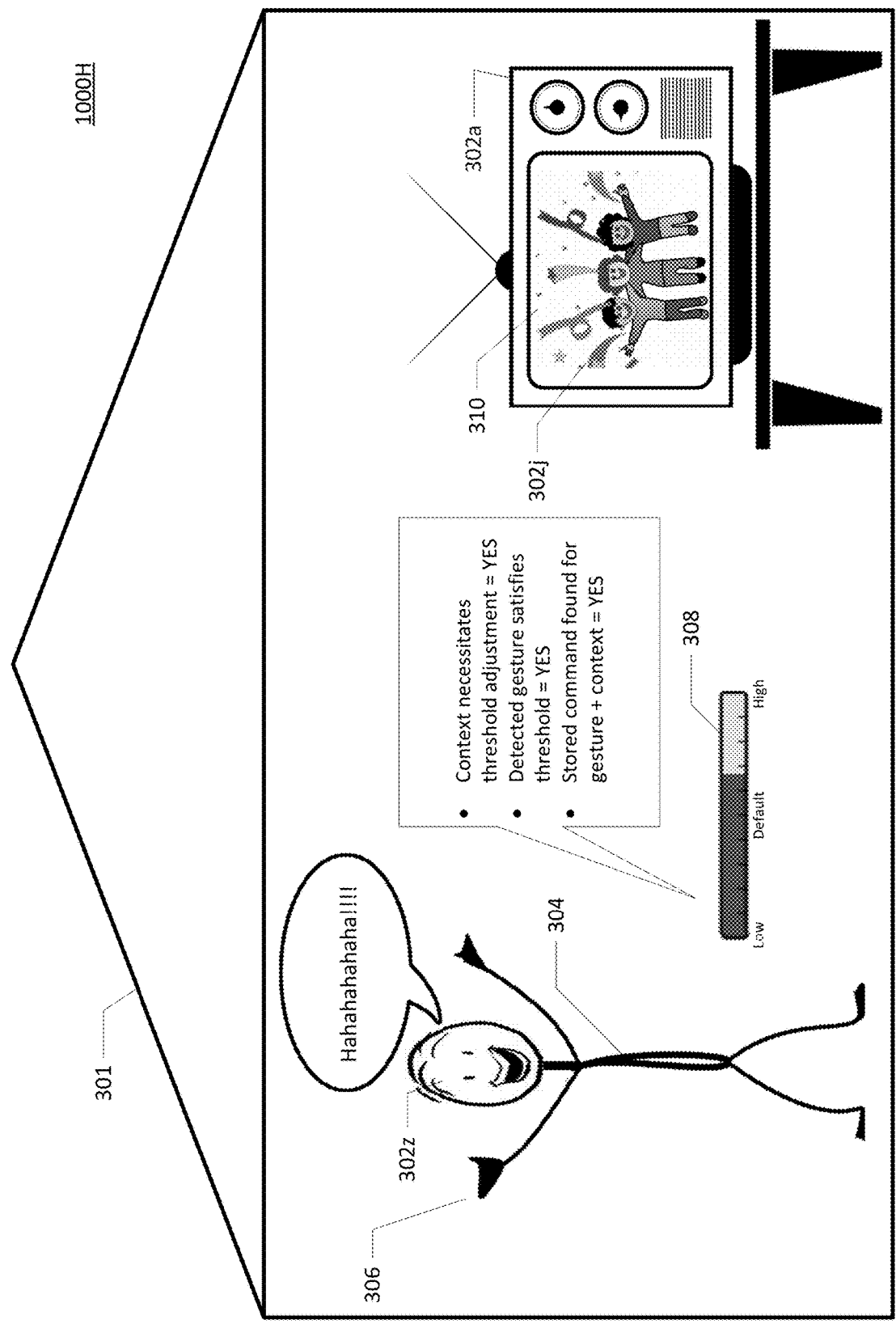

Referring to FIG. 9 and FIG. 10H, in example contextual scenario 1000H, the user 304 may be located at the premises 301 in a room having the television 302a. In this contextual scenario, the microphone 302h (used for detecting background noise 302b) and the television 302a may serve as contextual data sources. The television 302a may also serve as the gesture-controllable device 495. In this scenario, the "arms raised gesture" may have been configured, such as shown below in Table 8, to raise the volume of the television 302a two levels in the context where the television 302a is in the ON state and where background noise 302b is greater than 65 decibels and to additionally output supplemental content 310 to the television 302a. Table 8 may reflect the stored data after the gesture has been configured at steps 626-636 of FIG. 6A.

In contextual scenario 1000H, the gesture recognition module 443 and the context determination module 445 may operate in parallel to monitor the environment for gestures and to collect information for determining the current context of the environment, respectively. Based on the information collected about the current context, such as the emotional state 302z, the gesture recognition module 443 may determine that the gesture recognition threshold 308 necessitates adjustment. Here the emotional state 302z may have been determined or inferred based on the content 302j output from the television 302a indicating a type of content, such as a children's show (or a movie, sporting event, a horror show, or any other type of content specified) is playing and based on an indication that background noise 302b, for example laughter, screaming, squealing, cheering, or other sounds of excitement, registers at 70 db. Additional information collected about the current context may be used, such as detection of one or more users facing, watching, or being in a viewing area of the television 302a (not shown), or detection of body movements of one or more users increasing (not shown). In this context, it may be inferred that the emotional state 302z of user (or others in the environment) may be excitement. Further, the emotional state 302z of excitement may cause the user to raise his arms as a way of expressing excitement, and in such cases the user may not intend to actually control a device with such movement. Accordingly, the gesture recognition threshold 308 may be raised to require the user to perform a more intentional gesture to control a device—such as to perform the gesture for an extended period of time, perform the gesture faster, perform the gesture closer to the gesture detection device, etc. The gesture recognition module 443 may detect the "arms raised gesture" and may determine whether the detected gesture satisfies the adjusted gesture recognition threshold 308. In this scenario, the gesture recognition module 443 may determine that the user performs the gesture in a manner that satisfies the gesture recognition threshold 308. The controllable device/action determination module 447 may then determine whether the gesture is configured to control any of the gesture-controllable devices 495 in the current context. The controllable device/action determination module 447 may retrieve stored information associated with the gesture, such as shown in Table 8, and may determine that the gesture is configured to

TABLE 8

| Gesture | Controllable Device | Action/ Command | Context Name | Contextual Data Source | Parameter | Parameter Value |
|---|---|---|---|---|---|---|
| Arms Raised Gesture | Television 302a | Turn Volume up 2 levels; Output supplemental content | Context H | Television 302a | Operational State | ON |
| | | | | Microphone 302h | Background Noise | >65 Db |
| | | | | Content Output 302j | Content Type | Children's show | control the television 302*a* in the current context. That is because, in the current context, the television 302*a* is in the ON state, the type of content being output 302*j* is a children's show, and the background noise 302*b* is greater than 65 decibels. Accordingly, the action performance module 447 may send a control command to the television 302*a* to turn the volume up two levels and to output supplemental content 310 to the television 302*a*. The stored information may further specify a particular device to output the supplemental content 310. That is, the supplemental content 310 need not be output on the same device as the primary content, e.g. the television 302*a* in this example. Instead, the supplemental content 310 may be output on a different device or on a plurality of devices. In some cases, the control command may cause a plurality of different supplemental content items to be output on a plurality of different devices. The supplemental content 310 may be related to the content currently being output 302*j* (i.e., the primary content). For example, the supplemental content may be a second video related to the primary content and output in a second window, such as a picture-in-picture window; a chat window; a social media feed associated with the primary content; closed-captioning or subtitles; information about an actor or a product shown in the primary content; a website associated with the primary content; statistics on an athlete shown in the primary content; an audio associated with the primary content; a sports related graphic associated with the primary content; or any other information related to the content currently being output 302*j*. Alternatively or additionally, the supplemental content may be unrelated to the content currently being output 302*j* at the television 302*a*. For example, the supplemental content may be a display, such as a visual overlay, of virtual confetti, virtual ribbons, an animation, or other visual enhancements or feedback. The supplemental content may be audio such as a laugh track, party horns blowing, cheering, chimes, or any other audio. In this contextual scenario, although the user's emotional state 302*z* of excitement caused the gesture recognition threshold 308 to be adjusted, the user performed the gesture in an intentional manner (such as faster, longer, closer to the device, etc.) that satisfied the adjusted gesture recognition threshold 308. Further the user's emotional state 302*z*, inferred based on the content being output 302*j* and the background noise 302*b*, caused the output of supplemental content.

The descriptions above are merely example embodiments of various concepts. They may be rearranged, divided, and/or combined as desired, and one or more components or steps may be added or removed without departing from the spirit of the present disclosure. The scope of this patent should only be determined by the claims that follow.

What is claimed is:

1. A method comprising:
   determining, by a computing device, information associating a gesture with one or more commands associated with one or more devices;
   receiving an indication that the gesture was detected;
   adjusting, based on context information indicating content being output in an environment in which the gesture was detected, a gesture recognition threshold associated with the detected gesture;
   selecting, based on determining that the detected gesture satisfies the adjusted gesture recognition threshold, the one or more commands; and
   causing execution of the selected one or more commands.

2. The method of claim 1, wherein the selecting is further based on a temperature of a room in which the gesture was detected.

3. The method of claim 1, wherein the adjusting is further based on an emotional state of a user performing the detected gesture.

4. The method of claim 1, wherein causing execution of the selected one or more commands comprises:
   sending, to a first device in a first room in which the gesture was detected, a command to perform a first action; and
   sending, to a second device in a second room different from the first room, a command to perform a second action.

5. The method of claim 1, further comprising determining, based on the context information, an identity of one or more individuals in proximity to a user performing the detected gesture.

6. An apparatus comprising:
   one or more processors; and
   memory storing instructions that, when executed by the one or more processors, cause the apparatus to:
      determine information associating a gesture with one or more commands associated with one or more devices;
      receive an indication that the gesture was detected;
      adjust, based on context information indicating content being output in an environment in which the gesture was detected, a gesture recognition threshold associated with the detected gesture;
      select, based on determining that the detected gesture satisfies the adjusted gesture recognition threshold, the one or more commands; and
      cause execution of the selected one or more commands.

7. The apparatus of claim 6, wherein the instructions, when executed by the one or more processors, cause the selecting further based on a temperature of a room in which the gesture was detected.

8. The apparatus of claim 6, wherein the instructions, when executed by the one or more processors, cause the adjusting further based on an emotional state of a user performing the detected gesture.

9. The apparatus of claim 6, wherein the instructions, when executed by the one or more processors, further cause the apparatus to:
   send, to a first device in a first room in which the gesture was detected, a command to perform a first action; and
   send, to a second device in a second room different from the first room, a command to perform a second action.

10. The apparatus of claim 6, wherein the instructions, when executed by the one or more processors, further cause the apparatus to:
    determine, based on the context information, an identity of one or more individuals in proximity to a user performing the detected gesture.

11. A non-transitory computer-readable medium storing instructions that, when executed, cause:
    determining, by a computing device, information associating a gesture with one or more commands associated with one or more devices;
    receiving an indication that the gesture was detected;
    adjusting, based on context information indicating content being output in an environment in which the gesture was detected, a gesture recognition threshold associated with the detected gesture;

selecting, based on determining that the detected gesture satisfies the adjusted gesture recognition threshold, the one or more commands; and causing execution of the selected one or more commands.

12. The non-transitory computer-readable medium of claim 11, wherein the selecting is further based on a temperature of a room in which the gesture was detected.

13. The non-transitory computer-readable medium of claim 11, wherein the adjusting is further based on an emotional state of a user performing the detected gesture.

14. The non-transitory computer-readable medium of claim 11, wherein the instructions, when executed, further cause:

sending, to a first device in a first room in which the gesture was detected, a command to perform a first action; and sending, to a second device in a second room different from the first room, a command to perform a second action.

15. The non-transitory computer-readable medium of claim 11, wherein the instructions, when executed, further cause:

determining, based on the context information, an identity of one or more individuals in proximity to a user performing the detected gesture.

16. A system comprising:

a first computing device configured to:

determine information associating a gesture with one or more commands associated with one or more devices;

receive an indication that the gesture was detected;

adjust, based on context information indicating content being output in an environment in which the gesture was detected, a gesture recognition threshold associated with the detected gesture; and select, based on determining that the detected gesture satisfies the adjusted gesture recognition threshold, the one or more commands; and a second computing device configured to:

cause execution of the selected one or more commands.

17. The system of claim 16, wherein the selecting is further based on a temperature of a room in which the gesture was detected.

18. The system of claim 16, wherein the adjusting is further based on an emotional state of a user performing the detected gesture.

19. The system of claim 16, wherein the first computing device is further configured to:

send, to a first device in a first room in which the gesture was detected, a command to perform a first action; and send, to a second device in a second room different from the first room, a command to perform a second action.

20. The system of claim 16, wherein the first computing device is further configured to determine, based on the context information, an identity of one or more individuals in proximity to a user performing the detected gesture.

\* \* \* \* \*